United States Patent [19]
Suzuki et al.

[11] Patent Number: 5,682,362
[45] Date of Patent: Oct. 28, 1997

[54] TRACK ACCESSING METHOD AND APPARATUS USING COARSE AND FINE DRIVING CONTROL IN COLLABORATING OF FASHION

[75] Inventors: Seiichi Suzuki, Katano; Hidefumi Ishibashi, Neyagawa; Takaharu Shigeta, Yokohama; Katsumi Yamada, Osaka, all of Japan

[73] Assignee: Matsushita Electric Industrial Co., Ltd., Osaka, Japan

[21] Appl. No.: 661,253

[22] Filed: Jun. 10, 1996

[30] Foreign Application Priority Data

Jun. 13, 1995 [JP] Japan ............................ 7-145989
Jan. 16, 1996 [JP] Japan ............................ 8-023333

[51] Int. Cl.⁶ ............................ G11B 17/22; G11B 5/596
[52] U.S. Cl. ............................ 369/32; 360/78.05
[58] Field of Search ............................ 369/32, 44.28, 369/44.29, 44.27, 44.35; 360/78.04, 78.05, 78.09, 78.06, 78.14

[56] References Cited

U.S. PATENT DOCUMENTS

| | | | |
|---|---|---|---|
| 4,866,687 | 9/1989 | Kasai et al. | 369/32 |
| 5,060,210 | 10/1991 | Fennema et al. | 369/32 |
| 5,090,001 | 2/1992 | Ito et al. | 369/32 |
| 5,142,516 | 8/1992 | Fennema | 369/32 |
| 5,157,642 | 10/1992 | Tsukamura et al. | 369/32 |
| 5,307,333 | 4/1994 | Ikeda et al. | 369/44.28 |
| 5,317,550 | 5/1994 | Semba | 369/32 |
| 5,425,013 | 6/1995 | Fennema et al. | 369/44.35 |

FOREIGN PATENT DOCUMENTS

| | | |
|---|---|---|
| 59-180837 | 10/1984 | Japan . |
| 1-290176 | 11/1989 | Japan . |
| 2-189774 | 7/1990 | Japan . |
| 7-21573 | 1/1995 | Japan . |

OTHER PUBLICATIONS

H. Nakajima et al., "Compact Disc Textbook", 2nd Ed., 1993, published by Ohm Sha, pp. 160–163.
N. Murayama et al., "Optical Disk Technology", 1989, published by Radio Gijutsusha, pp. 161–164.

*Primary Examiner*—Tan Dinh
*Attorney, Agent, or Firm*—Panitch Schwarze Jacobs & Nadel, P.C.

[57] ABSTRACT

The invention is directed at ensuring stable track accessing despite the presence of backlash in a pickup drive mechanism, and at providing a precise track accessing operation not affected by the relative position or relative speed between pickup and carriage at the time a track access start instruction is issued. To achieve this, when the track access start instruction is issued in a tracking condition in which the pickup is following a track on a recording medium, the carriage is caused to begin to move in a track access direction by the action of a coarse actuator, while the pickup is still kept on track of the recording medium by means of a fine actuator. When the position of the pickup relative to the carriage has reached a boundary of a switch-off range preset within a movable range of the pickup or moved outside the switch-off range, the track following action of the pickup by the fine actuator is stopped, and the pickup is moved to the target track by using coarse driving control and, as necessary, fine driving control in collaborating fashion.

24 Claims, 31 Drawing Sheets

FIG. 30 (Prior Art)
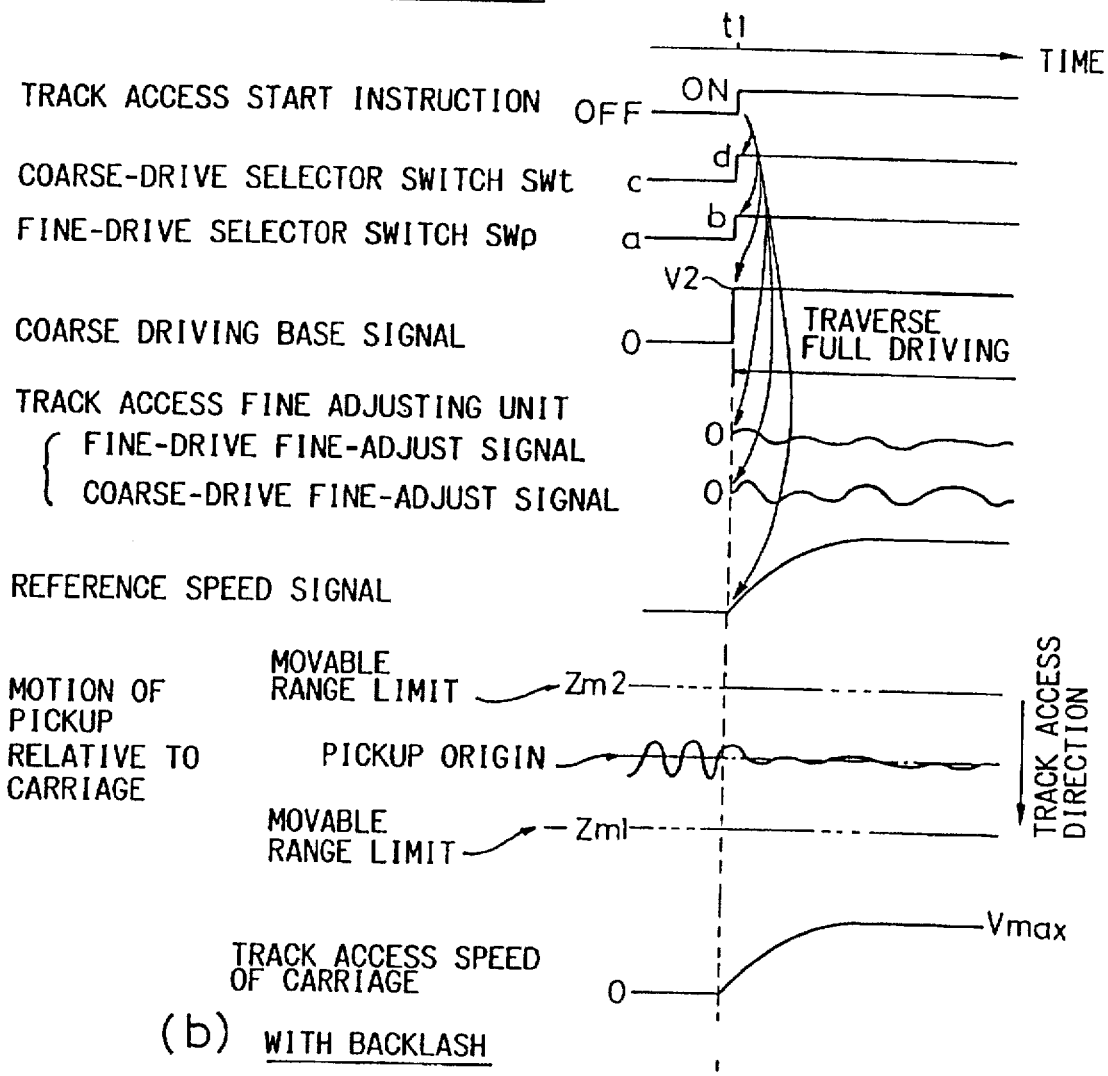
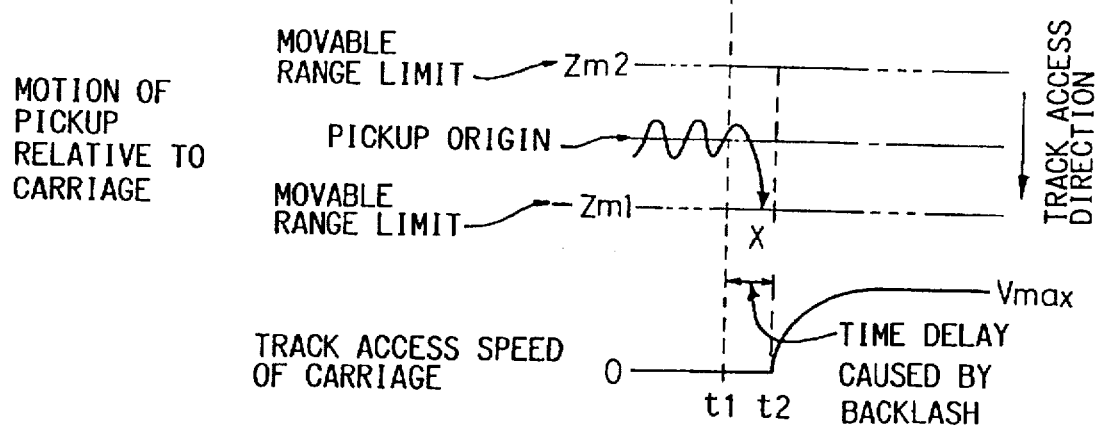

TRACK ACCESSING METHOD AND APPARATUS USING COARSE AND FINE DRIVING CONTROL IN COLLABORATING OF FASHION

FIELD OF THE INVENTION AND RELATED ART STATEMENT

1. Field of the Invention

The present invention relates to an apparatus equipped with a pickup used to record, play back, or erase information on a track of a rotating recording medium, and more particularly to a track access method and apparatus for moving the pickup to the target track at high speed.

2. Description of the Related Art

In recent years, with increasing densities of recording media, the need to record and play back larger amounts of information at higher speed has been increasing. To achieve this, in the field of information recording and playback apparatus for writing and reading information on a recording medium by using a pickup, variety of track access techniques have been proposed for moving the pickup to the target track at the highest possible speed.

According to the technique disclosed in Japanese Patent Unexamined Publication No. 2-189774, for example, a track access apparatus is used in which a tracking actuator with a pickup mounted thereon, and capable of fine positioning of the pickup, is mounted on a drive mechanism that performs coarse positioning. According to this technique, when accessing a track, a reference speed signal is generated and control is performed to adjust the pickup speed to match the reference speed, thereby achieving fast and stable pickup positioning while suppressing vibrations in the pickup.

More specifically, the pickup detects a track on a recording medium, and generates a track detection signal and a direction discrimination signal. A pulse train representing the speed is generated as a track-access reference speed signal, and the track detection signal detected by the pickup is compared with the phase of the generated pulse train. When the pickup in track accessing is moving in the track access direction, if the moving speed detected by the pickup is slower than that indicated by the reference speed signal, the tracking actuator is accelerated; conversely, if the moving speed detected by the pickup is higher than that indicated by the reference speed signal, the tracking actuator is decelerated. In this way, the moving speed of the pickup is adjusted to match the reference speed signal. On the other hand, if the pickup is moving in the direction opposite to the track access direction, the tracking actuator is controlled so that the pickup is forcefully accelerated in the track access direction.

According to the technique disclosed in Japanese Patent Unexamined Publication No. 1-290176, the construction is such that the relative speed between an optical disk and a spot focused on the optical disk is detected using a speed sensor mounted on a fine actuator or using a tracking error signal (hereinafter sometimes called the TE signal) and a reproduced RF signal detected by an optical head, and the fine actuator is controlled through a coarse actuator and a high-pass filter in such a manner as to zero the difference between the relative speed and the speed indicated by a drive signal for moving the head to the target track (a signal indicating a reference speed).

Two typical track access apparatus of the prior art will be described below.

(Prior Art 1)

The operation of the track access apparatus according to the first prior art will be described below with reference to the functional block diagram shown in FIG. 28.

The construction shown in FIG. 28 includes a recording medium 1, a pickup 2, a fine actuator 5, a coarse actuator 6, a dead zone amplifier 8, a TE generating unit 9, a phase compensation circuit 10, a speed detection unit 11, a speed difference detection unit 13, a carriage 14, a fine-drive selector switch (SWp) 15, a coarse-drive selector switch (SWt) 16, a fine-drive amplifier 17, a coarse-drive amplifier 18, a worm 19, a spindle motor 20, a track access start instruction input port 21, a spring 22, a target travel distance calculating unit 23, an invert/noninvert amplifier 38, an invert/noninvert amplifier 39, a track access fine adjusting unit 43, a coarse driving base signal generating unit 44, and a reference speed signal generating unit 52.

In FIG. 28, the recording medium 1 is rotated by the spindle motor 20. The coarse actuator 6 drives the carriage 14 via the worm 19. The driving direction is substantially at right angles to the tracks of the recording medium 1. This driving direction is hereinafter referred to as the track access direction (the direction that crosses the tracks). The carriage 14 is mounted with the fine actuator 5. The fine actuator 5 is able to drive the pickup 2 with sufficiently good precision against the track pitch of the recording medium 1. The pickup 2 is movable with respect to the carriage 14 in the track access direction with the elastic force of the spring 22 acting thereon. In a condition in which the fine actuator 5 is not generating any force, the pickup 2 is held at rest by the spring 22 substantially in the center of its movable range on the carriage 14. This rested position of the pickup 2 relative to the carriage 14, in the nonoperating condition of the fine actuator 5, is herein referred to as the pickup origin. The movable range of the fine actuator 5 is between +500 μm and −500 μm from the pickup origin in the track access direction. In track accessing, the direction from the inner toward the outer circumference of the recording medium 1 is defined as the positive direction, and the direction from the outer toward the inner circumference as the negative direction.

The TE generating unit 9 generates a tracking error signal (hereinafter sometimes called the TE signal) from two signals E and F that it receives from the pickup 2. Various methods have been implemented for TE signal generation, including, for example, a three-beam method and a push-pull method, as described on page 161 in Ohm Sha's "Compact Disc Textbook," 2nd Edition, 1993, by Nakajima, H., et al. In either method, a TE signal is derived from two or more signals. In the first prior art, the TE generating unit 9 derives a TE signal from signals E and F generated by the three-beam method.

The phase compensation circuit 10 generates, based on the TE signal, a tracking drive signal (hereinafter sometimes called the TRD signal) for driving the fine actuator 5.

Since the force is substantially balanced between the spring 22 and the fine actuator 5, if the pickup 2 is to be held at rest at a position other than the pickup origin, a prescribed drive current must be fed to the fine actuator 5. Because of the elasticity of the spring 22, the magnitude of the drive current required to hold the pickup 2 at rest increases with increasing distance from the pickup origin. With this characteristic, the drive current flowing to the fine actuator 5 serves as information indicating the position of the pickup 2 relative to the carriage 14. Since the drive current is produced by amplifying the TRD signal by the fine-drive amplifier 17, the relative position of the pickup 2 as seen from the carriage 14 can be determined based on the TRD signal.

Making the pickup 2 follow a track on the recording medium 1 is hereinafter referred to as tracking. The operation during tracking will be described with reference to FIG. 28.

During tracking, the fine-drive selector switch (SWp) 15 is connected to "a", and the coarse-drive selector switch (SWt) 16 is connected to "c". As described above, during tracking the pickup 2 is following a track on the recording medium 1. At this time, the TRD signal output from the phase compensation circuit 10 is routed via the fine-drive selector switch (SWp) 15 and is amplified by the fine-drive amplifier 17. The amplified signal is input to the fine actuator 5. At the same time, the TRD signal is also supplied to the dead zone amplifier 8. Since the coarse-drive selector switch (SWt) 16 is connected to "c", a coarse tracking signal Vtr, the output of the dead zone amplifier 8, is sent to the coarse-drive amplifier 18 where it is amplified to produce a drive signal for driving the coarse actuator 6.

The fine actuator 5 has a narrow driving range but can achieve precise positioning. By contrast, the coarse actuator 6 has a wide driving range but its positioning accuracy is low. Accordingly, for a minute movement of the pickup 2, primarily the fine actuator 5, which is capable of controlling fine positioning with good accuracy, handles the operation, and for a movement over a large distance that cannot be handled by the fine actuator 5, the coarse actuator 6 handles the operation in collaboration with the fine actuator 5. It is desirable that the coarse actuator 6 with a relatively low positioning accuracy not be moved frequently. Therefore, when the pickup 2 is located inside a prescribed range with respect to the carriage 14, for example, inside a range larger than $-Zd1$ and smaller than $Zd2$, tracking is maintained using the fine actuator 5 alone, and when the pickup 2 has reached or moved beyond $-Zd1$ or $Zd2$ with respect to the pickup origin, tracking is performed by using the coarse actuator 6 and the fine actuator 5 in collaborating fashion. The range larger than $-Zd1$ and smaller than $Zd2$ is called the dead zone of tracking motion.

The TRD signal output from the phase compensation circuit 10 changes according to the position of the pickup 2 relative to the carriage 14. When the relative position of the pickup 2 with respect to the carriage 14 is at one end of the dead zone of tracking motion, i.e., at $-Zd1$, the value of the TRD signal is designated as $-Wd1$, and when it is at the other end $Zd2$, the value of the TRD signal is designated as $Wd2$.

The dead zone amplifier 8 is an amplifier the output characteristic of whose drive signal is a function of the TRD signal. More specifically, when the TRD signal is plotted along the abscissa, as shown in the dead zone amplifier 8 in FIG. 28, the origin of the abscissa corresponds to the pickup origin, with the direction toward the outer circumference of the recording medium 1 taken as the positive direction and the direction toward the inner circumference as the negative direction. The section between $-Wd1$ and $Wd2$, passing through the origin of the abscissa, is called the tracking dead zone. When the input TRD signal is inside the tracking dead zone, the coarse tracking signal Vtr that the dead zone amplifier 8 outputs is zero. Therefore, in that case, the coarse actuator 6 is not activated.

The instant that the input TRD signal exceeds $Wd2$, the dead zone amplifier 8 Outputs a drive signal $Vd2$ for driving the coarse actuator 6. The signal $Vd2$ has a certain value because a bias is applied to allow for the starting voltage with which the coarse actuator 6 starts driving. As the TRD signal increases past $Wd2$, the coarse tracking signal Vtr increases linearly.

On the other hand, when the TRD signal drops to $-Wd1$, the dead zone amplifier 8 outputs a negative value $-Vd1$. As the TRD signal becomes smaller than $-Wd1$ (becomes more negative), the coarse tracking signal Vtr decreases linearly (increases in the negative sense). Since the coarse-drive selector switch (SWt) 16 is connected to "c", the coarse tracking signal Vtr is input to the coarse-drive amplifier 18 to drive the coarse actuator 6.

On the other hand, since the fine-drive selector switch (SWp) 15 is connected to "a", the TRD signal output from the phase compensation circuit 10 is input to the fine-drive amplifier 17 to drive the fine actuator 5.

With the above construction, during tracking, when the relative position of the pickup 2 as seen from the carriage 14 is inside the dead zone of tracking motion, the TRD signal lies inside the tracking dead zone, from $-Wd1$ to $Wd2$, set by the dead zone amplifier 8.

In that case, the pickup 2 is made to follow a track on the recording medium 1 by unit of the fine actuator 5, while the coarse actuator 6 remains deactivated. When the relative position of the pickup 2 as seen from the carriage 14 has reached or moved beyond $-Zd1$ or $Zd2$, the TRD signal is equal to or smaller than $-Wd1$ or equal to or larger than $Wd2$, respectively. Accordingly, the dead zone amplifier 8 outputs a value equal to or larger than $Vd2$ or equal to or smaller than $-Vd1$ as the coarse tracking signal Vtr to drive the coarse actuator 6, thus making the pickup 2 follow a track on the recording medium 1 by using the coarse actuator 6 and the fine actuator 5 in collaborating fashion. The operation during tracking according to the first prior art has been described above.

The operation during track accessing according to the first prior art will be described next.

Referring to FIG. 28, when the track access start instruction input port 21 outputs a command 1 in response to a track access start instruction, the fine-drive selector switch (SWp) 15 is switched to "b", and at the same time, the reference speed signal generating unit 52 initiates the generation of a reference speed signal. The workings of the reference speed signal generating unit 52 are described in detail, for example, on page 162 in "Optical Disk Technology" published 1989 by Radio Gijutsusha. The gist will be given below with reference to FIGS. 29(a)–29(c).

FIGS. 29(a)–(c) are diagrams showing the reference speed signal that the reference speed signal generating unit 52 (FIG. 28) generates. In FIGS. 29(a) and 29(c) the abscissa represents the time and the ordinate the pickup speed during track accessing. In FIG. 29(b), the abscissa represents the time and the ordinate the distance that the pickup 2 (FIG. 28) travels.

An optimum rising speed profile, optimum falling speed profile, and maximum speed of the pickup 2 during track accessing are stored in advance in the reference speed signal generating unit 52.

The target travel distance calculating unit 23 (FIG. 28) detects position P1, where the pickup 2 is located immediately before the initiation of track accessing, from the track information read by the pickup 2, calculates distance P12 to the position P2 of the target track specified as the track access destination, and supplies the calculated result to the reference speed signal generating unit 52. Based on the distance P12 and on the rising speed profile, maximum speed Vmax, and falling speed profile of the pickup 2, the reference speed signal generating unit 52 generates an optimum speed signal indicating the optimum speed that the pickup 2 should target.

More specifically, the distance S1 to be traveled by the pickup 2 during the track access rise time and the distance S2 to be traveled during the track access fall time are subtracted from the distance P12 (P12–S1–S2); if the resulting difference is positive, the difference is divided by the maximum speed Vmax, to create the reference speed signal with (P12–S1–S2)/Vmax as the maximum speed period. On the other hand, if (P12–S1–S2) yields a negative value, since it is desirable that the pickup 2 begin to decelerate partway through the rise time before reaching the maximum speed, the reference speed signal generating unit 52 pre-stores a reference speed signal, such as the one shown in FIG. 29(c), that matches the magnitude of the negative value.

FIG. 29(a), when the command 1 is issued, the reference speed signal generating unit 52 initiates the generation of a reference speed signal. In the case of short-distance track accessing also, as shown in FIG. 29(c), the reference speed signal generating unit 52 initiates the generation of a reference speed signal when the command 1 is issued. The generated reference speed signal is sent to the speed difference detection unit 13 (FIG. 28) to be described later.

FIG. 29(b) shows the target travel distance when the pickup 2 moves in accordance with the reference speed signal. Immediately before receiving the command 1, the pickup 2 is positioned over the current track; if the pickup 2 accelerates, moves at a constant speed, and then decelerates in accordance with the reference speed signal, the pickup 2 will reach the target track at the end of the track accessing.

The operation during track accessing will be further described with reference to FIG. 28 and the part (a) of FIG. 30. FIG. 30 shows timing diagrams for signals related to the functional block diagram of FIG. 28: The part (a) of FIG. 30 shows a diagram when there is no backlash in the coarse actuator 6, and the part (b) of FIG. 30 shows a diagram when there is backlash.

The track access operation begins when the track access start instruction is input to the track access start instruction input port 21 shown in FIG. 28.

The signal that the track access start instruction input port 21 outputs at this time is designated as command 1. In the part (a) of FIG. 30, when the track access start instruction is issued at time t1, the coarse-drive selector switch (SWt) 16 is switched from "c" to "d", and the fine-drive selector switch (SWp) 15 from "a" to "b", in response to the command 1. Further, in response to the command 1, the coarse driving base signal generating unit 44 (FIG. 28) outputs a drive signal V2 which is input to the coarse-drive amplifier 18 (FIG. 28); at the same time, the track access fine adjusting unit 43 (FIG. 28), which has been in the nonoperating condition, is now put in an operating condition, and the fine actuator 5 and the coarse actuator 6 are controlled based on the speed difference between the pickup 2 and the reference speed signal.

The track access start instruction input port 21 outputs the command 1 upon receiving the track access start instruction. The command 1 works to switch the fine-drive selector switch (SWp) 15 to "b" and the coarse-drive selector switch (SWt) 16 to "d", and to make the coarse driving base signal generating unit 44 output a coarse driving base signal and the reference speed signal generating unit 52 output a reference speed signal.

The speed difference detection unit 13 calculates the speed difference between the speed of the pickup 2 relative to the track, output from the speed detection unit 11, and the speed indicated by the reference speed signal, and supplies the difference to the track access fine adjusting unit 43.

Based on the speed difference, the track access fine adjusting unit 43 generates signals for fine adjusting the fine actuator 5 and the coarse actuator 6.

Next, the operation of the track access fine adjusting unit 43 will be described with reference to FIG. 31.

FIG. 31 is a circuit diagram conceptually illustrating the operation of the track access fine adjusting unit 43 which, as shown, includes a fine-drive gain control 73 and a coarse-drive gain control 74. The speed difference signal supplied from the speed difference detection unit 13 is adjusted by the fine-drive gain control 73 and supplied as a fine-drive fine-adjust signal V'f to the subsequent stage; the speed difference signal is also adjusted by the coarse-drive gain control 74 and supplied as a coarse-drive fine-adjust signal V'c to the subsequent stage.

Turning back to FIG. 28, the fine-drive fine-adjust signal V'f, which is one output of the track access fine adjusting unit 43, is sent to the invert/noninvert amplifier 38 and on to the fine-drive amplifier 17 via the fine-drive selector switch (SWp) 15, and the fine actuator 5 is thus driven. The invert/noninvert amplifier 38 is supplied with a track access direction signal not shown; if the track access direction is from the inner toward the outer circumference of the recording medium 1, the amplifier 38 sends the fine-driving fine-adjust signal V'f as is to the subsequent stage. Conversely, if the track access direction is from the outer toward the inner circumference, the fine-drive fine-adjust signal V'f is inverted for output to the subsequent stage. In this way, the positive moving direction of the fine actuator 5 is made to match the track access direction.

The coarse-drive fine-adjust signal V'c, which is the other output of the track access fine adjusting unit 43, is superimposed on the coarse driving base signal, and the resulting coarse track access signal is sent to the invert/noninvert amplifier 39 and on to the coarse-drive amplifier 18 via the coarse-drive selector switch (SWt) 16, thus driving the coarse actuator 6. The invert/noninvert amplifier 39 is supplied with a track access direction signal not shown; if the track access direction is from the inner toward the outer circumference of the recording medium 1, the amplifier 39 sends the coarse track access signal as is to the subsequent stage. Conversely, if the track access direction is from the outer toward the inner circumference, the coarse track access signal is inverted for output to the subsequent stage. In this way, the positive moving direction of the coarse actuator 6 is made to match the track access direction.

As described, according to the first prior art, the track access fine adjusting unit 43, upon receiving the track access start instruction at time t1, controls the fine actuator 5 and coarse actuator 6 in such a manner as to reduce the difference between the speed indicated by the reference speed signal and the speed of the pickup 2 relative to the track on the recording medium 1; this achieves fast track accessing while suppressing vibrations in the pickup 2.

(Prior Art 2)

Next, the track access apparatus according to the second prior art will be described with reference to FIG. 18.

The apparatus shown in FIG. 18 comprises a recording medium 1, a pickup 2, a fine actuator 5, a coarse actuator 6, a TE generating unit 9, a phase compensation circuit 10, a carriage 14, a fine-drive selector switch (SWp) 15, a coarse-drive selector switch (SWt) 16, a fine-drive amplifier 17, a coarse-drive amplifier 18, a worm 19, a spindle motor 20, a track access start instruction input port 21, a spring 22, an invert/noninvert amplifier 39, a direct-current detection circuit 62, a counter 63, a coarse driving signal generating unit 64, a braking start time determining unit 65, and a brake circuit 66.

The coarse actuator 6 and the TE generating unit 9 are the same in configuration as the corresponding parts described in the first prior art.

Further, as in the first prior art, the drive current that flows to the fine actuator 5, based on the TRD signal, provides a signal that indicates the position of the pickup 2 relative to the carriage 14.

Referring now to FIG. 18, we will describe the operation during tracking, that is, how the pickup 2 follows a track on the recording medium 1 in the second prior art. In the figure, during tracking, the fine-drive selector switch (SWp) 15 is connected to "a", the coarse-drive selector switch (SWt) 16 is connected to "c", and the pickup 2 is moved in the track access direction by means of the fine actuator 5 mounted on the carriage 14.

The direct-current detection circuit 62 is used to effectively remove or reduce frequency components arising from the eccentricity of the rotating recording medium 1 and contained in the TRD signal; more specifically, this circuit is constructed from a low-pass filter whose cutoff frequency is so selected as to cut off frequency components including the eccentricity-induced components.

In FIG. 18, during tracking the pickup 2 is following a track on the recording medium 1. At this time, the TRD signal output from the phase compensation circuit 10 is routed via the fine-drive selector switch (SWp) 15 and is amplified by the fine-drive amplifier 17 to drive the fine actuator 5. The TRD signal is also input to the direct-current detection circuit 62. The direct-current detection circuit 62 outputs a coarse tracking signal Vtr which is directed to the invert/noninvert amplifier 39 via the coarse-drive selector switch (SWt) 16 and then input to the coarse-drive amplifier 18. The coarse tracking signal Vtr is amplified by the coarse-drive amplifier 18, and with this amplified signal, the coarse actuator 6 is driven.

The coarse actuator 6 rotates in the backward or forward direction depending on whether the applied voltage is positive or negative. The driving force of the coarse actuator 6 is transmitted via the worm 19 to move the carriage 14 toward the inner or outer circumference of the recording medium during track accessing.

As in the first prior art, for a minute movement of the pickup 2, primarily the fine actuator 5, which is capable of controlling fine positioning with good accuracy, handles the operation, and it is desirable that the coarse actuator 6 with a relatively low positioning accuracy not be moved frequently. In particular, eccentricity resulting from a displacement, etc. of the center axis of the rotating recording medium 1 is handled primarily by the fine actuator 5 to control the tracking of the pickup 2. Therefore, the direct-current detection circuit 62 removes or reduces frequency components including the eccentricity-induced components contained in the TRD signal, and drives the coarse actuator 6 via the invert/noninvert amplifier 39, coarse-drive amplifier 18, and brake circuit 66.

Next, the operation during track accessing according to the second prior art will be described with reference to FIG. 18. When the track access start instruction is input to the track access start instruction input port 21, the input port 21 issues command 1 to transmit the track access start instruction. The track access operation begins the instant that the command 1 is issued.

When the command 1 is issued, the coarse-drive selector switch (SWt) 16 is switched from "c" to "d", and at the same time, the coarse driving signal generating unit 64 outputs a signal Vpr (to be described later) for driving the coarse actuator 6. On the other hand, the counter 63, upon receiving the command 1, starts to count the number of tracks crossed thereafter by counting the number of crests of a sine wave occurring in the TE signal during track crossing. The count value of the counter 63 is reset to zero each time the command 1 is received.

When the coarse-drive selector switch (SWt) 16 is switched to "d", the signal output from the coarse driving signal generating unit 64 is passed through the invert/noninvert amplifier 39 and amplified by the coarse-drive amplifier 18, thereby driving the coarse actuator 6 via the brake circuit 66. Here, the invert/noninvert amplifier 39 is supplied with a track access direction discrimination signal not shown; if the track access direction is from the inner toward the outer circumference of the recording medium 1, the amplifier 39 sends the coarse driving signal Vpr as is to the subsequent stage. Conversely, if the track access direction is from the outer toward the inner circumference, the coarse driving signal Vpr is inverted for output to the subsequent stage. The signal amplified by the coarse-drive amplifier 18 at the subsequent stage is used to drive the coarse actuator 6 which moves the carriage in the designated track access direction. The track access direction discrimination signal is obtained from the position of the track the pickup 2 is currently following and the position of the target track.

Upon receiving the command 1, the fine-drive-selector switch (SWp) 15 is switched from "a" to "b", and the input of the fine-drive amplifier 17 is thus grounded; as a result, no driving force occurs in the fine actuator 5. Therefore, when the command 1 is issued, the pickup 2 is freed from the driving force of the fine actuator 5, and thereafter, the motion of the fine actuator 5 is determined by such factors as the relative position and relative speed of the pickup 2 with respect to the carriage 14 immediately before the arrival of the command 1, the force acting on the spring 22 due to the relative position of the pickup 2, the inertia of the pickup 2, and the movement of the carriage 14. Since the relative position and relative speed of the pickup 2 at the time of the arrival of the command 1 are random, the motion of the pickup 2 after the arrival of the command 1 differs each time.

When the command 1 is received, the braking start time determining unit 65 first calculates the distance from the current position of the pickup 2, which was read by the pickup 2 from the current track on the recording medium 1, to the target track, and then calculates the time at which to start applying braking to the coarse actuator 6 to stop the carriage 14. The braking start time is calculated in the following manner.

When the number, M, of tracks to be crossed from the start of the braking until the carriage 14 stops is defined as the braking count M, the braking count M is determined in advance by a preliminary experiment and is given as a constant M to the braking start time determining unit 65. Then, with the number of tracks crossed by the pickup 2 being constantly supplied from the counter 63, the time at which (L–M) tracks have been crossed is determined as the braking start time, where L is the total number of tracks to be crossed from the current position of the pickup 2 to the target track, and at the braking start time a braking start instruction is issued to the brake circuit 66 at the subsequent stage.

Upon receiving the braking start instruction, the brake circuit 66 performs control so that the coarse actuator 6 generates a driving force in the direction opposite to the track access direction for the duration of a braking time Tb which is given in advance as a constant. More specifically, by short-circuiting both ends of the power supply lime of the coarse actuator 6, a back electromotive force is induced in the coarse actuator 6, thereby generating a braking force.

The braking time Tb is determined in advance by experimentally measuring the time required to accomplish a complete stop of the carriage 14, and is given as a constant to the braking start time determining unit 65.

The operational flow of the track access apparatus shown in FIG. 18 will be described with reference to FIG. 19. FIG. 19 is a flowchart illustrating the operation of the track access apparatus of the second prior art. In FIG. 19, when the track access start instruction is received, the track access start instruction input port 21 (FIG. 18) issues command 1 (2601). By command 1, the fine-drive selector switch SWp 15 is switched from "a" to "b", releasing the tracking condition in which the pickup 2 is following a track on the recording medium 1, while, at the same time, the coarse-drive selector switch SWt 16 is switched from "c" to "d", and the number L of tracks to be crossed in the current track access operation is calculated from the current track position of the pickup 2 and the position of the target track (2602). Further, the coarse driving signal generating unit 64 issues a coarse driving signal Vpr (2602), and the track access operation is thus started. Upon receiving the command 1, the counter 63 is reset to zero and starts to count the number of tracks crossed by the pickup 2 by monitoring the TE signal. The instant that the number of tracks crossed has reached (L−M), the braking start time determining unit 65 issues a braking start instruction to the brake circuit 66 (2603), and the brake circuit 66 performs control so that the coarse actuator 6 generates a driving force in the direction opposite to the track access direction for a predetermined length of time Tb (2604), thereby stopping the carriage 14 (2605).

(Problem 1)

In the above-described first and second prior art, there is clearance or space between mating gears (including the worm) used for coarse driving, and such clearance or space often causes a time delay in transmitting force from one gear to the next. The space between mating gears is generally known as backlash. Besides the clearance or space between the gears, there are other factors causing a time delay in transmitting force from one gear to the next, such as clearance or space between rotating shaft of a gear wheel or worm and bearings, elastic flection of bearing supports, etc. Such clearance or space causing a time delay in force transmission is hereinafter referred to as backlash.

In the first prior art, however, when the driving force of the coarse actuator 6 is transmitted to the carriage 14 with a time delay due to the backlash, the carriage 14 remains stationary in the initial stage of driving. This can lead to a situation where only the pickup 2 mounted on the carriage 14 is moved in the track access direction by the action of the fine actuator 5, eventually running away beyond the movable range of the pickup 2, hitting an end of the fine actuator 5 or striking against a wall surface of the carriage 14.

Such a runaway situation occurs because, when controlling the moving speed of the pickup 2 based on the reference speed signal which is issued upon arrival of the track access start instruction, only the fine actuator 5 having a quick response is driven in the track access direction while the carriage 14 remains stationary with the driving force of the coarse actuator 6 being not yet transmitted to the pickup 2 because of the backlash. The part (b) of FIG. 30 shows the motion of the pickup 2 when there is the time delay caused by the backlash etc. in the mating gears of the coarse actuator 6.

In the part (b) of FIG. 30, the track access start instruction is issued at time t1, but because of the backlash, there is a time delay before the driving force of the coarse actuator 6 can be transmitted to the carriage 14, the carriage 14 thus remaining stationary until time t2. During this interval, speed control based on the reference speed signal is performed on the pickup 2 while the carriage 14 remains stationary; as a result, only the fine actuator 5 with the pickup 2 mounted thereon is thrust in the track access direction, eventually exceeding the movable limits of the pickup 2.

In many track access apparatus currently commercialized, the effective movable range of the fine actuator 5 used for fine positioning is as small as 1 mm or less, which has presented the problem that unless the movement is limited within the movable range, the pickup 2 collides against an end of the fine actuator 5 or a wall surface of the carriage 14, causing excessive shock vibrations. Furthermore, in the case of a beam spot-type pickup, the impact of the collision causes an out-of-focus condition or a displacement of a focused image, the resulting problem being that since the beam spot is not correctly reflected into a photodetector, the track information cannot be read and track access control is thus rendered impossible.

Various techniques have been proposed for reducing gear backlash. In the case of car-mounted information recording and reproduction apparatus, for example, since cabin temperature varies greatly between winter and summer and changes over a wide range from −10° to +80° C. throughout the year, the gears used in the apparatus are constantly subjected to thermal expansion and contraction. This naturally poses limitations in addressing the backlash problem by reducing the clearance between mating gear teeth.

(Problem 2)

The second prior art has had the following problem.

Since the position and speed of the pickup 2 relative to the carriage 14 at the start of each track access operation are random, the motion of the pickup 2 immediately after a track access operation differs each time. For example, if, at the start of a track access operation, the relative position of the pickup 2 is displaced toward the front Of the carriage 14 in the track access direction, the pickup 2, when disengaged from the driving force of the fine actuator 5, starts to move by the force of the spring 22 in the direction opposite to the track access direction; in this case, the counter 5 erroneously detects the movement of the pickup 2 as if it is moving in the track access direction, and counts the number of tracks crossed on the recording medium while the pickup 2 is moving backward. This causes a situation where braking is started much earlier than it should be, making the pickup 2 land at a position short of the target track.

Furthermore, the fact that the motion of the pickup 2 immediately after the start of a track access operation is not definite affects the subsequent motion of the pickup 2 during track accessing, and the speed with which the pickup 2 crosses tracks on the recording medium 1 differs in each track access operation. The resulting problem is that even when the distance between the current track and the target track is the same and braking is applied to the carriage 14 at the same braking start time, the pickup 2 does not always land at the same track.

OBJECT AND SUMMARY OF THE INVENTION

In view of the above-outlined problems, it is an object of the present invention to provide a track access method and apparatus that ensure stable track accessing despite the presence of backlash in the pickup drive mechanism, and that achieve stable and accurate track accessing regardless of the relative position and relative speed between pickup and carriage at the time the track access start instruction is issued.

To resolve the above-outlined problems, according to the present invention, there is provided a track access method wherein: when a track access start instruction is issued in a tracking condition in which a pickup is following a track on a recording medium, a carriage is caused to begin to move in a track access direction by the action of a coarse actuator, while the pickup is still kept on track on the recording medium by means of a fine actuator; a switch-off range is preset within a movable range of the pickup relative to the carriage, and a relative position of the pickup with respect to the carriage, after the track access start instruction is issued, is detected; and when the relative position has reached a boundary of the switch-off range or moved outside the switch-off range, the track-following action of the pickup by the fine actuator is stopped, and the pickup is moved to the target track by using coarse control and, as necessary, fine control in collaborating fashion.

With the above method, since the pickup, when disengaged from tracking upon the initiation of track accessing, is always located at the rearward end of the predetermined range on the carriage when viewed along the track access direction, the pickup is prevented from crossing tracks of the recording medium in the direction opposite to the track access direction during track accessing, thus eliminating the possibility of erroneously reading the number of tracks crossed. This ensures accurate landing on the target track.

Furthermore, according to the track access method of the present invention, if the carriage stays stationary for a while after the initiation of a track access operation because of the presence of backlash in the pickup drive mechanism, during that time the pickup is maintained in a tracking condition by the action of the fine actuator, and after the backlash is eliminated, the track access motion of the pickup is started by being adjusted by a reference speed signal. This prevents the pickup from running away out of control, and ensures stable track accessing.

According to the present invention, there is also provided a track access apparatus for moving a pickup, used to record, erase, or play back information on a track of a recording medium, to a target track at high speed from a tracking condition in which the pickup is following a track on the recording medium, comprising: a coarse actuator for moving a carriage with the pickup mounted thereon in a track access direction substantially at right angles to the track; a fine actuator, mounted on the carriage, for moving the pickup in the track access direction within a smaller range, and with a higher accuracy, than is possible with the coarse actuator; a position detection unit for detecting a relative position of the pickup with respect to the carriage; a coarse driving signal generating unit for generating a signal to drive the coarse actuator for track accessing when a track access start instruction is issued; a switch unit for presetting a switch-off range within a movable range of the pickup relative to the carriage, and for outputting a prescribed signal when the relative position detected by the position detection unit has reached a boundary of the switch-off range or moved outside the switch-off range; and a fine-drive selector switch for stopping the track following action of the fine actuator in response to the prescribed signal.

With the above configuration, since the pickup, when disengaged from tracking, is always located at the rearward end of the predetermined range on the carriage when viewed along the track access direction, the pickup is prevented from crossing tracks of the recording medium in the direction opposite to the track access direction during track accessing, thus eliminating the possibility of erroneously reading the number of tracks crossed. This ensures accurate landing on the target track.

Furthermore, according to the track access apparatus of the present invention, if the carriage stays stationary for a while after the initiation of a track access operation because of the presence of backlash in the pickup drive mechanism, during that time the pickup is maintained in a tracking condition by the action of the fine actuator, and after the backlash is eliminated, the track access motion of the pickup is started by being adjusted by a reference speed signal. This prevents the pickup from running away out of control, and ensures stable track accessing.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 30 shows the timing diagram illustrating the operation of the prior art when there is no backlash, and a timing diagram illustrating the operation of the prior art when there is backlash; and.

It will be recognized that some or all of the Figures are schematic representations for purposes of illustration and do not necessarily depict the actual relative sizes or locations of the elements shown.

DESCRIPTION OF THE PREFERRED EMBODIMENTS

The preferred embodiments of the track access method and apparatus of the present invention will be described below with reference to the accompanying drawings.
<<First Embodiment>>

Figure 1:
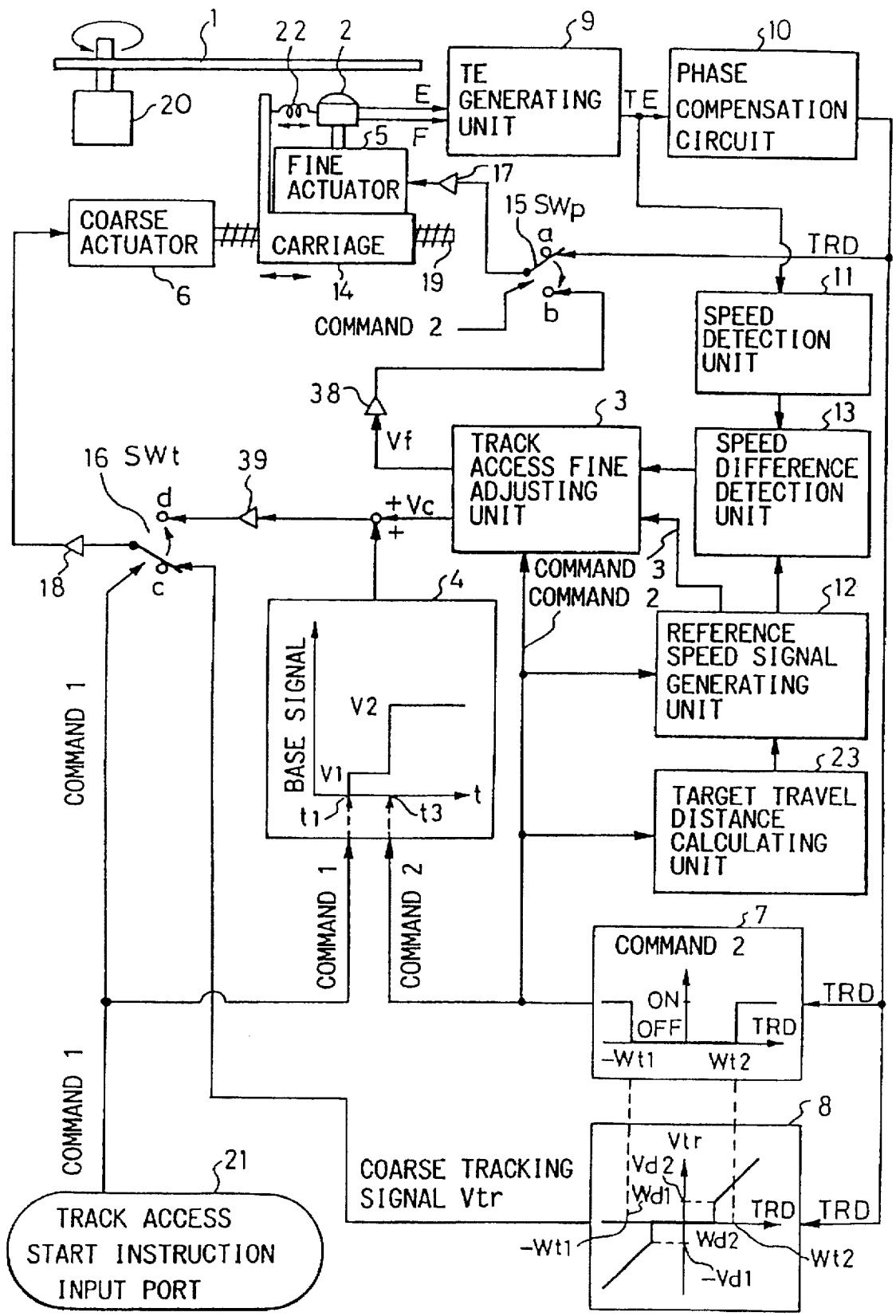
FIG. 1 shows a functional block diagram of a track access apparatus according to a first embodiment of the present invention.

FIG. 1 is a functional block diagram of a track access apparatus according to a first embodiment of the present invention. The construction shown in the figure includes a recording medium 1, a pickup 2, a track access fine adjusting unit 3, a coarse driving base signal generating unit 4, a fine actuator 5, a coarse actuator 6, a dead zone switch 7, a dead zone amplifier 8, a TE generating unit 9, a phase compensation circuit 10, a speed detection unit 11, a reference speed signal generating unit 12, a speed difference detection unit 13, a carriage 14, a fine-drive selector switch (SWp) 15, a coarse-drive selector switch (SWt) 16, a fine-drive amplifier 17, a coarse-drive amplifier 18, a worm 19, a spindle motor 20, a track access start instruction input port 21, a spring 22, a target travel distance calculating unit 23, an invert/noninvert amplifier 38, and an invert/noninvert amplifier 39. In the above construction, the reference speed signal generating unit 12 and the target travel distance calculating unit 23, for example, are constructed using a CPU.

The coarse actuator 6 rotates in the forward or backward direction depending on whether the applied voltage is positive or negative. The rotation of the coarse actuator 6 is translated via the worm 19 into a linear movement of the carriage 14 so that the carriage 14 is moved substantially radially across the surface of the recording medium 1 between the inner and outer circumferences thereof. The worm 19 is cut with a spiral groove and drives the carriage 14 via a worm wheel housed in the carriage 14. The direction of driving is substantially at right angles to the tracks on the recording medium 1; this direction is called the track access direction.

The fine actuator 5 is mounted on the carriage 14 and is able to move the pickup 2 with sufficiently good precision against the track width of the recording medium 1. The pickup 2 is movable with respect to the carriage 14 in the track access direction with the elastic force of the spring 22 acting thereon. When the fine actuator 5 is in the nonoperating condition and not generating any driving force, the pickup 2 is moved by the force of the spring 22 to a position substantially in the center of its movable range on the carriage 14, and is held at rest in that position. This rested position of the pickup 2 relative to the carriage 14 is called the pickup origin.

The TE generating unit 9 derives a tracking error signal (TE signal) from two signals E and F (generated by the three-beam method or the like) received from the pickup 2, as in the first or second prior art.

Also, as in the prior art, since the force is substantially balanced between the spring 22 and the fine actuator 5. if the pickup 2 is to be held at rest at a position other than the pickup origin with respect to the carriage 14, a prescribed drive current must be fed to the fine actuator 5. When the pickup 2 is at the pickup origin, the spring 22 does not exert urging force, but as the pickup 2 is moved away from the pickup origin, the urging force toward the pickup origin increases. This means that when holding the pickup 2 at a position other than the pickup origin, a larger drive current must be fed to the fine actuator 5 as the distance from the pickup origin increases. Accordingly, the drive current flowing to the fine actuator 5 represents the position of the pickup 2 relative to the carriage The phase compensation circuit 10 generates, based on the TE signal, a tracking drive signal (hereinafter sometimes referred to as the TRD signal) for driving the fine actuator 5. The TRD signal is amplified by the fine-drive amplifier 17 to feed a drive current to the fine actuator 5. The TRD signal indicates the position of the pickup 2 relative to the carriage 14, and the drive current is produced based on the TRD signal to be described later. Therefore, the generating unit 9 and the phase compensation circuit 10 in the first embodiment of the present invention are used as means for detecting the position of the pickup 2 relative to the carriage 14. And, the TRD signal is used as a signal indicating the relative position of the pickup 2.

This characteristic of the TRD signal is used during tracking and track accessing in the first embodiment.

The operation during tracking in which the pickup 2 is made to follow a track on the recording medium 1 will be described below with reference to FIG. 1. During tracking, the fine-drive selector switch (SWp) 15 is connected to "a", and the coarse-drive selector switch (SWt) 16 is connected to "c". The pickup 2 is moved in the track access direction by the action of the fine actuator 5 mounted on the carriage 14; at this time, a switch-off range and a dead-zone range, hereinafter described, are set within the movable range of the pickup 2 relative to the carriage 14.

Figure 2:
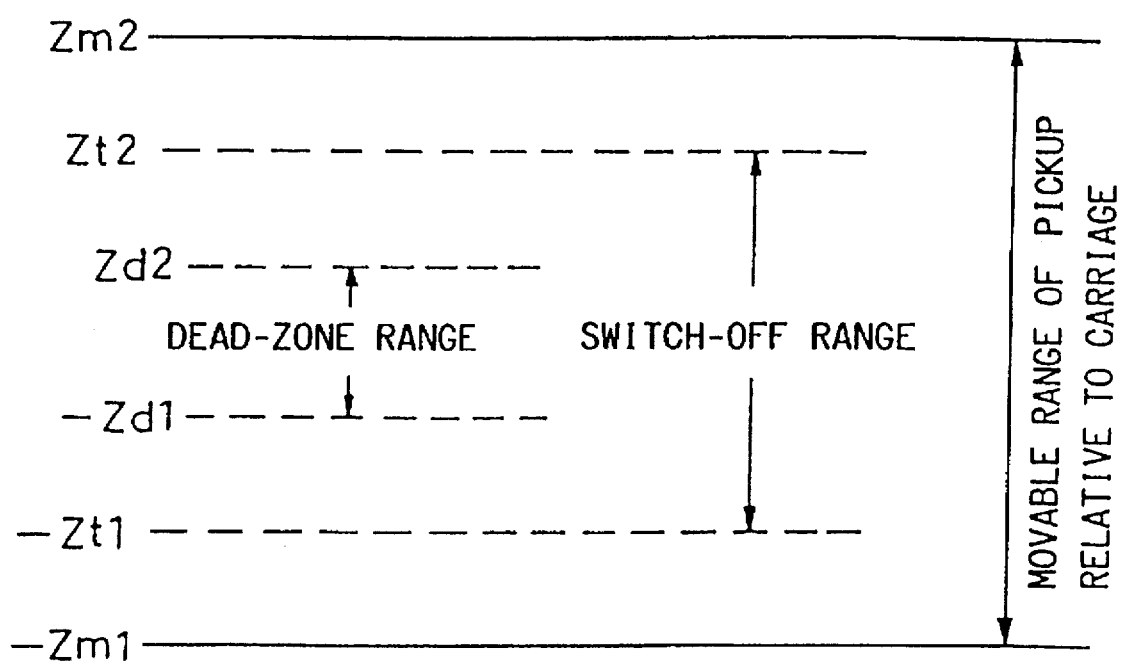
FIG. 2 shows a diagram showing the relationship between a switch-off range and a dead-zone range according to the first embodiment of the present invention.

The relationship between the movable range of the pickup 2 and the switch-off range and the dead-zone range will be described with reference to FIG. 2. FIG. 2 is a diagram plotting the movable range of the pickup 2 relative to the carriage 14 along the track access direction (vertical direction in the figure).

The position of the pickup 2 (FIG. 1) relative to the carriage 14 (FIG. 1) can be changed by means of the fine actuator 5 (FIG. 1). The movable range of the pickup 2 relative to the carriage 14 is from $-Zm1$ to $Zm2$. The two ranges are set within this movable range. The switch-off range is from $-Zt1$ to $Zt2$, the limits $-Zt1$ and $Zt2$ of the switch-off range being set within the limits $-Zm1$ and $Zm2$ of the movable range of the pickup 2. The dead-zone range is from $-Zd1$ to $Zd2$. The dead-zone range is set within the limits of the switch-off range.

In this way, the limits $-Zd1$ and $Zd2$ of the dead-zone range are set within the limits $-Zt1$ and $Zt2$ of the switch-off range. The functions of the thus set first and second ranges will be described below with reference to FIG. 1.

In FIG. 1, the pickup 2 follows a track on the recording medium 1 during tracking. At this time, the TRD signal output from the phase compensation circuit 10 is routed via the fine-drive selector switch (SWp) 15 and input to the fine-drive amplifier 17 where the signal is amplified to drive the fine actuator 5. At the same time, the TRD signal is also supplied to the dead zone amplifier 8. The dead zone amplifier 8 outputs a coarse tracking signal Vtr which is routed via the coarse-drive selector switch (SWt) 16 and fed to the coarse-drive amplifier 18. The signal Vtr is a drive signal for driving the coarse actuator 6. This signal is amplified by the coarse-drive amplifier 18 to drive the coarse actuator 6.

The coarse actuator 6 rotates in the backward or forward direction depending on whether the applied voltage is positive or negative. The driving force of the coarse actuator 6 is transmitted via the worm 19 to the carriage 14, and the carriage 14 is thus moved toward the outer circumference or inner circumference of the recording medium during tracking and track accessing.

As in the prior art, for a minute movement of the pickup 2, the fine actuator 5, which is capable of controlling fine positioning with good accuracy, primarily handles the operation, and it is desirable that the coarse actuator 6 with a relatively low positioning accuracy compared with the fine actuator 5 should not be moved frequently. To achieve this, the dead-zone range is provided as a tracking dead zone within the relative positioning range of the pickup 2 as seen from the carriage 14, and provisions are made to switch the track-following action of the pickup 2 between track-following by the fine actuator 5 alone and track-following by the fine actuator 5 assisted by the coarse actuator 6. More specifically, during tracking, when the pickup 2 is located inside the dead-zone range, tracking is done by the fine actuator 5 alone, and when the dead-zone range is exceeded, tracking is performed by using the coarse actuator 6 and the fine actuator 5 in collaborating fashion. The configuration of the dead zone amplifier 8 for performing this switching will be described with reference to FIG. 3.

Figure 3:
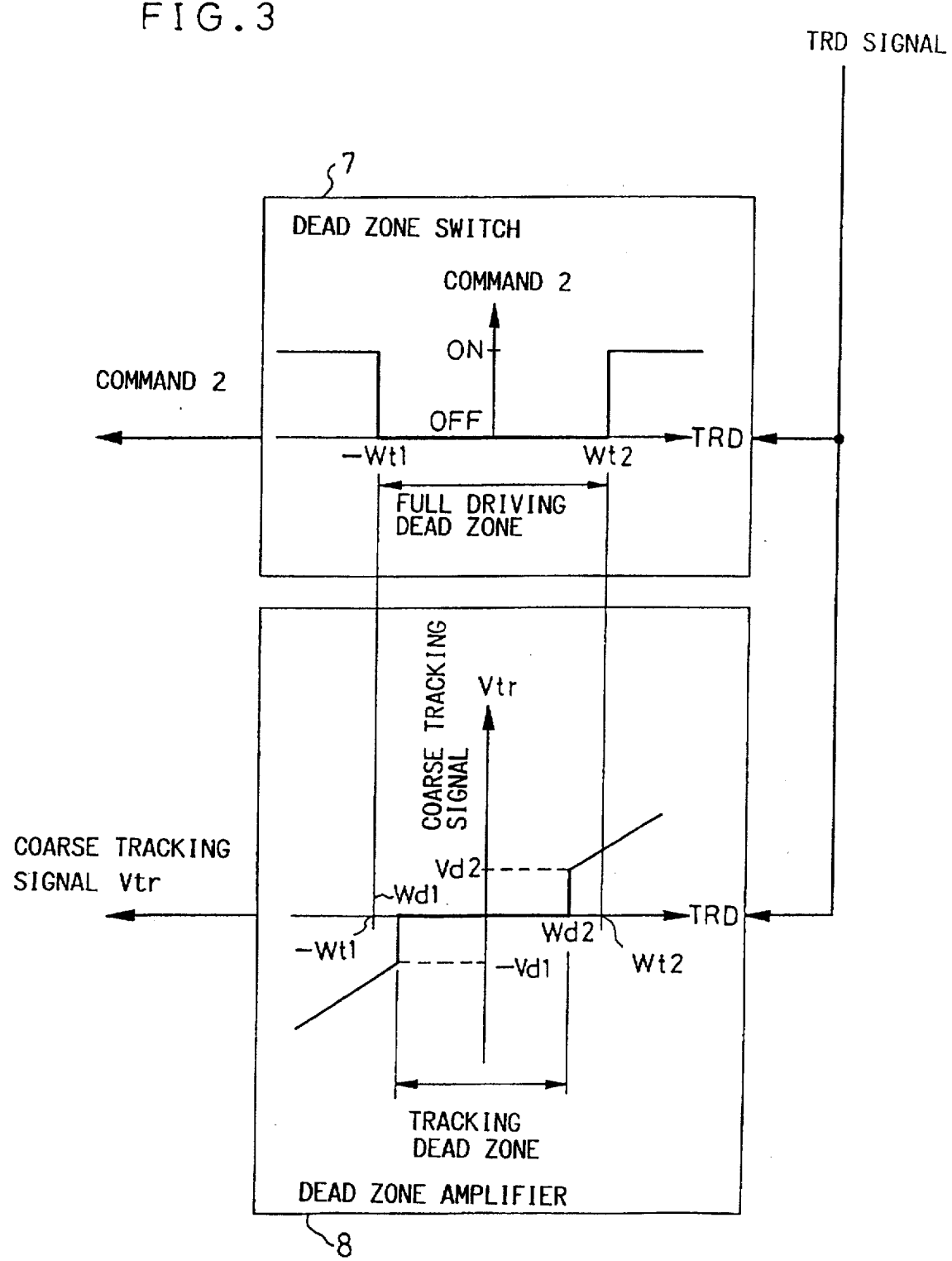
FIG. 3 shows a block diagram of a dead zone switch 7 and a dead zone amplifier 8 in the first embodiment of the present invention.

FIG. 3 is a block diagram showing the configuration of the dead zone switch 7 and dead zone amplifier 8. The dead zone switch 7 accepts the TRD signal at its input and outputs command 2 as a high-speed drive instruction which will be described later. Likewise, the dead zone amplifier 8 accepts the TRD signal at its input and outputs the coarse tracking signal Vtr.

The TRD signal that the phase compensation circuit 10 (FIG. 1) outputs has the characteristic that it changes as a function of the position of the pickup 2 relative to the carriage 14. Using this characteristic, the value of the TRD signal at one end $-Zd1$ of the dead-zone range is designated as $-Wd1$, and the value at the other end $Zd2$ as $Wd2$; likewise, the value of the TRD signal when the pickup 2 is at one end $-Zt1$ of the switch-off range is designated as $-Wt1$, and the value at the other end $Zt2$ as $Wt2$. That is, when the TRD signal is inside a range larger than $-Wd1$ and smaller than $Wd1$, it can be determined that the pickup 2 is positioned inside the dead-zone range, and when the TRD signal is equal to or smaller than $-Wd1$ or equal to or larger than $Wd2$, it can then be determined that the pickup 2 is positioned outside the dead-zone range. Similarly, when the TRD signal is inside a range larger than $-Wt1$ and smaller than $Wt2$, it can be determined that the pickup 2 is positioned inside the switch-off range, and when the TRD signal is equal to or smaller than $-Wt1$ or equal to or larger than $Wt2$, it can be determined that the pickup 2 is positioned outside the switch-off range.

In FIG. 3, the TRD signal is input to the dead zone amplifier 8; if the input TRD signal is inside a range of $-Wd1$ to $Wd2$ which defines the tracking dead zone, the coarse tracking signal Vtr output from the dead zone amplifier 8 is zero. The instant that the input TRD signal exceeds $Wd2$, the dead zone amplifier 8 outputs a signal $Vd2$ for driving the coarse actuator 6 (hereinafter, this signal may be referred to as the coarse tracking signal Vtr). The signal $Vd2$ has a certain value because a bias is applied to allow for the starting voltage with which the coarse actuator 6 starts driving. As the TRD signal increases past $Wd2$, the coarse tracking signal Vtr increases linearly. On the other hand, when the TRD signal drops to $-Wd1$, the dead zone amplifier 8 outputs a negative value $-Vd1$ as the coarse tracking signal Vtr. As the TRD signal becomes smaller than $-Wd1$ (becomes more negative), the coarse tracking signal Vtr increases linearly in the negative sense.

Next, the full driving dead zone of the dead zone switch 7 will be described. When the position of the pickup 2 relative to the carriage 14 is at an end, $-Zt1$ or $Zt2$, of the full driving dead zone, the value of the TRD signal is designated as $-Wt1$ or $Wt2$, respectively. Since the dead-zone range is contained in the switch-off range, as described with reference to FIG. 2, there cannot arise a situation where the tracking dead zone is shifted outside the full driving dead zone. When the TRD signal is inside the full driving dead zone, the dead zone switch does not produce a prescribed output (ON output). When the TRD signal has reached a limit value $-Wt1$ or $Wt2$ of the full driving dead zone, the dead zone switch 7 outputs command 2 as the high-speed drive instruction.

Turning back to FIG. 1, when, during tracking, the TRD signal is inside the tracking dead zone (a region not containing the boundaries designated by $-Wd1$ and $Wd2$) set by the dead zone amplifier 8, the coarse tracking signal Vtr is zero, so that the coarse actuator 6 is not driven and track-following is done by using the fine actuator 5 alone. When the TRD signal reaches a limit value $-Wd1$ or $Wd2$ or goes beyond either limit value, the coarse tracking signal Vtr of a prescribed value is output and tracking is performed by using the coarse actuator 6 and the fine actuator 5 in collaborating fashion.

We have so far described the operation during tracking in which the pickup 2 is made to follow a track on the recording medium 1 according to the first embodiment.

Next, referring to FIG. 1, we will describe the operation during track accessing according to the first embodiment. When a track access start instruction is input to the track access start instruction input port 21, the input port 21 issues command 1 to transmit the track access start instruction. The track access operation begins the instant that the command 1 is issued.

When the command 1 is issued, the coarse-drive selector switch (SWt) 16 is switched from "c" to "d", and at the same time, the coarse driving base signal generating unit 4 outputs a base signal V1 as a slow-speed signal which will be described later.

When the coarse-drive selector switch (SWt) 16 is switched to "d", the signal from the track access fine adjusting unit 3 and the signal from the coarse driving base signal generating unit 4 are superimposed together, and the resulting signal is passed through the invert/noninvert amplifier 39 and directed via the coarse-drive selector switch (SWt) 16 to the coarse-drive amplifier 18 where it is amplified to drive the coarse actuator 6.

Here, the invert/noninvert amplifier 39 is supplied with a track access direction discrimination signal not shown; if the track access direction is from the inner toward the outer circumference of the recording medium 1, the coarse track access signal superimposed with the coarse driving base signal is sent as is to the subsequent stage. Conversely, if the track access direction is from the outer toward the inner circumference, the coarse track access signal superimposed with the coarse driving base signal is inverted for output to the subsequent stage. At the subsequent stage is connected, via the coarse-drive selector switch (SWt) 16, the coarse-drive amplifier 18 where the signal is amplified to drive the coarse actuator 6. The carriage 14 is thus driven in the designated track access direction. The track access direction discrimination signal is obtained from the position of the track the pickup 2 is currently following and the position of the target track.

When the coarse actuator 6 has just begun to perform the track access motion, the fine actuator 5 is still performing control so that the pickup 2 follows the track on the recording medium 1. Then, by the action of the coarse actuator 6, the carriage 14 moves in the track access direction with respect to the position of the pickup 2 in the tracking condition. As a result, the position of the pickup 2 relative to the carriage 14 is displaced in the direction opposite to the track access direction. The instant that the amount of displacement exceeds the switch-off range, the TRD signal becomes −Wt1 or Wt2, and the dead zone switch 7 issues the command 2 as the high-speed drive instruction.

When the command 2 is issued, the coarse driving base signal generating unit 4 outputs a full drive signal V2 which will be described later, and the fine-drive selector switch (SWp) 15 is switched from "a" to "b". At the same time, from the current track position of the pickup 2 and the designated target track position, the target travel distance calculating unit 23 calculates the distance to be traveled, and supplies it to the reference speed signal generating unit 12. The reference speed signal generating unit 12 calculates an optimum reference speed signal on the basis of the distance to be traveled. The speed difference detection unit 13 detects the difference between the moving speed of the pickup 2, detected by the speed detection unit 11, and the speed indicated by the above-calculated reference speed signal, and supplies the difference to the track access fine adjusting unit 3. The track access fine adjusting unit 3 performs the operation to be described later, and supplies a fine-drive fine-adjust signal Vf to the invert/noninvert amplifier 38 and a coarse-drive fine-adjust signal Vc to the invert/noninvert amplifier 39. Here, the invert/noninvert amplifier 38 is supplied with a track access direction discrimination signal not shown; if the track access direction is from the inner toward the outer circumference of the recording medium 1, the amplifier 38 sends the fine track access signal as is to the subsequent stage. Conversely, if the track access direction is from the outer toward the inner circumference, the fine-drive fine-adjust signal is inverted for output to the subsequent stage. In this way, the moving direction of the pickup 2 driven by the fine actuator 5 is made to match the designated track access direction, and the signal routed via the fine-drive selector switch (SWp) 15 is amplified by the fine-drive amplifier 17 to drive the pickup 2.

The operation of the invert/noninvert amplifier 39 has already been described.

Figure 4:
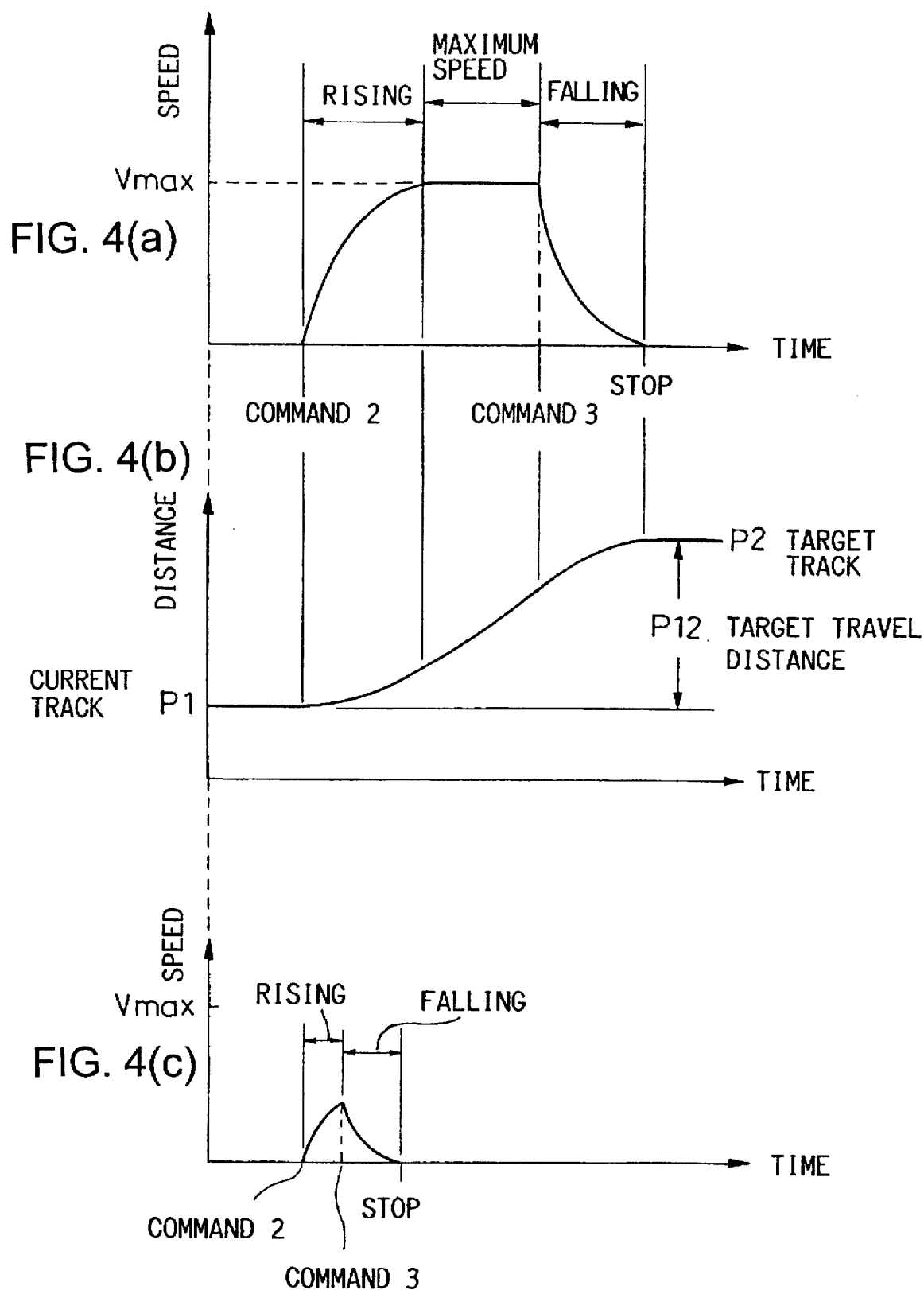
FIGS. 4(a), 4(b) and 4(c) show a schematic diagram showing a reference speed signal from reference speed signal generating unit in the first and second embodiment of the present invention.

The reference speed signal that the reference speed signal generating unit 12 generates will be described below with reference to FIGS. 4(a)–(c).

FIGS. 4(a)–(c) are diagrams showing the reference speed signal that the reference speed signal generating unit 12 generates. In FIGS. 4(a) and 4(c), the abscissa represents the time and the ordinate the pickup speed during track accessing. In FIG. 4(b), the abscissa represents the time and the ordinate the distance that the pickup 2 travels.

An optimum rising speed profile, optimum falling speed profile, and maximum speed of the pickup 2 during track accessing are stored in advance in the reference speed signal generating unit 12.

In FIGS. 1 and 4(a)–4(c), the target travel distance calculating unit 23 detects position P1, where the pickup 2 is located immediately before the initiation of track accessing, from the track information read by the pickup 2, calculates distance P12 to the position P2 of the target track specified as the track access destination, and supplies the calculated result the reference speed signal generating unit 12. Based on the distance P12 and on the rising speed profile, maximum speed Vmax, and falling speed profile of the pickup 2, the reference speed signal generating unit 12 generates the optimum speed signal for the pickup 2. More specifically, the distance S1 to be traveled by the pickup 2 during the track access rise time and the distance S2 to be traveled during the track access fall time are subtracted from the distance P12 (P12−S1−S2); if the resulting difference is positive, the difference is divided by the maximum speed Vmax, to create the reference speed signal with (P12−S1−S2)/Vmax as the maximum speed period. On the other hand, if (P12−S1−S2) yields a negative value, since it is desirable that the pickup 2 begin to decelerate partway through the rise time before reaching the maximum speed, the reference speed signal generating unit 12 prestores a reference speed signal, such as the one shown in the part (c) of FIG. 4, that matches the magnitude of the negative value.

In FIG. 4(a), when the command 2 is issued, the reference speed signal generating unit 12 (FIG. 1) initiates the generation of a reference speed signal. Thereafter, at the time that deceleration is to be started, the reference speed signal generating unit 12 issues command 3, which is sent to the track access fine adjusting unit 3 (FIG. 1). In the case of short-distance track accessing also, as shown in FIG. 4(c), the reference speed signal generating unit 12 initiates the generation of a reference speed signal when the command 2 is issued, and thereafter, at the time that deceleration is to be started, the reference speed signal generating unit 12 issues command 3, which is sent to the track access fine adjusting unit 3.

The reference speed signal thus generated is sent to the speed difference detection unit 13 at the subsequent stage.

FIG. 4(b) shows the travel distance when the pickup 2 moves in accordance with the reference speed signal. Immediately before receiving the command 2, the pickup 2 is positioned over the current track P1; if the pickup 2 accelerates, moves at a constant speed, and then decelerates in accordance with the reference speed signal, the pickup 2 will reach the target track P2 at the end of the track accessing.

From the time the command 1 is issued, until the time the command 2 is issued, the coarse actuator 6 alone is driven for track accessing, while the fine actuator 5 is still in a track-following condition. After the command 2 is issued, however, track accessing is performed by controlling both the fine actuator 5 and the coarse actuator 6. How the control is performed in the first embodiment will be described with reference to FIG. 5.

Figure 5:
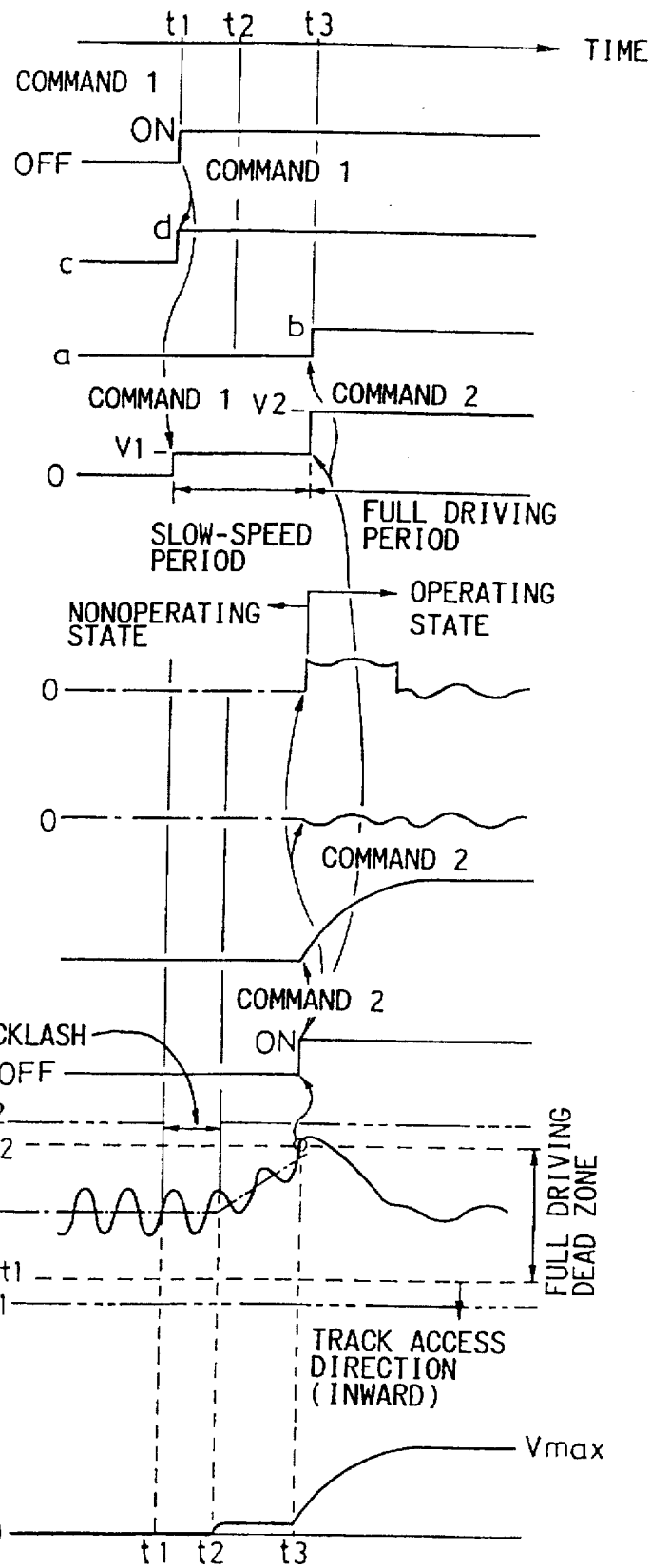
FIG. 5 shows a timing diagram illustrating the operation of the first and second embodiments of the present invention.

FIG. 5 is a timing diagram for signals in the first embodiment.

In FIG. 5, the time is plotted along the abscissa, and from the top to the bottom of the figure are shown timing waveforms for the track access start instruction, the state of the coarse-drive selector switch (SWt) 16, the state of the fine-drive selector switch (SWp) 15, the coarse driving base signal that the coarse driving base signal generating unit 4 generates, the fine-drive fine-adjust signal and coarse-drive fine-adjust signal that the track access fine adjusting unit 3 generates, the reference speed signal that the reference speed signal generating unit 12 generates, the state of the dead zone switch 7, i.e., the command 2 as the high-speed drive instruction, the motion (relative position) of the pickup 2 relative to the carriage 14, and the speed of the carriage 14.

In FIG. 5, first at time t1, the track access start instruction is input to the track access start instruction input port 21 (FIG. 1), upon which the command 1 is issued. By the command 1, the coarse-drive selector switch (SWt) 16 is switched from "c" to "d". At the same time, in response to the command 1, the coarse driving base signal generating unit 4 (FIG. 1) generates a slow-speed signal V1, thus entering a slow-speed period in which the carriage 14 is slid at a slow speed. The slow-speed signal V1 is a signal that makes the coarse actuator 6 generate a driving force that is sufficient to drive the carriage 14, and yet does not cause the pickup 2 to move beyond its movable range even if vibrations are caused in the pickup 2 by the impact when the driving force is abruptly transmitted to the carriage 14 after the worm 19 has rotated idly from the maximum backlash condition. The value of V1 can be obtained in advance by measuring the vibration caused in the pickup 2 due to backlash.

As can be seen from the speed of the carriage 14 shown in FIG. 5, because of the backlash in the worm 19 the driving force is not immediately transmitted to the carriage 14 at time t1 when the coarse actuator 6 is activated for driving. As the coarse actuator 6 is driven, the backlash is gradually taken up, and at time t2 when the backlash is zero, the driving force is transmitted to the carriage 14. Therefore, at time t2, the carriage 14 begins to move in the track access direction.

When we observe the graph in FIG. 5 illustrating the motion of the pickup 2 relative to the carriage 14, we see that the relative displacement of the pickup 2 as seen from the carriage 14 is oscillating due to the eccentricity of the recording medium 1 being rotated by the spindle motor 20. Immediately after time t1, the pickup 2 is still following the track on the recording medium 1 by the action of the fine actuator 5, but since the carriage 14 on which the fine actuator 5 is mounted remains stationary because of the presence of the backlash, the relative position of the pickup 2 averaged over that period remains the same. However, at time t2 when the backlash is zero, the carriage 14 begins to move, and with the movement of the carriage 14, the pickup 2 gradually moves, while oscillating, in the direction opposite to the track access direction.

In FIG. 5, if the track access direction is toward the inner circumference of the recording medium 1, for example, the limit of the full driving dead zone in the direction opposite to the track access direction is at Zt2 (see the graph illustrating the motion of the pickup 2). At time t3 when the pickup 2 has just reached the limit Zt2, the TRD signal (FIG. 3) becomes Wt2, in response to which the dead zone switch 7 outputs the command 2 as the high-speed drive instruction.

At time t3 when the command 2 is issued, the fine-drive selector switch (SWp) 15 is switched from "a" to "b", and remains connected to "b" until the time (not shown) when the track access is completed, that is, until the pickup 2 reaches the target track.

Also at time t3, the coarse driving base signal being output from the coarse driving base signal generating unit 4 changes from the slow-speed signal V1 to the full drive signal V2, thus entering a full driving period in which the carriage 14 slid at a high speed. And the coarse driving base signal remains at the level of the full drive signal V2 until the track access speed of the pickup 2 is reduced before the completion of the track access.

Further, at time t3 when the command 2 is issued, the reference speed signal generating unit 12 initiates the generation of the reference speed signal, and for a period from time t3 to the time (not shown) when the track access is completed, the track access fine adjusting unit 3, which has been in the nonoperating condition, is put in an operating condition and, based on the speed difference between the pickup 2 and the reference speed signal, controls the coarse actuator 6 and, if necessary, the fine actuator 5 by performing the operation hereinafter described. For a predetermined length of time from time t3, a bias is applied to the fine-drive fine-adjust signal output from the track access fine adjusting unit 3. The purpose of this will be described later.

The operation of the track access fine adjusting unit 3 will now be described with reference to FIG. 6.

Figure 6:
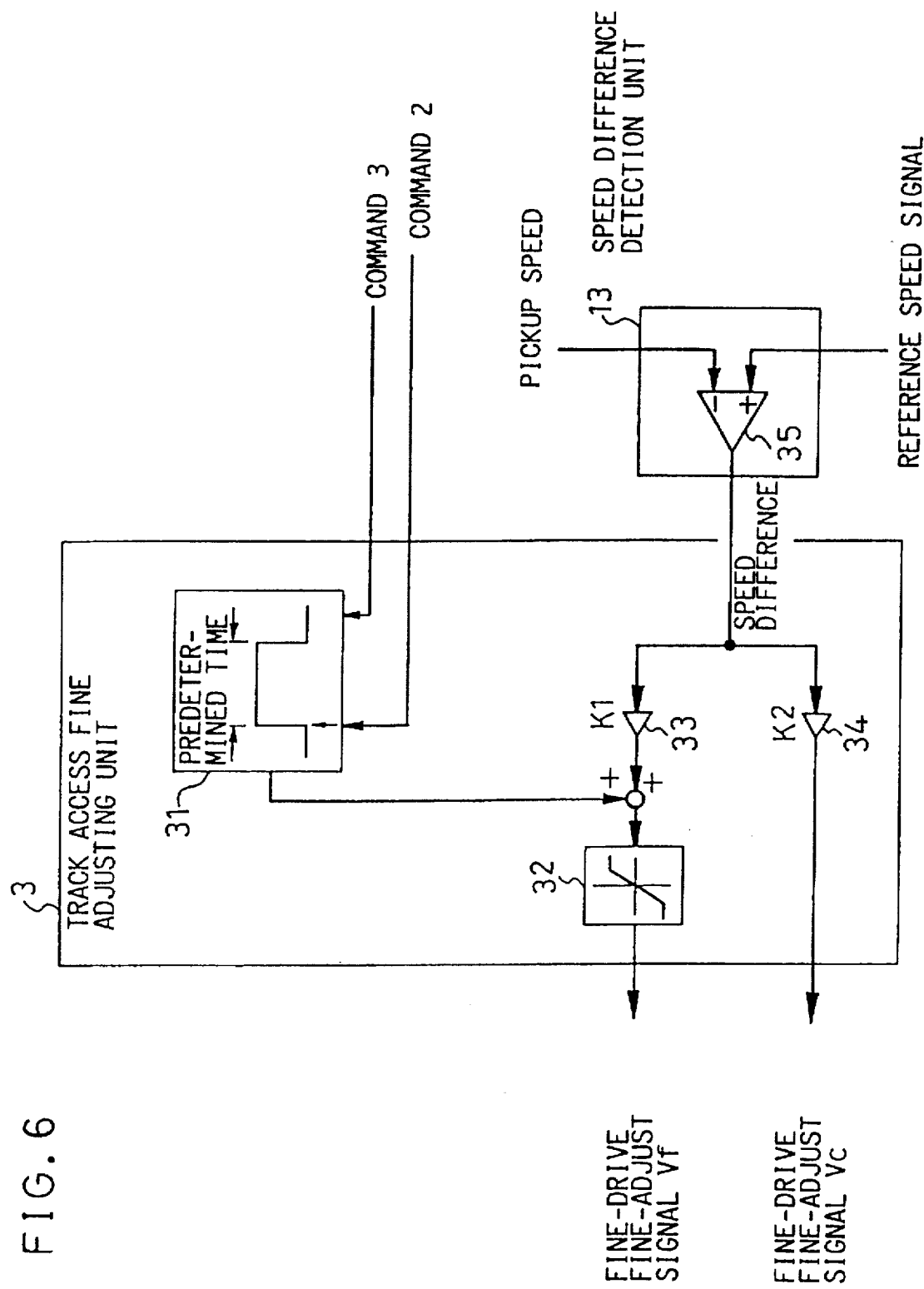
FIG. 6 shows a diagram showing the configuration of a track access fine adjusting unit 3 and a speed difference detection unit 13 in the first and second embodiment of the present invention.

FIG. 6 is a diagram illustrating conceptually the operation of the track access fine adjusting unit 3. The adjusting unit 3 comprises a fine-drive bias unit 31, a protection circuit 32, a fine-drive gain control 33, and a coarse-drive gain control 34.

When the command 2 as the high-speed drive instruction is received, the fine-drive bias unit 31 produces a bias output for a predetermined length of time. The purpose of the bias output is to prevent the pickup 2, which by time t3 has moved rearward relative to the carriage 14 when viewed along the track access direction, from moving further in the direction opposite to the track access direction in reaction to the driving of the carriage 14. More specifically, the purpose of applying the bias for the predetermined time is to have the fine actuator 5 generate a driving force sufficient to quickly move the pickup 2, which by time t3 has moved rearward relative to the carriage 14 when viewed along the track access direction, to a position substantially in the center of its movable range relative to the carriage 14 in cooperation with the force of the spring 22; the bias and the predetermined time length were able to be obtained experimentally. However, when the command 3 is issued from the reference speed signal generating unit 12, the fine-drive bias unit 31 immediately stops the production of the bias output even if the end of the predetermined time is not reached.

On the other hand, the speed difference signal supplied from the speed difference detection unit 13 is adjusted through the fine-drive gain control 33, summed with the fine-drive bias, passed through the protection circuit 32, and output to the stage next to the track access fine adjusting unit 3 as a fine track access signal, or more specifically, as the fine-drive fine-adjust signal Vf. The protection circuit 32 is provided to prevent the speed difference signal adjusted through the fine-drive Gain control 33 and superimposed with the fine-drive bias from exceeding the maximum allowable input of the fine actuator 5.

The speed difference signal supplied from the speed difference detection unit 13 is also adjusted through the coarse-drive gain control 34 and output as the coarse-drive fine-adjust signal Vc to the stage next to the track access fine adjusting unit 3.

In FIG. 2, the range from $-Zd1$ to $Zd2$, defining the tracking dead zone of the dead zone amplifier 8, was set so as not to exceed the range from $-Zt1$ to $Zt2$ defining the full driving dead zone of the dead zone switch 7. The reason is that, if the tracking dead zone of the dead zone amplifier 8 is set exceeding the range of the full driving dead zone, trouble may occur in the track access motion of the pickup 2 in the following case, for example; that is, when, during tracking, the pickup 2 is located at a position near the dead zone and the TRD signal at that position is inside the tracking dead zone of the dead zone amplifier 8 but outside the full driving dead zone of the dead zone switch 7. In such a case, since the dead zone switch 7 outputs the command 2 the instant the track access start instruction is issued, the fine actuator 5 alone will be driven in the track access direction while the coarse actuator 6 remains stationary because of the backlash between the coarse actuator 6 and the carriage 14, the resulting possibility being that the pickup 2 may run away out of control. Furthermore, if, at the time of the issuance of the track access start instruction, the pickup 2 is displaced forward relative to the carriage 14 in the track access direction when it should be displaced rearward relative to the carriage 14 when viewed along the track access direction, the dead zone switch 7 may output the command 2, leading to an erroneous track access motion in the subsequent process. The tracking dead zone should therefore be set so as not to exceed the range of the full driving dead zone to prevent such troubles in the track access motion.

The above-described operation of the first embodiment will be explained below with reference to the flowchart of FIG. 7.

Figure 7:
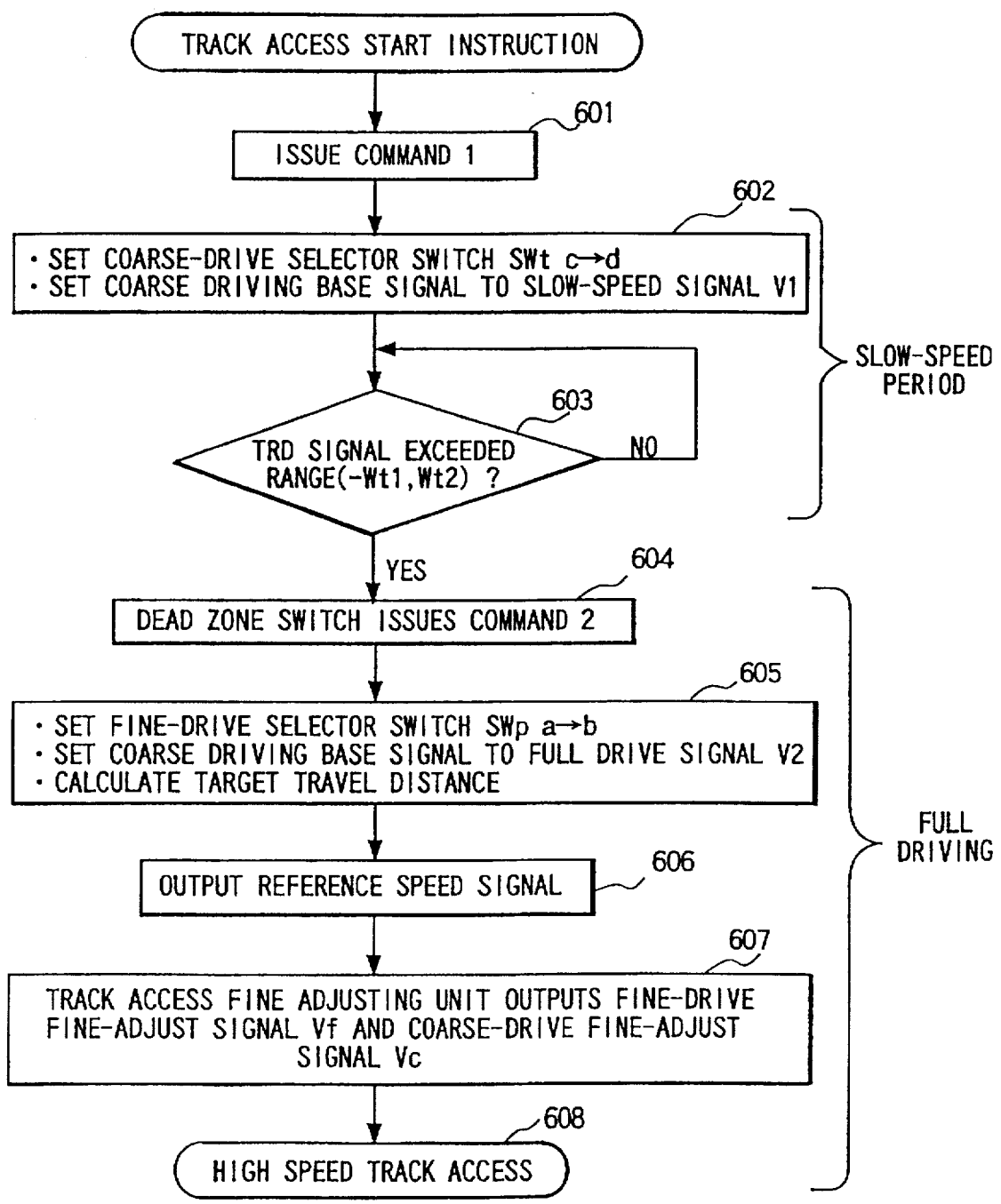
FIG. 7 shows a flowchart for the first embodiment of the present invention.

FIG. 7 is a flowchart illustrating the operation in the first embodiment. The configuration of the first embodiment shown in the block diagram of FIG. 1 is implemented partly in hardware and partly in software. The following description of the flowchart deals with functions implemented in hardware as well as functions implemented in software.

First, when the track access start instruction is input, the track access start instruction input port 21 issues the command 1 as the track access start instruction (step 601). In response to the command 1, the coarse-drive selector switch (SWt) 16 is switched from "c" to "d", and the coarse driving base signal generating unit 4 outputs the slow-speed signal V1 (step 602). Next, the dead zone switch 7 monitors the TRD signal to detect whether the TRD signal has exceeded the range of $-Wt1$ to $Wt2$, that defines the full driving dead zone (step 603).

When the TRD signal goes outside the full driving dead zone, that is, when the TRD signal becomes smaller than $-Wt1$ or larger than $Wt2$, the dead zone switch 7 issues the command 2 as the high-speed drive instruction (step 604). When the command 2 is issued, the fine-drive selector switch (SWp) 15 is switched from "a" to "b", the coarse driving base signal generating unit 4 outputs the full drive signal V2, and the target travel distance calculating unit 23 calculates the target travel distance from the current track position of the pickup 2 and the target track position (step 605). Based on the target travel distance, the reference speed signal generating unit 12 generates the reference speed signal, and supplies it to the speed difference detection unit 13 (step 606). The calculation of the target travel distance in step 605 and the production of the reference speed signal are actually performed by software means such as a CPU.

When the command 2 is issued, the track access fine adjusting unit 3 produces the fine-drive fine-adjust signal Vf and coarse-drive fine-adjust signal Vc on the basis of the speed difference between the pickup 2 and the reference speed signal, output from the speed difference detection unit 13. When the command 3 is issued, however, the fine-drive bias unit 31 in the track access fine adjusting unit 3 (FIG. 6) immediately stops the production of the bias output even if it is in the middle of the bias output process.

With the above-described series of operations, the coarse actuator 6 is driven with the signal produced by superimposing the coarse-drive fine-adjust signal Vc on the full drive signal V2 and by amplifying the resulting signal through the coarse-drive amplifier 18, and the fine actuator 5 is driven with the signal produced by amplifying the fine-drive fine-adjust signal Vf through the fine-drive amplifier 17.

Turning back to FIG. 5, when we observe the motion of the pickup 2 relative to the carriage 14, we see that the pickup 2 begins to accelerate in the track access direction at time t3 and, after overshooting slightly, comes to rest at a position approximately in the center of its movable range with respect to the carriage 14.

As for the speed of the carriage 14, during the period from time t2 to t3 the carriage 14 moves at slow speed, but at time t3, the speed begins to increase rapidly. From time t3 onward, the fine actuator 5 and the coarse actuator 6 are controlled in such a manner as to reduce the difference between the speed of the pickup 2 relative to the track on the recording medium 2 and the speed indicated by the reference speed signal. After time t3, since no backlash is present, primarily the coarse actuator 6 assumes control to make the moving speed of the pickup 2 match the reference speed signal being output after time t3. This achieves fast track accessing while effectively suppressing vibrations in the pickup 2.

As described above, in the first embodiment, the switch-off range of the position of the pickup 2 relative to the carriage 14 cannot be narrower than the dead-zone range, and by monitoring the TRD signal, it can be determined whether the pickup 2 is located inside the switch-off range whose limits are defined by the signals $-Wt1$ and $Wt2$. Accordingly, during tracking, the pickup 2 is controlled within the dead-zone range by the operation of the dead zone amplifier 8, and during a period immediately after the start of track accessing, only the coarse actuator 6 is driven, while the pickup 2 is controlled within the switch-off range by the operation of the dead zone switch 7 and keeps following a track on the recording medium 1. The track access motion of the pickup 2 is started only after the backlash becomes zero and after the pickup 2 is moved outside the switch-off range with the movement of the carriage 14. Therefore, if there exists backlash immediately after the track access start instruction is issued, the pickup 2 does not run away out of control and fast and stable track accessing can thus be achieved.

<<Second Embodiment>>

Figure 8:
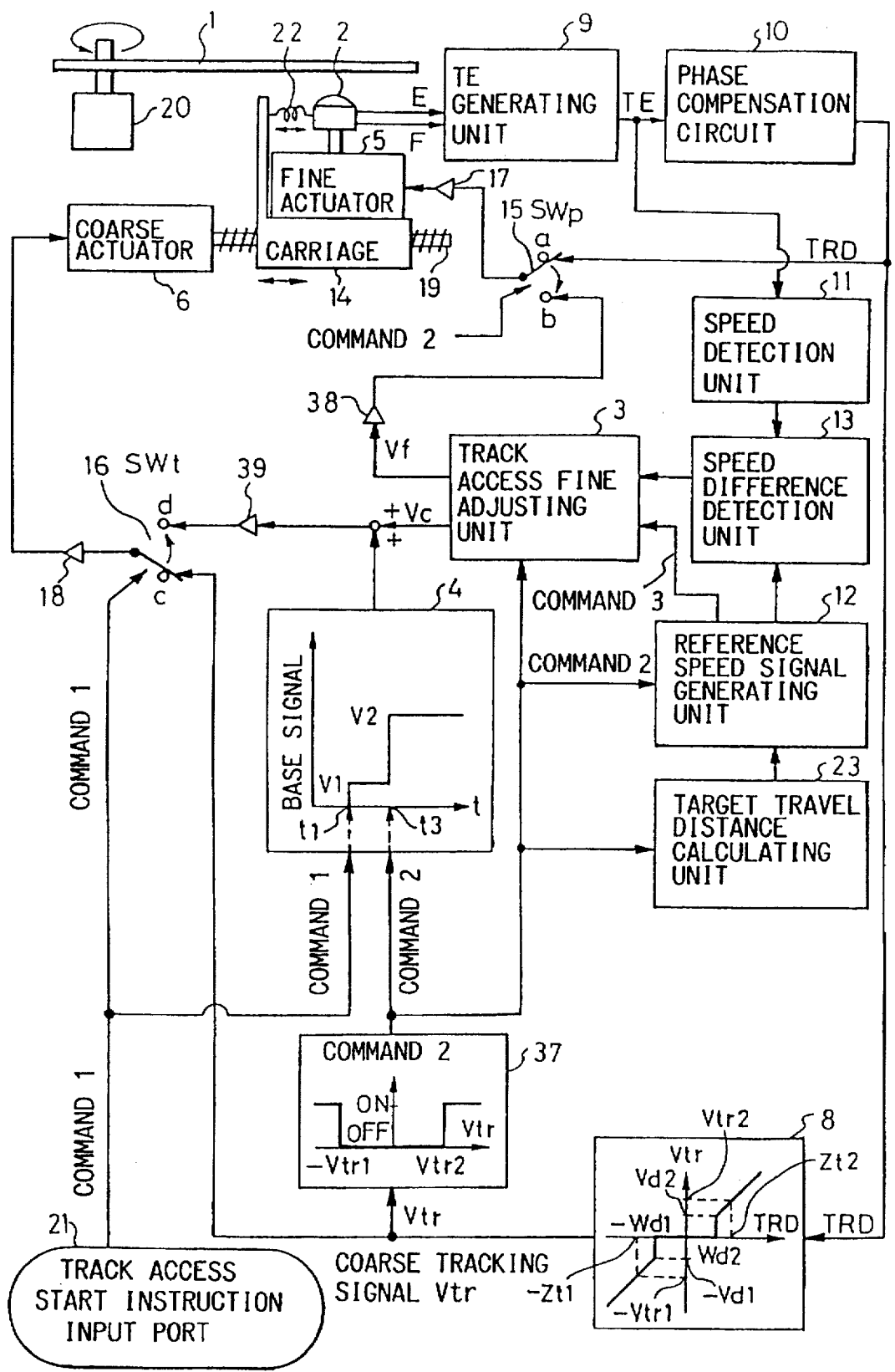
FIG. 8 shows a functional block diagram of a track access apparatus according to the second embodiment of the present invention.

FIG. 8 is a functional block diagram of a track access apparatus according to a second embodiment of the present invention. The difference from FIG. 1 is that the dead zone switch 7 in the first embodiment is omitted, and instead, a dead zone switch 37 is provided. Otherwise, the configuration is the same as that shown in FIG. 1; therefore, the same parts are designated by the same reference numerals and the explanations given in the first embodiment will be applied for such parts.

In FIG. 8, the dead zone switch 37 is inserted after the dead zone amplifier 8, accepts the coarse tracking signal Vtr at its input, and issues the command 2 to the track access fine adjusting unit 3, coarse driving base signal generating unit 4, reference speed signal generating unit 12, and target travel distance calculating unit 23.

The operation of the block circuit shown in FIG. 8 is the same as that of the first embodiment, except that the dead zone switch 7 in FIG. 1 is replaced by the dead zone switch 37.

In the second embodiment, as in the first embodiment, when the TRD signal is inside the tracking dead zone from −Wd1 to Wd2, the coarse tracking signal Vtr that the dead zone amplifier 8 outputs is zero, and hence, the coarse actuator 6 is not driven.

The dead zone amplifier 8 outputs the coarse tracking signal Vtr the instant that the input TRD signal exceeds the tracking dead zone. Since the coarse-drive selector switch (SWt) 16 is connected to "c", the coarse tracking amplifier Vtr is input to the coarse-drive amplifier 18 to drive the coarse actuator 6.

The coarse actuator 6 rotates in the backward or forward direction depending on whether the applied voltage is positive or negative. The driving force of the coarse actuator 6 is transmitted via the worm 19 to drive the carriage 14 toward the outer or inner circumference of the recording medium 1 during track accessing.

With the above construction, during tracking, when the position of the pickup 2 relative to the carriage 14 is inside the dead-zone range, the value of the TRD signal is inside the dead zone range of −Wd1 to Wd2 set by the dead zone amplifier 8. In the dead zone amplifier 8, when the TRD signal is inside the range larger than −Wd1 and smaller than Wd2, the coarse tracking signal Vtr is zero, and the coarse actuator 6 remains stationary. In this case, tracking is performed by the fine actuator 5 alone. On the other hand, when the TRD signal is equal to or smaller than −Wd1 or equal to or larger than Wd2, the coarse tracking signal Vtr is generated, and tracking is performed by using the coarse actuator 6 and the fine actuator 5 in collaborating fashion.

Figure 9:
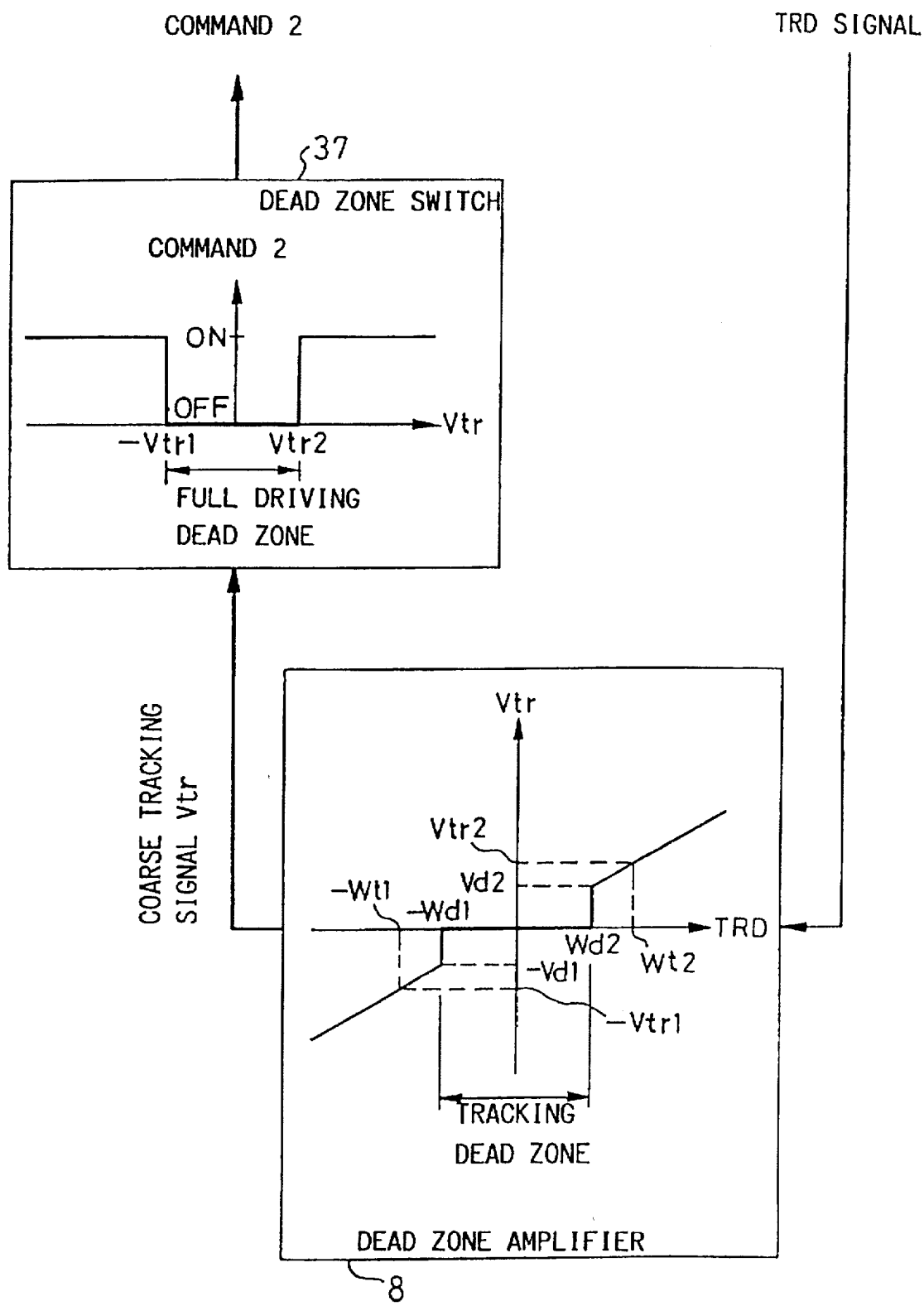
FIG. 9 shows a block diagram of a dead zone amplifier 8 and a dead zone switch 37 in the second embodiment of the present invention.

Next, the full driving dead zone in the dead zone switch 37 of the second embodiment will be described with reference to FIG. 9. FIG. 9 is a block diagram showing a signal flow in the dead zone amplifier 8 and dead zone switch 37. In FIG. 9, the dead zone amplifier 8 accepts the TRD signal from the phase compensation circuit 10 (FIG. 8), and outputs the coarse tracking signal Vtr.

When the TRD signal is inside the tracking dead zone between −Wd1 and Wd2, the Coarse tracking signal Vtr is zero. When the TRD signal is at Wd2, Vd2 is output as the coarse tracking signal Vtr. As the TRD signal increases past Wd2, the coarse tracking signal Vtr increases linearly with increasing TRD signal. When the TRD signal is at −Wd1, the output of the coarse tracking signal Vtr is −Vd1. When the TRD signal drops below −Wd1, the coarse tracking signal Vtr increases linearly in the negative sense as the TRD signal becomes more negative.

The TRD signal takes a value within a range of −Wt1 to Wt2 when the position of the pickup 2 relative to the carriage 14 is inside the switch-off range. Here, the tracking dead zone from −Wd1 to Wd2 is contained in the range of −Wt1 to Wt2. In the dead zone amplifier 8, the coarse tracking signal is designated as −Vtr1 when the TRD signal is at −Wt1, and as Vtr2 when it is at Wt2.

The dead zone switch 37 accepts at its input the coarse tracking signal Vtr from the dead zone amplifier 8. The range from −Vtr1 to Vtr2 of the coarse tracking signal Vtr is set as the full driving dead zone. The dead zone switch 37 does not issue command 2 when the coarse tracking signal Vtr is inside the full driving dead zone, that is, inside a range larger than −Vtr1 and smaller than Vtr2. When the coarse tracking signal Vtr moves outside the full driving dead zone, that is, when the coarse tracking signal Vtr becomes equal to or smaller than −Vtr1 or equal to or larger than Vtr2, the dead zone switch 2 outputs the command 2 as the high-speed drive instruction.

Turning back to FIG. 8, when the command 2 is output from the dead zone switch 37, the fine-drive selector switch (SWp) 15 is connected to "b", and at the same time, the target travel distance calculating unit 23 calculates the position of the pickup 2 immediately before the initiation of track accessing from the track information read by the pickup 2, calculates the distance from the current pickup position to the target track, and supplies the result to the reference speed signal generating unit 12. Further, in response to the command 2, the reference speed signal generating unit 12 initiates the generation of the reference speed signal. The method of reference speed signal generation is the same as that described in detail in the first embodiment. When the reference speed signal begins to fall, the reference speed signal generating unit 12 issues command 3 to the track access fine adjusting unit 3. The commands 2 and 3 have the same functions on the fine-drive bias unit 31 in the track access fine adjusting unit 3 as those described in the first embodiment.

The track access apparatus of the second embodiment uses the dead zone switch 37 in place of the dead zone switch 7 used in the first embodiment. The timing of its operation is the same as that shown in the timing diagram of FIG. 5 in the first embodiment. That is, after the initiation of track accessing, when the pickup 2 is located inside the full driving dead zone, the fine actuator 5 continues tracking and the coarse actuator 6 alone is moved in the track access direction. Starting at the instant the pickup 2 moves outside the full driving dead zone, the track access operation hereinafter described is performed by using the coarse actuator 6 and the fine actuator 5 in collaborating fashion.

Figure 10:
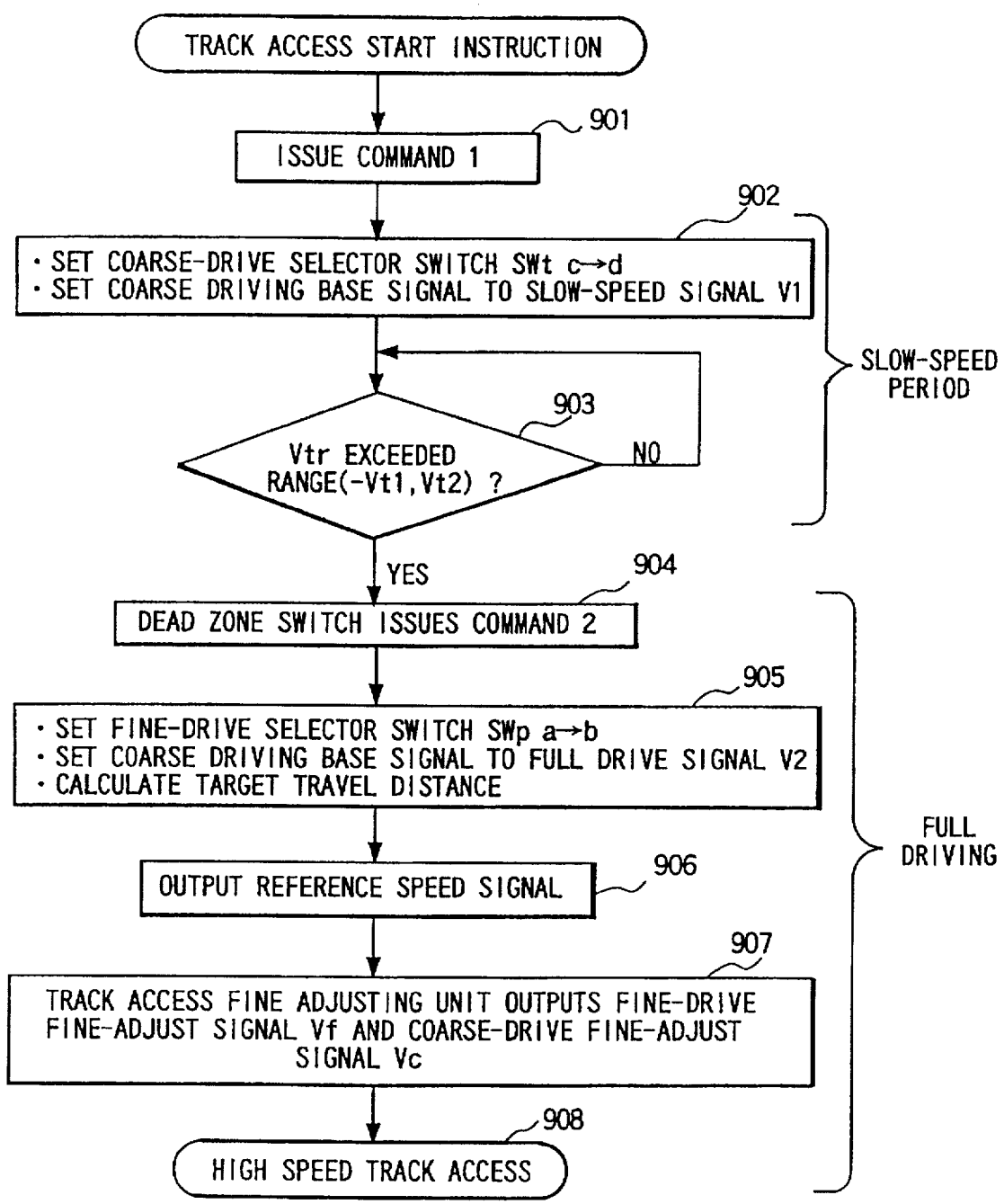
FIG. 10 shows a flowchart for the second embodiment of the present invention.

The operation of the second embodiment is illustrated in the flowchart of FIG. 10. As in the first embodiment, the configuration shown in the block diagram of FIG. 8 is implemented partly in hardware and partly in software. The following description of the flowchart deals with functions implemented in hardware as well as functions implemented in software.

FIG. 10 is a flowchart illustrating the operational flow in the second embodiment. When the track access start instruction is input, the command 1 as the track access start instruction is issued (step 901). In response to the command 1, the coarse-drive selector switch (SWt) 16 is switched from "c" to "d", and the coarse driving base signal generating unit 4 outputs the slow-speed signal V1 (step 902). Next, the dead zone switch 37 monitors the coarse tracking signal Vtr (step 903), and issues the command 2 as the high-speed drive instruction when the coarse tracking signal Vtr becomes equal to or smaller than −Vtr1 or equal to or larger than Vtr2 (step 904).

When the command 2 is issued, the fine-drive selector switch (SWp) 15 is switched from "a" to "b", the coarse driving base signal generating unit 4 outputs the full drive signal V2, and the target travel distance calculating unit 23 calculates the target travel distance from the current track position of the pickup 2 and the target track position (step 905). Based on the target travel distance, the reference speed signal generating unit 12 generates the reference speed signal, and supplies it to the speed difference detection unit 13 (step 906). When the command 2 is issued, the track access fine adjusting unit 3 produces the fine-drive fine-adjust signal Vf and coarse-drive fine-adjust signal Vc on the basis of the speed difference between the pickup 2 and the reference speed signal, output from the speed difference detection unit 13 (step 907). When the command 3 is issued, however, the fine-drive bias unit 31 in the track access fine adjusting unit 3 (FIG. 6) immediately stops the production of the bias output even if it is in the middle of the bias output process.

With the above-described series of operations, the coarse actuator 6 (FIG. 8) is driven with the signal produced by superimposing the coarse-drive fine-adjust signal Vc on the full drive signal V2 and by amplifying the resulting signal through the coarse-drive amplifier 18, and the fine actuator 5 is driven with the signal produced by amplifying the fine-drive fine-adjust signal Vf through the fine-drive amplifier 17.

As described above, in the second embodiment, the coarse tracking signal Vtr is input to the dead zone switch 37; in this configuration, since the switch-off range of the position of the pickup 2 relative to the carriage 14 cannot be narrower than the dead-zone range, the presence of signals −Vtr and Vtr2 corresponding to the limits of the switch-off range can be confirmed by monitoring the coarse tracking signal Vtr. Accordingly, it can be determined, based on the coarse tracking signal Vtr, whether the pickup 2 is located inside the switch-off range.

During tracking, the pickup 2 is controlled within the dead-zone range by the operation of the dead zone amplifier 8, and during a period immediately after the initiation of track accessing, only the coarse actuator 6 is driven while the pickup 21 is controlled within the switch-off range by the operation of the dead zone switch 37 and keeps following a track on the recording medium 1. The track following motion of the pickup 2 is started only after the backlash becomes zero and after the pickup 3 is moved outside the switch-off range with the movement of the carriage 14. Therefore, if there exists backlash immediately after the track access start instruction is issued, the pickup 2 does not run away out of control. Fast and stable track accessing is thus made possible.

<<Third Embodiment>>

Figure 11:
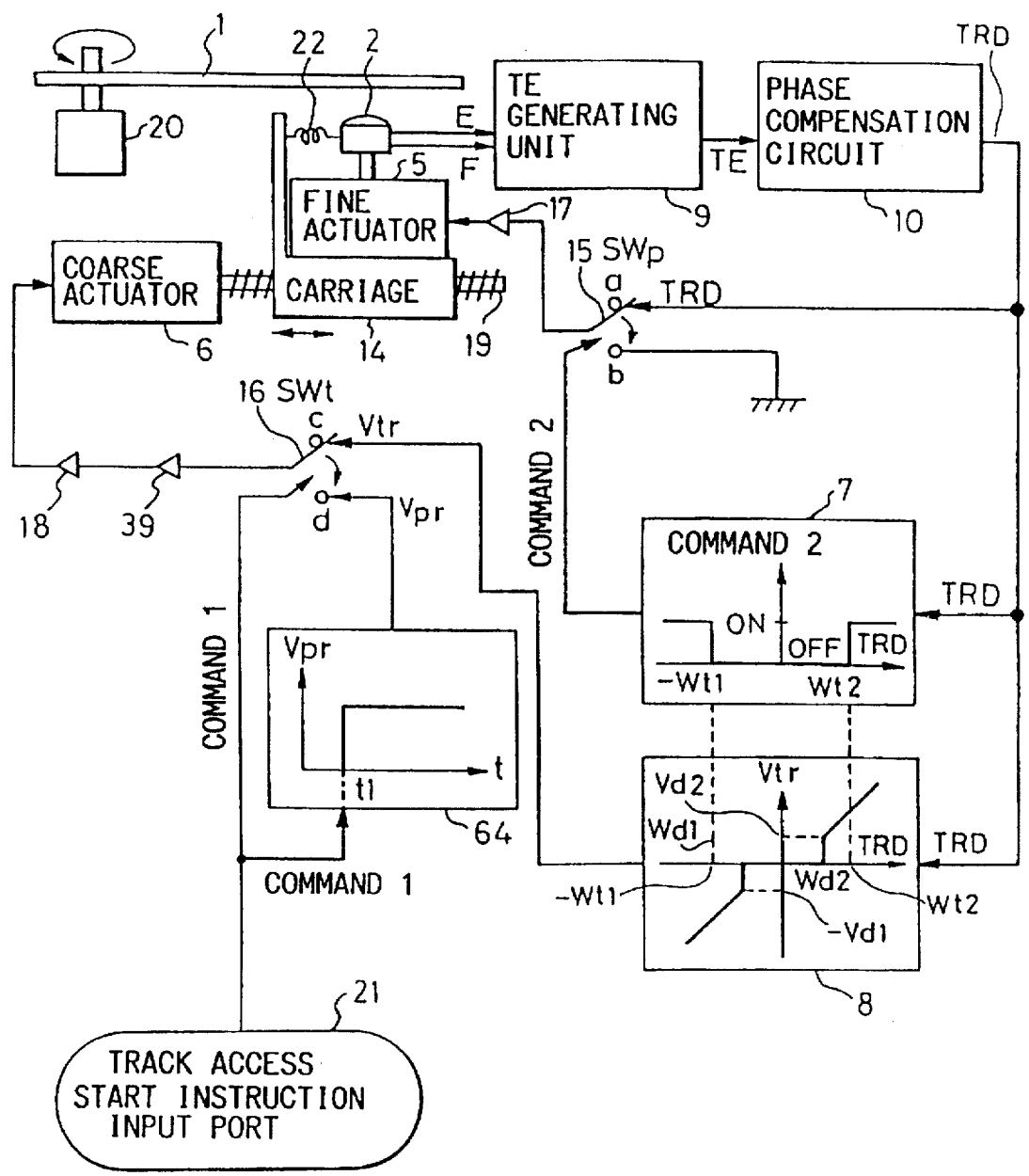
FIG. 11 shows a functional block diagram of a track access apparatus according to a third embodiment of the present invention.

FIG. 11 is a functional block diagram of a track access apparatus according to a third embodiment of the present invention.

In the figure, the recording medium 1, a pickup 2, a fine actuator 5, a coarse actuator 6, a dead zone switch 7, a dead zone amplifier 8, TE generating unit 9, a phase compensation circuit 10, a carriage 14, a fine-drive selector switch (SWp) 15, a coarse-drive selector switch (SWt) 16, a fine-drive amplifier 17, a coarse-drive amplifier 18, a worm 19, a spindle motor 20, a track access start instruction input port 21, a spring 22, and an invert/noninvert amplifier 39 are the same as the corresponding parts described in the first embodiment, and the explanations Given in the first embodiment will be applied for such parts. The difference of the third embodiment is in the provision of a coarse driving signal generating unit 64 whose output characteristic is different from that of the corresponding part in the first and second embodiments. Furthermore, the circuit configuration operating in response to the commands 1 and 2 is different from the foregoing embodiments.

In the third embodiment, the TE generating unit 9 and the phase compensation circuit 10 are used as means for detecting the position of the pickup 2 relative to the carriage 14 as in the case of the first embodiment. And, the TRD signal is used as a signal indicating the relative position of the pickup 2.

In FIG. 11, the dead zone switch 7, to which the TRD signal is input, outputs the command 2 directly to the fine-drive selector switch (SWp) 15. The coarse driving signal generating unit 64, in response to the command 1, outputs a coarse driving signal Vpr which is applied to "d" on the coarse-drive selector switch (SWt) 16. The invert/noninvert amplifier 39 is located after the coarse-drive selector switch (SWt) 16 and before the coarse-drive amplifier 18. Terminal "b" on the fine-drive selector switch (SWp) 15 is grounded.

The operation during tracking in which the pickup 2 is made to follow a track on the recording medium 1 will be described below with reference to FIG. 11. During tracking, the fine-drive selector switch (SWp) 15 is connected to "a", and the coarse-drive selector switch (SWt) 16 is connected to "c".

The pickup 2 is moved in the track access direction by means of the fine actuator 5 mounted on the carriage 14. Within the movable range of the pickup 2 relative to the carriage 14, the switch-off range and dead-zone range are set, as in the first embodiment. The relationship between the movable range of the pickup 2 and the switch-off range and the dead-zone range is the same as described with reference to FIG. 2, and therefore, explanation will not be repeated here.

The functions of the thus set first and second ranges will be described with reference to FIG. 11.

In FIG. 11, the pickup 2 in tracking follows a track on the recording medium 1; at this time, the TRD signal output from the phase compensation circuit 10 is routed via the fine-drive selector switch (SWp) 15 and input to the fine-drive amplifier 17 where the signal is amplified to drive the fine actuator 5.

At the same time, the TRD signal is also supplied to the dead zone amplifier 8. The dead zone amplifier 8 outputs a coarse tracking signal Vtr which is routed via the coarse-drive selector switch (SWt) 16, passed through the invert/noninvert amplifier 39, and input to the coarse-drive amplifier 18. The signal Vtr is amplified by the coarse-drive amplifier 18 to drive the coarse actuator 6.

The coarse actuator 6 rotates in the backward or forward direction depending on Whether the applied voltage is positive or negative. The driving force of the coarse actuator 6 is transmitted via the worm 19 and drives the carriage 14 toward the outer circumference or inner circumference of the recording medium during track accessing. For a minute movement of the pickup 2, the fine actuator 5, which is capable of controlling fine positioning with good accuracy, primarily handles the operation, and it is desirable that the coarse actuator 6 with a relatively low positioning accuracy compared with the fine actuator 5 should not be moved frequently. To achieve this, the dead-zone range is provided as a tracking dead zone within the positioning range of the pickup 2 relative to the carriage 14, and the track-following action of the pickup 2 is switched between track-following by the fine actuator 5 alone and track-following by the fine actuator 5 assisted by the coarse actuator 6.

More specifically, during tracking, when the pickup 2 is located inside the dead-zone range, tracking is done by the fine actuator 5 alone, and when the dead-zone range is exceeded, tracking is performed by using the coarse actuator 6 and the fine actuator 5 in collaborating fashion. The configuration and function of the dead zone amplifier 8 for performing this switching have already been explained in the description of the first embodiment with reference to FIG. 3, and therefore, explanation will not be repeated here.

Next, the operation during track accessing according to the third embodiment will be described with reference to FIG. 11.

When the track access start instruction is input to the track access start instruction input port 21, the input port 21 issues command 1 to transmit the track access start instruction. The track access operation begins the instant that the command 1 is issued.

When the command 1 is issued, the coarse-drive selector switch (SWt) 16 is switched from "c" to "d", and at the same time, the coarse driving signal generating unit 64 outputs a signal Vpr (to be described later) for driving the coarse actuator 6.

When the coarse-drive selector switch (SWt) 16 is switched to "d", the signal from the coarse driving signal generating unit 64 is passed via the switch 16 and the invert/noninvert amplifier 39 and input to the coarse-drive amplifier 18 where it is amplified to drive the coarse actuator 6. Here, the invert/noninvert amplifier 39 is supplied with a track access direction discrimination signal not shown; if the track access direction is from the inner toward the outer circumference of the recording medium 1, the coarse driving signal is sent as is to the subsequent stage. Conversely, if the track access direction is from the outer toward the inner circumference, the coarse driving signal is inverted for output to the subsequent stage. The signal is amplified by the coarse-drive amplifier 18 at the subsequent stage and fed to the coarse actuator 6 which then drives the carriage 14 in the designated track access direction. The track access direction discrimination signal is obtained from the position of the track the pickup 2 is currently following and the position of the target track.

When the coarse actuator 6 has just begun to perform the track access motion, the fine actuator 5 is still performing control so that the pickup 2 follows the track on the recording medium 1. Then, by the action of the coarse actuator 6, the carriage 14 begins to move in the track access direction with respect to the position of the pickup 2 in the tracking condition. As a result, the position of the pickup 2 relative to the carriage 14 is displaced in the direction opposite to the track access direction. The instant that the amount of displacement has reached or exceeded either limit ($-Zt1$ or $Zt2$) of the switch-off range shown in FIG. 2, the TRD signal becomes $-Wt1$ or $Wt2$, and the dead zone switch 7 issues the command 2 as the high-speed drive instruction. When the command 2 is issued, the fine-drive selector switch (SWp) 15 is switched from "a" to "b".

From the time the command 1 is issued, until the time the command 2 is issued, the coarse actuator 6 alone is driven for track accessing, while the fine actuator 5 is still in a track-following condition. After the command 2 is issued, however, track accessing is performed by controlling both the fine actuator 5 and the coarse actuator 6.

How the control is performed in the third embodiment will be described with reference to FIG. 12.

Figure 12:
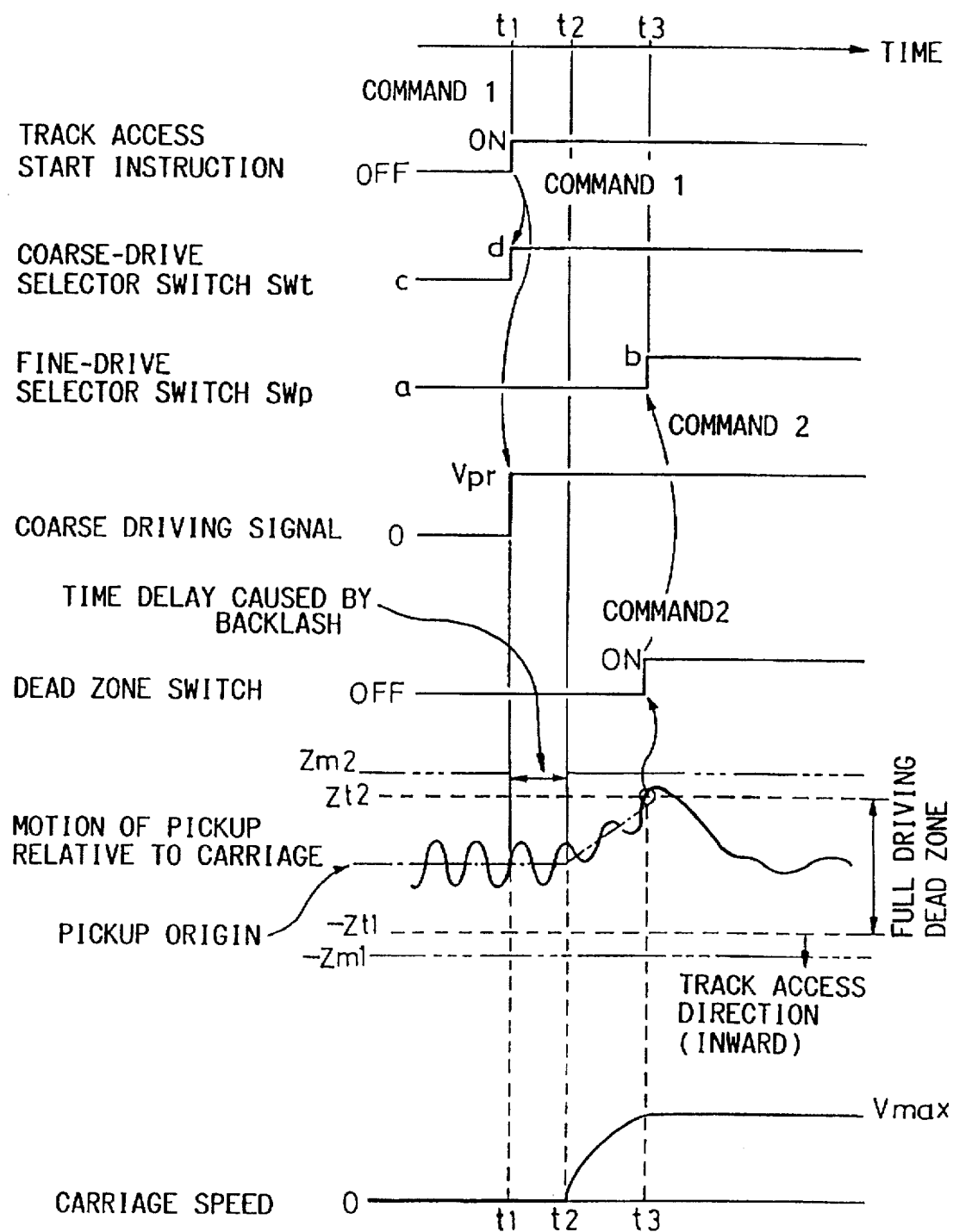
FIG. 12 shows a timing diagram illustrating the operation of the third embodiment of the present invention.

FIG. 12 is a timing diagram for signals in the third embodiment. In FIG. 12, the time is plotted along the abscissa, and from the top to the bottom of the figure are shown timing waveforms for the track access start instruction, the coarse-drive selector switch (SWt) 16, the fine-drive selector switch (SWp) 15, the coarse driving signal that the coarse driving signal generating unit 64 generates, the command 2 as the high-speed drive instruction that the dead zone switch 7 issues, the position of the pickup 2 relative to the carriage 14, and the speed of the carriage 14.

In FIG. 12, at time t1, the track access start instruction is input to the track access start instruction input port 21, upon which the command 1 is issued. By the command 1, the coarse-drive selector switch (SWt) 16 is switched from "c" to "d". At the same time, in response to the command 1, the coarse driving signal generating unit 64 generates the signal Vpr to start driving the coarse actuator 6 for track accessing.

As shown in the graph of "CARRIAGE SPEED" in FIG. 12, because of the backlash in the worm 19 the driving force is not immediately transmitted to the carriage 14 at time t1 when the coarse actuator 6 is activated for driving. As the coarse actuator 6 is driven, the backlash is gradually taken up, and at time t2 when the backlash is zero, the driving force is transmitted to the carriage 14. Therefore, at time t2, the carriage 14 begins to move in the track access direction.

When we observe the graph of "MOTION OF PICKUP 2 RELATIVE TO CARRIAGE 14" in FIG. 12, we see that the relative displacement of the pickup 2 as seen from the carriage 14 is oscillating due to the eccentricity of the recording medium 1 being rotated by the spindle motor 20. Immediately after time t1, the pickup 2 is still following the track on the recording medium 1 by the action of the fine actuator 5, but since the carriage 14 on which the fine actuator 5 is mounted remains stationary because of the presence of the backlash, the relative position of the pickup 2 averaged over that period remains the same. However, at time t2 when the backlash is zero, the carriage 14 begins to move, and with the movement of the carriage 14, the pickup 2 gradually moves, while oscillating, in the direction opposite to the track access direction.

In FIG. 12, if the track access direction is toward the inner circumference of the recording medium 1, for example, the limit of the full driving dead zone in the direction opposite to the track access direction is at $Zt2$. At time t3 when the pickup 2 has just reached the limit $Zt2$, the TRD signal becomes $Wt2$, in response to which the dead zone switch 7 outputs the command 2 as the high-speed drive instruction.

At time t3 when the command 2 is issued, the fine-drive selector switch (SWp) 15 (FIG. 11) is switched from "a" to "b", and remains connected to "b" until the time (not shown) when the track access is completed, that is, until the pickup 2 reaches the target track. Since "b" is grounded, the fine actuator 5 does not generate a driving force, and the motion of the pickup 2 on the carriage 14 is determined by its own inertia and the force of the spring 22.

Figure 13:
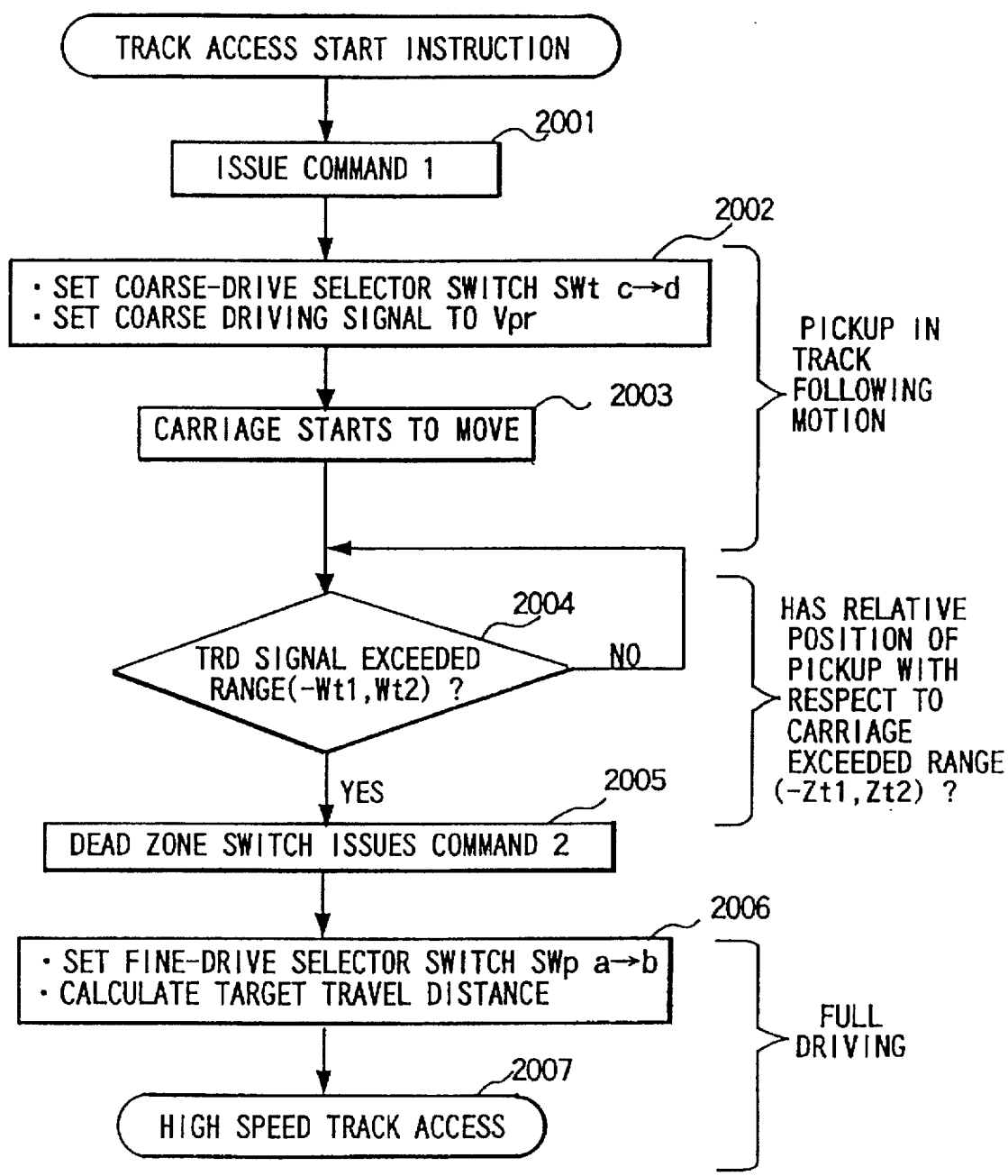
FIG. 13 shows a flowchart for the third embodiment of the present invention.

The above-described operation of the third embodiment will be explained below with reference to the flowchart of FIG. 13 in conjunction with FIG. 11. The configuration shown in the block diagram of FIG. 11 is implemented in hardware only, but the flowchart is used here to facilitate the functional description of the control.

First, when the track access start instruction is input, the track access start instruction input port 21 issues the command 1 as the track access start instruction (step 2001). In response to the command 1, the coarse-drive selector switch (SWt) 16 is switched from "c" to "d", and the coarse driving signal generating unit 64 outputs the drive signal Vpr (step 2002). The carriage 14 thus starts to move (step 2003). Next, the dead zone switch 7 monitors the TRD signal to detect whether the TRD signal has exceeded the range of −Wt1 to Wt2 (not containing the end points) that defines the full driving dead zone (step 2004). This is equivalent to detecting whether the pickup 2 as seen from the carriage 14 has moved outside the range of −Zt1 to Zt2. When the TRD signal goes outside the full driving dead zone, that is, when the TRD signal becomes equal to or smaller than −Wt1 or equal to or larger than Wt2, the dead zone switch 7 issues the command 2 as the high-speed drive instruction (step 2005). When the command 2 is issued, the fine-drive selector switch (SWp) 15 is switched from "a" to "b", and the target travel distance calculating unit not shown here calculates the target travel distance from the current track position of the pickup 2 and the target track position (step 2006). Full high-speed accessing thus starts (step 2007).

Turning back to FIG. 12, when we observe the motion of the pickup 2 relative to the carriage 14, we see that the pickup 2 begins to accelerate in the track access direction at time t3 and, after overshooting slightly, comes to rest in the center of its movable range with respect to the carriage 14 by the force of the spring 22.

When the speed of the carriage 14 is observed, it is seen that the carriage 14 begins to accelerate in the track access direction at time t2. After time t3, since no backlash is present, fast and stable track accessing is possible.

As described, in the third embodiment, if there exits backlash when the track access start instruction is issued, fast track accessing is performed after the backlash is removed. This makes fast and stable track accessing possible.

<<Fourth Embodiment>>

Figure 14:
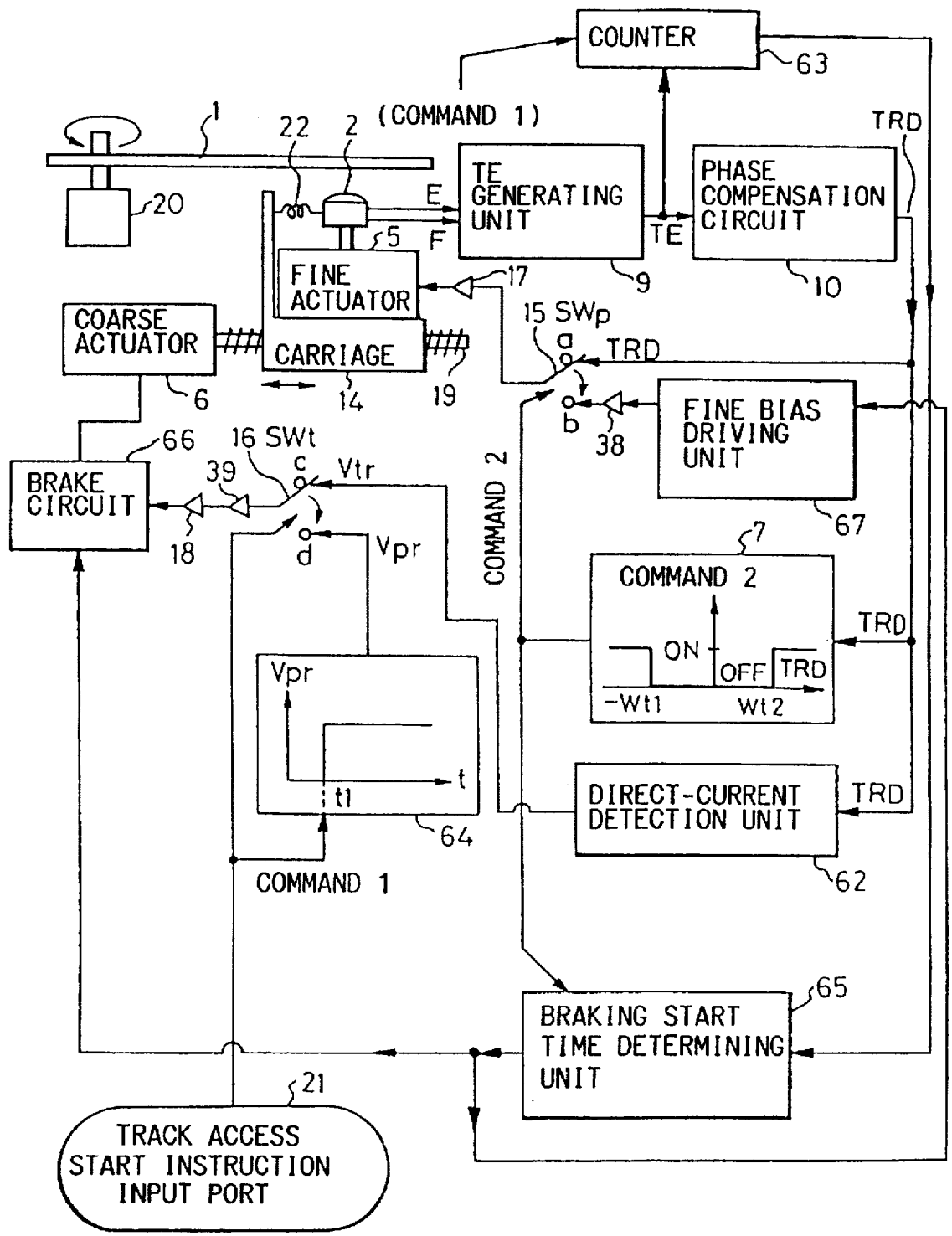
FIG. 14 shows a functional block diagram of a track access apparatus according to a fourth embodiment of the present invention.

FIG. 14 is a functional block diagram of a track access apparatus according to a fourth embodiment of the present invention.

In FIG. 14, the recording medium 1, a pickup 2, a fine actuator 5, a coarse actuator 6, a dead zone switch 7, TE generating unit 9, a phase compensation circuit 10, a carriage 14, a fine-drive selector switch (SWp) 15, a coarse-drive selector switch (SWt) 16, a fine-drive amplifier 17, a coarse-drive amplifier 18, a worm 19, a spindle motor 20, a track access start instruction input port 21, a spring 22, an invert/noninvert amplifier 39, and a coarse driving signal generating unit 64 are functionally the same as the corresponding parts described in the third embodiment. The difference in the circuit configuration of the fourth embodiment as compared to the third embodiment is the provision of an invert/noninvert amplifier 38, a direct-current detection circuit 62, a counter 63, a braking start time determining unit 65, a brake circuit 66, and a fine bias driving unit 67.

In the fourth embodiment, the TE generating unit 9 and the phase compensation circuit 10 are used as means for detecting the position of the pickup 2 relative to the carriage 14 as in the case of the first embodiment. And, the TRD signal is used as a signal indicating the relative position of the pickup 2.

In FIG. 14, the counter 63 accepts the TE signal and command 1 at its inputs. The output of the counter 63 is coupled to an input of the braking start time determining unit 65 to whose other input is coupled the command 2 from the output of the dead zone switch 7. The brake circuit 66 is provided between the coarse actuator 6 and the coarse-drive amplifier 18, and an output of the braking start time determining unit 65 is supplied as an input to the brake circuit 66. The output of the braking start time determining unit 65 is also supplied to the fine bias driving unit 67 whose output is coupled to "b" in the fine-drive selector switch (SWp) 15 through the invert/noninvert amplifier 38. The dead zone amplifier 8 provided in the third embodiment (FIG. 11) is replaced by the direct-current detection circuit 62 which accepts the TRD signal at its input.

The operation during tracking in which the pickup 2 is made to follow a track on the recording medium 1 will be described below with reference to FIG. 14. During tracking, the fine-drive selector switch (SWp) 15 is connected to "a", and the coarse-drive selector switch (SWt) 16 is connected to "c".

The pickup 2 is moved in the track access direction by means of the fine actuator 5 mounted on the carriage 14. Within the movable range of the pickup 2 relative to the carriage 14, a switch-off range is set, and also a driving dead zone (−Wt1 to Wt2) of the TRD signal is set, where −Wt1 and Wt2 respectively are the lower and upper limits of the TRD signal when the pickup 2 is located inside the switch-off range.

The direct-current detection circuit 62 has the function of effectively removing or reducing frequency components arising from the eccentricity of the rotating recording medium 1; more specifically, this circuit is constructed from a low-pass filter whose cut-off frequency is so selected as to cut off frequency components including the eccentricity-induced components.

During tracking, the pickup 2 follows a track on the recording medium 1; at this time, the TRD signal output from the phase compensation circuit 10 is routed via the fine-drive selector switch (SWp) 15 and input to the fine-drive amplifier 17 where the signal is amplified to drive the fine actuator 5.

The coarse actuator 6 rotates in the backward or forward direction depending on whether the applied voltage is positive or negative. The driving force of the coarse actuator 6 is transmitted via the worm 19 and drives the carriage 14 toward the outer circumference or inner circumference of the recording medium during track accessing. As in the foregoing embodiments, for a minute movement of the pickup 2, the fine actuator 5, which is capable of controlling fine positioning with good accuracy, primarily handles the operation, and it is desirable that the coarse actuator 6 with a relatively low positioning accuracy compared with the fine actuator 5 should not be moved frequently. In particular, eccentricity resulting from a displacement, etc. of the center axis of the rotating recording medium 1 is handled primarily by the fine actuator 5 to control the tracking of the pickup 2. Therefore, the direct-current detection circuit 62 removes or reduces frequency components including the eccentricity-induced components contained in the TRD signal, and drives the coarse actuator 6 via the invert/noninvert amplifier 39, coarse-drive amplifier 18, and brake circuit 66.

Next, the operation during track accessing according to the fourth embodiment will be described with reference to FIG. 14.

When the track access start instruction is input to the track access start instruction input port 21, the input port 21 issues command 1 to transmit the track access start instruction. The track access operation begins the instant that the command 1 is issued.

When the command 1 is issued, the coarse-drive selector switch (SWt) 16 is switched from "c" to "d", and at the same time, the coarse driving signal generating unit 64 outputs a signal Vpr for driving the coarse actuator 6. On the other hand, the counter 63, upon receiving the command 1, starts to count the number of tracks crossed thereafter by counting the number of crests of a sine wave occurring in the TE signal during track crossing. The count value of the counter 63 is reset to zero each time the command 1 is received.

When the coarse-drive selector switch (SWt) 16 is switched to "d", the signal output from the coarse driving signal generating unit 64 is passed through the invert/noninvert amplifier 39 and amplified by the coarse-drive amplifier 18. The amplified signal is fed via the brake circuit 66 to drive the coarse actuator 6. Here, the invert/noninvert amplifier 39 is supplied with a track access direction discrimination signal not shown; if the track access direction is from the inner toward the outer circumference of the recording medium 1, the amplifier 39 sends the coarse driving signal as is to the subsequent stage. Conversely, if the track access direction is from the outer toward the inner circumference, the coarse driving signal is inverted for output to the subsequent stage. At the subsequent stage is the coarse-drive amplifier 18 which drives the coarse actuator 6 to move the carriage in the designated track access direction. The track access direction discrimination signal is obtained from the position of the track the pickup 2 is currently following and the position of the target track.

When the coarse actuator 6 has just begun to perform the track access motion, the fine actuator 5 is still performing control so that the pickup 2 follows the track on the recording medium 1. Then, by the action of the coarse actuator 6, the carriage 14 begins to move in the track access direction. As a result, the position of the pickup 2 relative to the carriage 14 is displaced in the direction opposite to the track access direction. The instant that the amount of displacement has exceeded the range ($-Zt1$ to $Zt2$, the end points not contained in the range) which is the switch-off range shown in FIG. 2, the TRD signal becomes $-Wt1$ or $Wt2$, and the dead zone switch 7 issues the command 2 as the high-speed drive instruction.

When the command 2 is issued, the fine-drive selector switch (SWp) 15 is switched from "a" to "b". At the same time, the fine bias driving unit 67 sends a bias drive signal to the invert/noninvert amplifier 38 which then applies a driving force for a predetermined length of time to drive the fine actuator 5 in the track access direction. The invert/noninvert amplifier 38 is supplied with a track access direction discrimination signal not shown; if the track access direction is from the inner toward the outer circumference of the recording medium 1, the amplifier 38 sends the fine track access signal as is to the subsequent stage. Conversely, if the track access direction is from the outer toward the inner circumference, the fine-drive fine-adjust signal is inverted for output to the subsequent stage. At the subsequent stage is connected the fine-drive amplifier 17 via the fine-drive selector switch (SWp) 15, and for the predetermined length of time after the initiation of the track access operation, the fine actuator 5 generates the driving force to drive the pickup 2 in the track access direction. The pickup 2, which, immediately after the initiation of the track access operation, was displaced rearward relative to the carriage 14 when viewed along the track access direction, is now moved to a position approximately in the center of the movable range of the pickup 2 on the carriage 14 by the driving force of the fine actuator 5 and the urging force of the spring 22 toward the center of the carriage 14.

When the command 2 is received, the braking start time determining unit 65 first calculates the number of tracks from the current track position of the pickup 2 to the target track, and then calculates the time at which to start applying braking to the coarse actuator 6 to stop the carriage 14. The braking start time is calculated in the following manner: when the number, M, of tracks to be crossed from the start of the braking until the carriage 14 stops is defined as the braking count M, the braking count M is determined in advance by a preliminary experiment and, with the number of tracks crossed by the pickup 2 being constantly supplied from the counter 63, the time at which (L–M) tracks have been crossed is determined as the braking start time, where L is the total number of tracks to be crossed. In the fourth embodiment, the braking count M is given as a constant.

The brake circuit 66 performs control so that the coarse actuator 6 generates a driving force in the direction opposite to the track access direction for the duration of a braking time Tb starting from the braking start time. Here, the braking time Tb is a constant predetermined by experiment. From the time the command 1 is issued, until the time the command 2 is issued, the coarse actuator 6 alone is driven for track accessing, while the fine actuator 5 is still in a tracking condition where it is following a track on the recording medium. When the command 2 is issued, the track following action of the fine actuator 5 is stopped and track accessing by the coarse actuator 6 is initiated.

Figure 15:
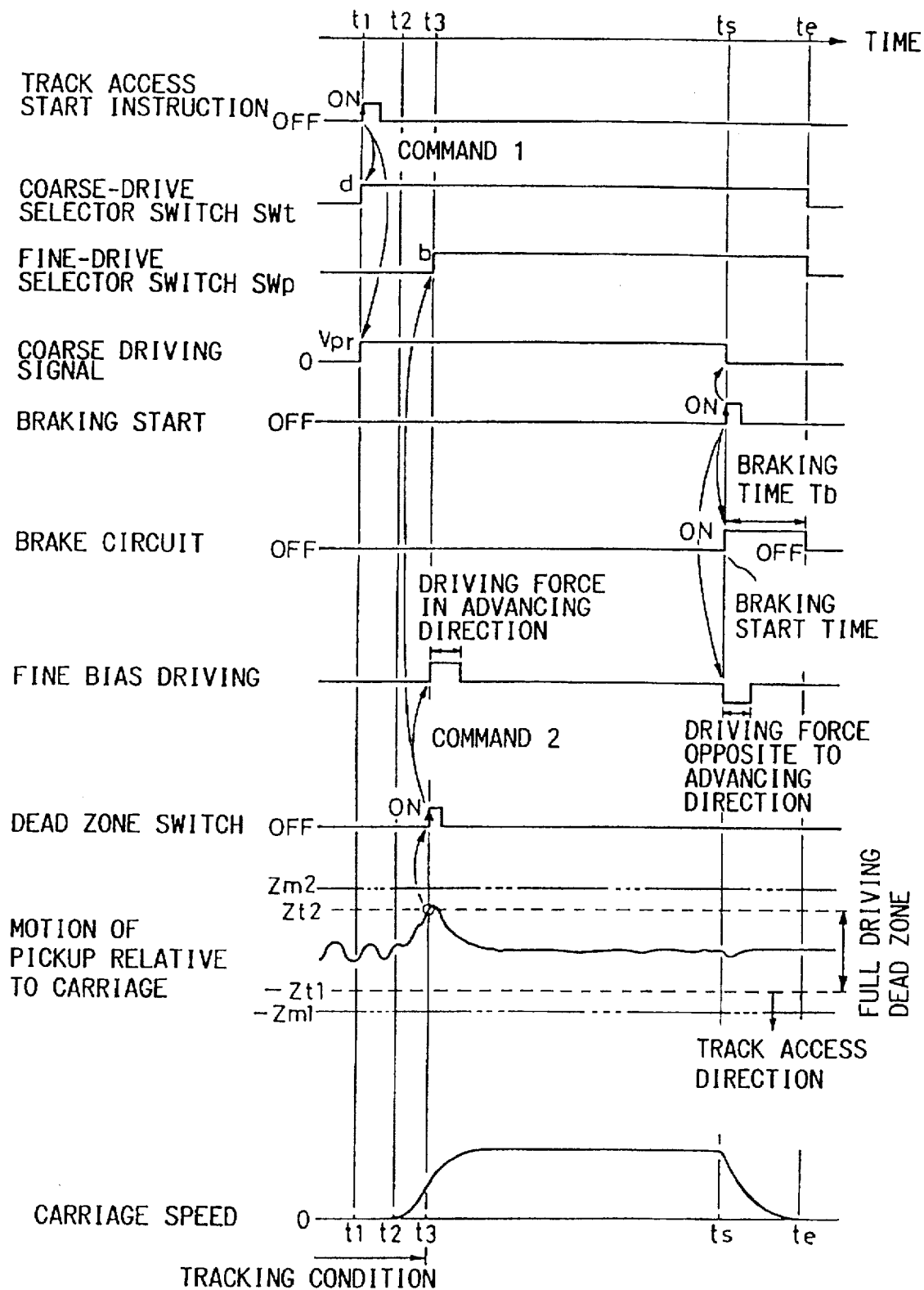
FIG. 15 shows a timing diagram illustrating the operation of the fourth embodiment of the present invention.

How the control is performed in the fourth embodiment will be described with reference to FIG. 15. FIG. 15 is a timing diagram for signals in the fourth embodiment.

In FIG. 15, the time is plotted along the abscissa, and from the top to the bottom of the FIG. are shown timing waveforms for the track access start instruction, the state of the coarse-drive selector switch (SWt) 16, the state of the fine-drive selector switch (SWp) 15, the coarse driving signal that the coarse driving signal generating unit 64 generates, the braking time Tb during which the brake circuit 66 applies braking to the coarse actuator 6, the output signal of the fine bias driving unit 67, the command 2 as the full driving start instruction that the dead zone switch 7 generates, the position of the pickup 2 relative to the carriage 14, and the speed of the carriage 14.

In FIG. 15, at time t1, the track access start instruction is input to the track access start instruction input port 21, upon which the command 1 is issued. By the command 1, the coarse-drive selector switch (SWt) 16 (FIG. 14) is switched from "c" to "d". At the same time, in response to the command 1, the coarse driving signal generating unit 64 generates a drive signal Vpr, thus starting the driving of the coarse actuator 6.

As can be seen from the Graph showing the speed of the carriage 14 in FIG. 15, because of the backlash in the worm 19 the carriage 14 does not move immediately after time t1 when the coarse actuator 6 is activated for driving. As the coarse actuator 6 is driven, the backlash is gradually taken up, and the instant that the backlash becomes zero at time t2, the driving force of the coarse actuator 6 begins to be transmitted to the carriage 14. Therefore, at time t2, the carriage 14 begins to move in the track access direction.

When we observe the graph of "MOTION OF PICKUP RELATIVE TO CARRIAGE" in FIG. 15, we see that the relative displacement of the pickup 2 as seen from the carriage 14 is oscillating due to the eccentricity of the recording medium 1 being rotated by the spindle motor 20. Immediately after time t1, the pickup 2 is still following the track on the recording medium 1 by the action of the fine actuator 5, but since the carriage 14 on which the fine actuator 5 is mounted remains stationary because of the presence of the backlash, the relative position of the pickup 2 averaged over that period remains the same. However, at time t2 when the backlash is zero, the carriage 14 begins to move, and with the movement of the carriage 14, the pickup 2 gradually moves, while oscillating, in the direction opposite to the track access direction.

In the graph, if the track access direction is toward the inner circumference of the recording medium 1, the limit of the full driving dead zone in the direction opposite to the track access direction is at Zt2. At time t3 when the pickup 2 has just reached the limit Zt2, the TRD signal becomes Wt2 (FIG. 14), in response to which the dead zone switch 7 outputs the command 2 as the full driving start instruction.

At time t3 when the command 2 is issued, the fine-drive selector switch (SWp) 15 is switched from "a" to "b", and remains connected to "b" until the time (not shown) when the track access is completed, that is, until the pickup 2 reaches the target track. The fine bias driving unit 67, which is coupled to "b", generates a signal for making the fine actuator 5 generate a driving force for a predetermined length of time after the issuance of the command 2, and sends the signal to the invert/noninvert amplifier 38. The invert/noninvert amplifier 38 is supplied with a track access direction discrimination signal not shown; if the track access direction is from the inner toward the outer circumference of the recording medium 1, the amplifier 38 sends the fine track access signal as is to the subsequent stage. Conversely, if the track access direction is from the outer toward the inner circumference, the signal is inverted for output to the subsequent stage. In this way, the fine actuator 5 generates a driving force in the track access direction for the predetermined length of time after the issuance of the command 2. This driving force assists the motion of the pickup 2 that tends to move from one end of the full driving dead zone (the switch-off range) toward the center of the carriage by the restoring force of the spring 22.

Next, at time ts, the braking start time determining unit 65 (FIG. 14) issues a signal indicating the braking start time, upon which the brake circuit 66 makes the coarse actuator 6 generate a driving force in the direction opposite to the track access direction. More specifically, in the fourth embodiment, the braking torque was generated by short-circuiting both ends of the power supply line of the coarse actuator 6 and thereby inducing a back electromotive force in the coarse actuator 6.

On the other hand, the fine bias driving unit 67 (FIG. 14) issues a signal for making the fine actuator 5 generate a driving force in the direction opposite to the track access direction for the predetermined length of time (the braking time Tb), starting from the braking start time ts. This prevents the position of the pickup 2 relative to the carriage 14 from being displaced in the track access direction by its own inertia during braking.

Figure 16:
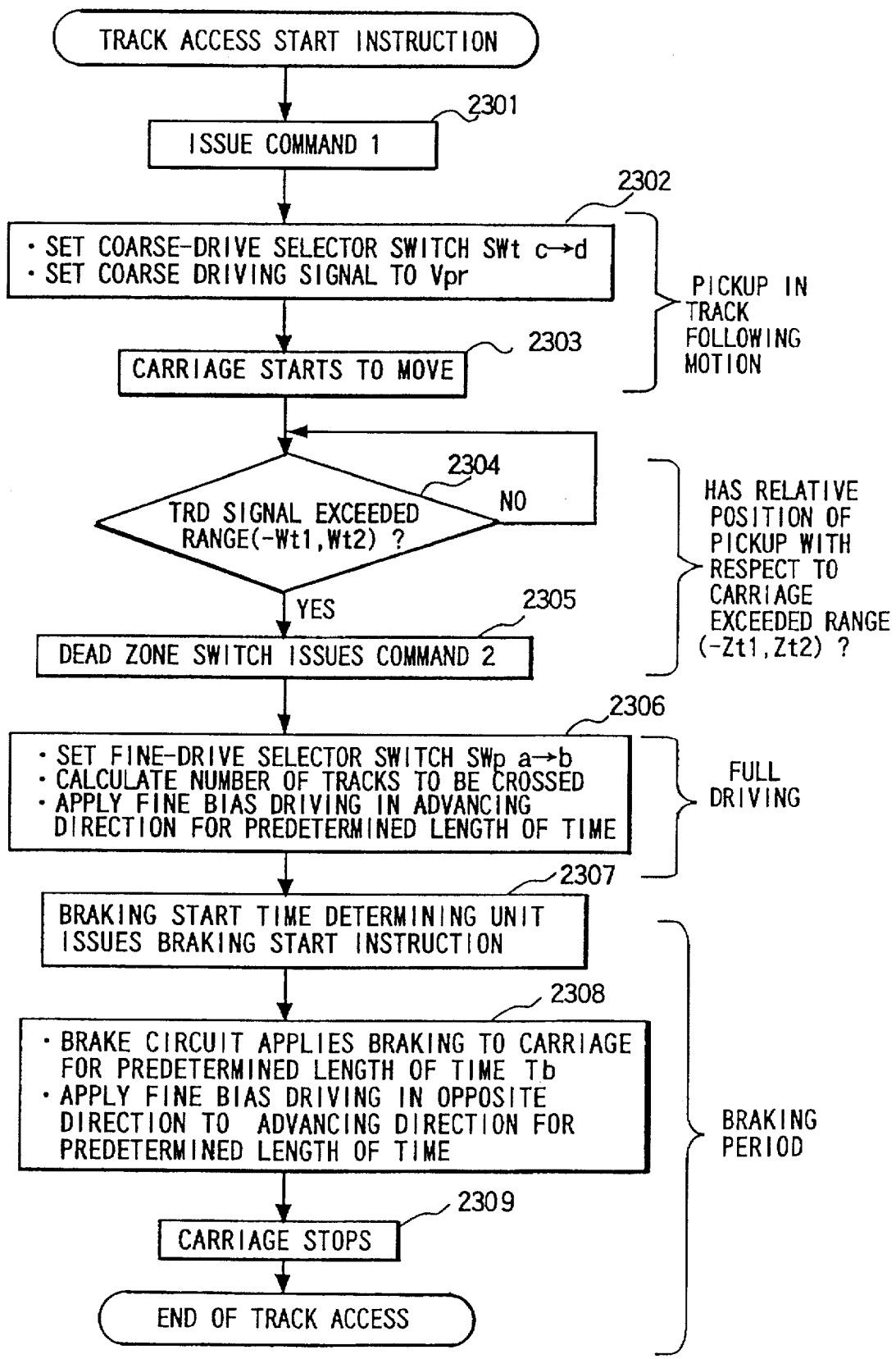
FIG. 16 shows a flowchart for the fourth embodiment of the present invention.

The above-described operation of the fourth embodiment will be explained below with reference to the flowchart of FIG. 16 in conjunction with FIG. 14. The configuration shown in the block diagram of FIG. 14 is implemented in hardware only, but the flowchart is used here to facilitate the functional description of the control.

First, when the track access start instruction is input, the track access start instruction input port 21 issues the command 1 as the track access start instruction (step 2301). In response to the command 1, the coarse-drive selector switch (SWt) 16 is switched from "c" to "d", and the count value of the counter 63 is reset to zero. At the same time, the coarse driving signal generating unit 64 outputs the drive signal Vpr (step 2302). The driving of the coarse actuator 6 is thus started, and when the backlash becomes zero, the carriage 14 starts to move (step 2303).

Next, the dead zone switch 7 monitors the TRD signal to detect whether the TRD signal has exceeded the range of −Wt1 to Wt2 that defines the full driving dead zone (step 2304). This is equivalent to detecting whether the pickup 2 as seen from the carriage 14 has moved outside the prescribed range (−Zt1 to Zt2). When the TRD signal goes outside the full driving dead zone, that is, when the TRD signal becomes equal to or smaller than −Wt1 or equal to or larger than Wt2, the dead zone switch 7 issues the command 2 as the full driving start instruction (step 2305).

When the command 2 is issued, the fine-drive selector switch (SWp) 15 is switched from "a" to "b", the target travel distance calculating unit not shown in FIG. 14 calculates the target travel distance from the current track position of the pickup 2 and the target track position, and the fine bias driving unit 67 makes the fine actuator generate a driving force in the track access direction; full high-speed accessing thus starts (step 2306). Upon the initiation of the track access operation, the counter 63 starts to count the number of tracks crossed by the pickup 2, and the braking start time determining unit 65 issues the braking start instruction when (L−M) tracks have been crossed, where L is the total number of tracks to be crossed and M is the number of tracks over which braking should be applied (the braking count). In the fourth embodiment, the braking count M is a constant and set at 900 (tracks). The brake circuit 66 works to short-circuit the power supply line of the coarse actuator 6 for the duration of the braking time Tb staring from the braking start time, thereby causing the coarse actuator 6 to generate a driving force in the direction opposite to the track access direction, thus applying braking to stop the carriage 14.

Turning back to FIG. 15, when we observe the motion of the pickup 2 relative to the carriage 14, we see that the pickup 2 begins to accelerate in the track access direction at time t3 and, after overshooting slightly, comes to rest in the center of its movable range with respect to the carriage 14 by the force of the spring 22 and by the signal from the fine bias driving unit 67. When the speed of the carriage 14 is observed, it is seen that the carriage 14 begins to accelerate in the track access direction at time t2. After time t3, since no backlash is present, fast and stable track accessing is possible. Further, at the braking start time, the signal from the fine bias driving unit 67 effectively prevents the pickup 2 from being excessively displaced in the track access direction.

As described, in the fourth embodiment, if there exits backlash when the track access start instruction is issued, fast track accessing is performed after the backlash is removed. This makes fast and stable track accessing possible.

<<Fifth Embodiment>>

In the above-mentioned fourth embodiment, the braking count M was set as a constant, but the braking count M may be corrected successively for each succeeding track access operation. The fifth embodiment hereinafter described is concerned with a configuration having a braking count successive correction function.

In a specific method, the braking count M is corrected on the basis of the difference between the target track and the track actually landed on in the previous track access operation, and the corrected count is set as the braking count M' for the current track access operation. The same configuration as the one shown in the block diagram of FIG. 14 can be used to implement this method. The braking start time determining unit 65 in the fifth embodiment has the function hereinafter described. This braking start time determining unit 65 can be constructed using, for example, a microcomputer.

Figure 17:
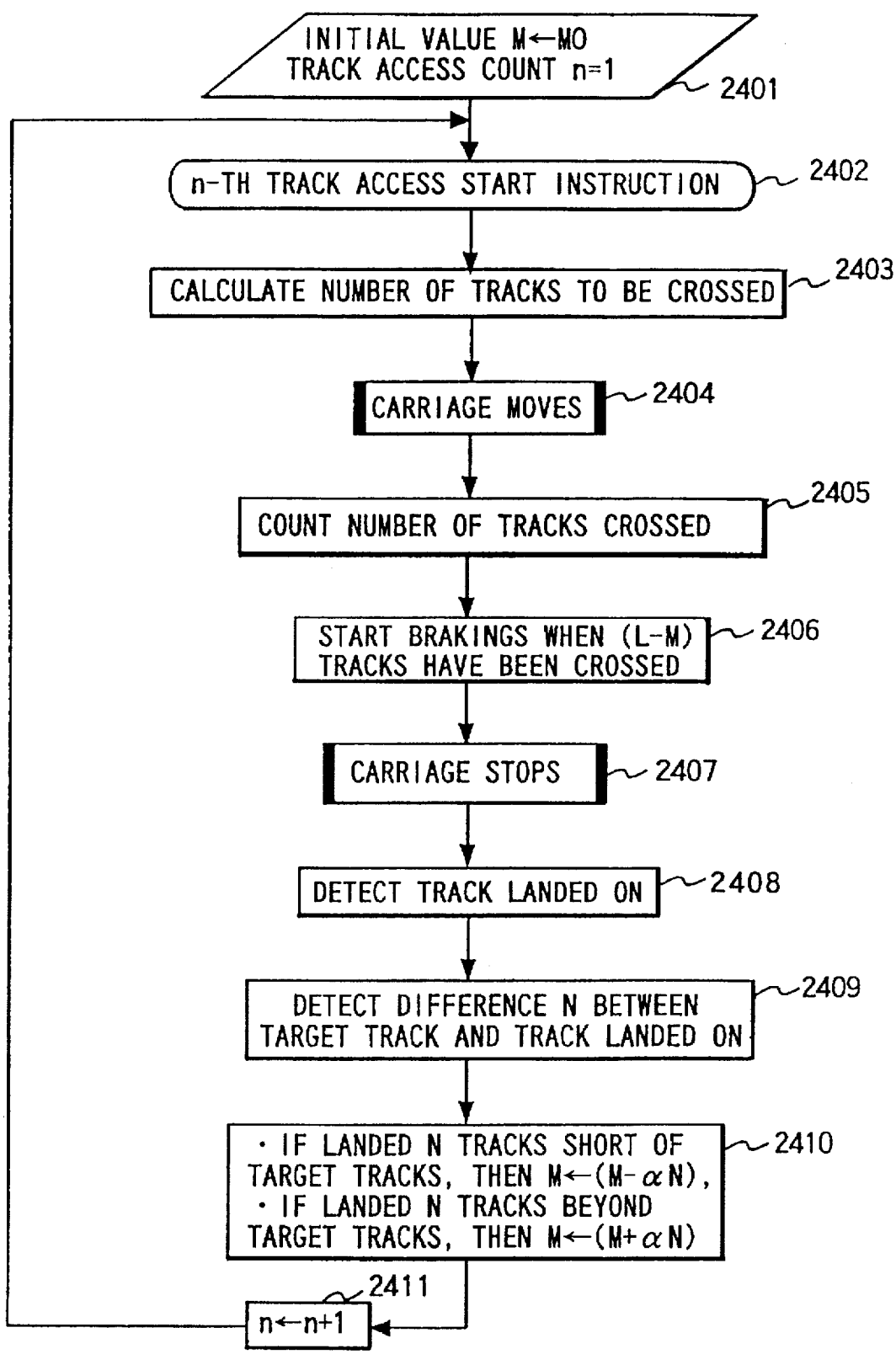
FIG. 17 shows a flowchart for a fifth embodiment of the present invention.

FIG. 17 shows a flowchart illustrating the function of the braking start time determining unit 65.

In FIG. 17, first the braking count M is set at an appropriate value M0, and the track access count n is set to 1 (step 2401). When the track access start instruction is received (step 2402), the braking start time determining unit 65 calculates the total number, L, of tracks to be crossed, on the basis of the track position of the pickup 2 immediately before the receipt of the track access start instruction and the target track position (step 2403). Then, as in the fourth embodiment, the carriage 14 starts to move (step 2404), and the counter 63 counts the number of tracks crossed after the initiation of the track access operation (step 2405). When the number of tracks crossed has reached (L–M) after starting the counting upon receipt of the track access start instruction, braking is started (step 2406), and the carriage 14 is stopped (step 2407).

Upon the stopping of the carriage 14, tracking of the pickup 2 is resumed to read the landed track number (step 2408), and an error N with respect to the target track is calculated (step 2409). Here, correction coefficient $\alpha$ is set at a value larger than 0 but not larger than 1, and a value displaced by ($\alpha \times N$) tracks is set as the new braking count M. More specifically, when the pickup 2 has landed short of the target track by N tracks, (M–$\alpha \times N$) is set as the braking count M for the next track access operation; conversely, when the pickup 2 has landed N tracks beyond the target track, (M+$\alpha \times N$) is set as the braking count M for the next operation (step 2410). Then, the track access count n is incremented by 1, and the process waits for the arrival of the next track access start instruction (step 2411). The above steps are repeated for each subsequent track access operation.

Figure 20A:
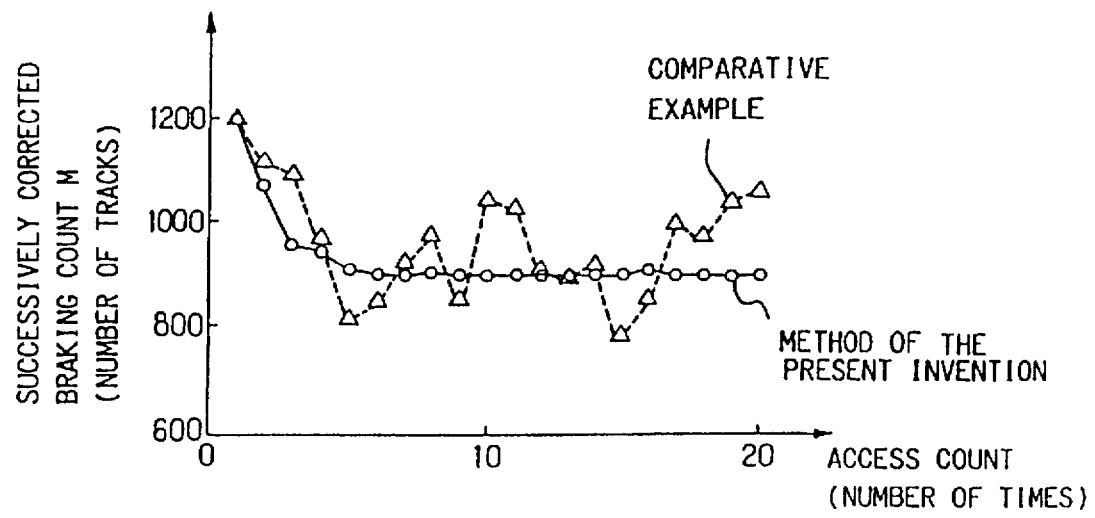
FIG. 20A shows a diagram showing experimental results on successively corrected braking count M in relation to access count.
Figure 20B:
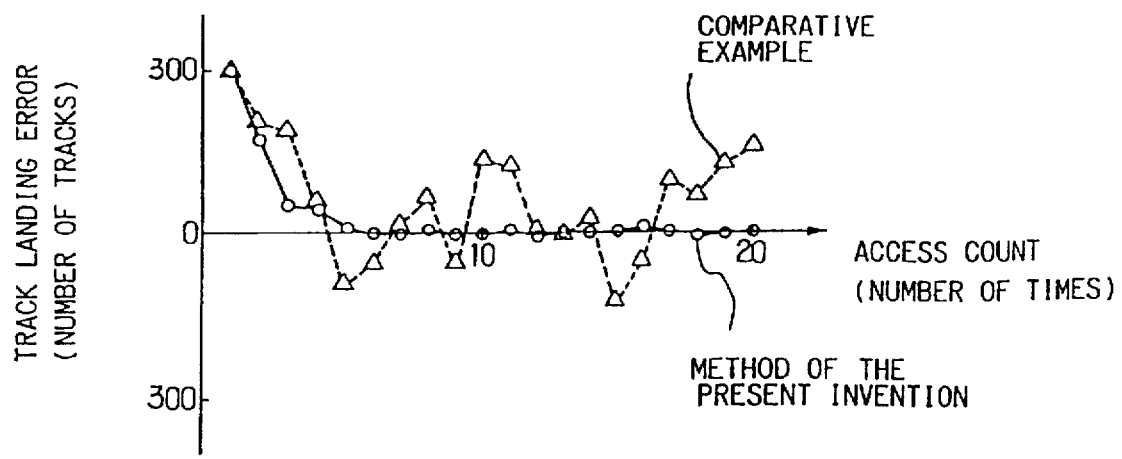
FIG. 20B shows a diagram showing experimental results on pickup's track landing errors in relation to access count.

FIGS. 20A and 20B show experimental data obtained by repeating track accesses while actually correcting the braking count M successively.

FIG. 20A shows experimental data obtained when the initial value of the braking count M was set to 1200 (tracks); in the graph, the access count (number of times) is plotted along the abscissa and the successively corrected braking count M (number of tracks) along the ordinate. In the experiment, a disk with eccentricity of 140 µm was used, and track accessing was repeatedly performed, each time crossing 9000 tracks from the inner toward the outer circumference of the disk. The circles connected by solid lines represent experimental results when correction coefficient $\alpha$=0.2. It can be seen from the experimental results that as track accessing is repeated, the braking count M gradually approaches 900, and settles around M=900 for the access count of 10 and over. The difference between the target track and the track actually landed on after each track access is shown in FIG. 20B.

FIG. 20B shows the experimental data with the access count plotted along the abscissa and the difference between the target track and the track actually landed on along the ordinate. The circles connected by solid lines represent the experimental results. The experiment showed that as the access count increased, the difference between the target track and the track actually landed on was reduced, and for the access count of 10 and over, the pickup steadily landed at the target track.

(Comparative Example 1)

For comparison with the above experimental results, an experiment was conducted by successively correcting the braking count M in a configuration where the dead zone switch 7 was not provided. The same successive correction method as used in the present embodiment was employed. The track access apparatus used as a first comparative example is fundamentally the same in configuration as the second prior art, except that the function of successively correcting the braking count M is added. That is, the configuration of the first comparative example is as shown in FIG. 18.

Figure 18:
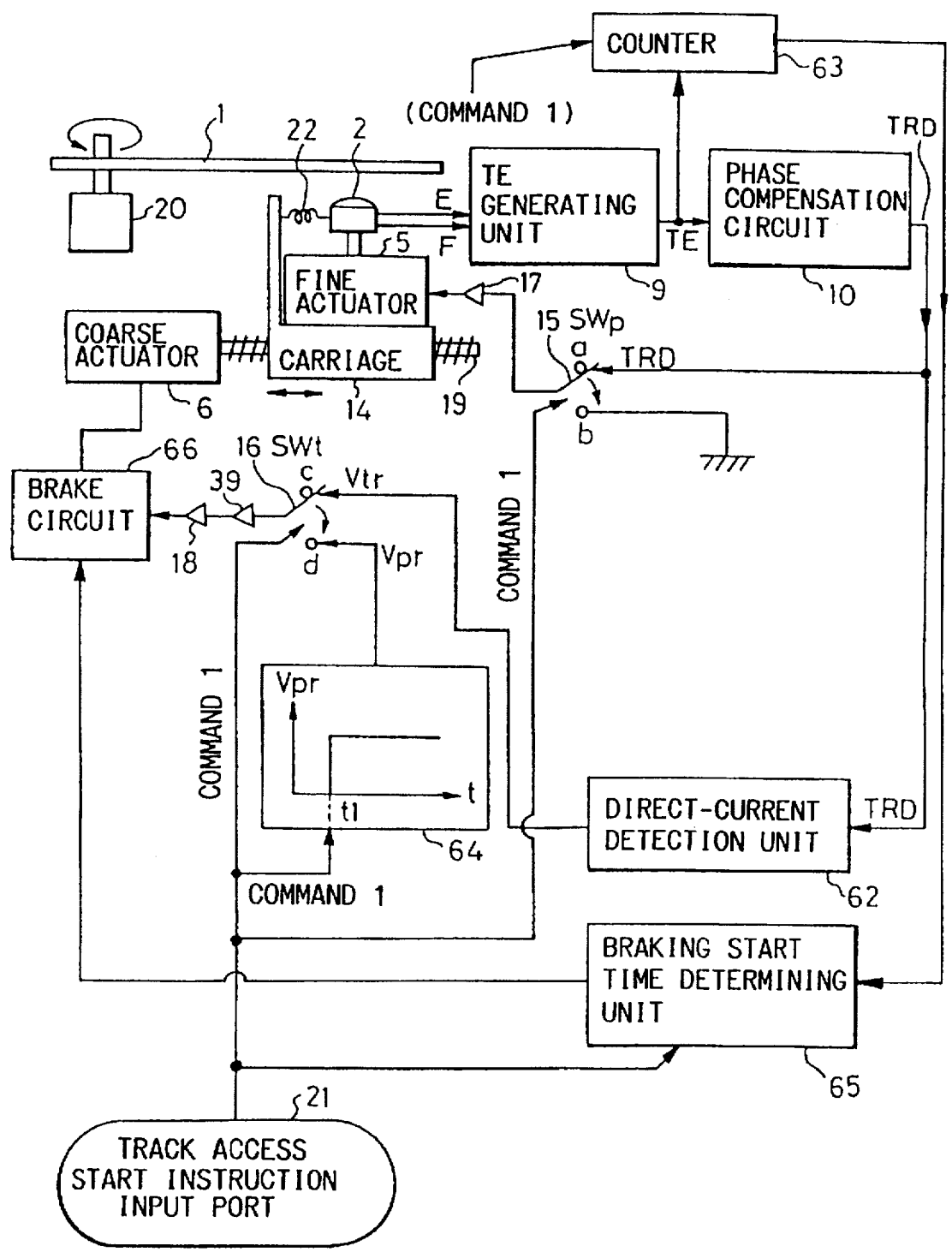
FIG. 18 shows the functional block diagram of another track access apparatus according to the prior art.
Figure 19:
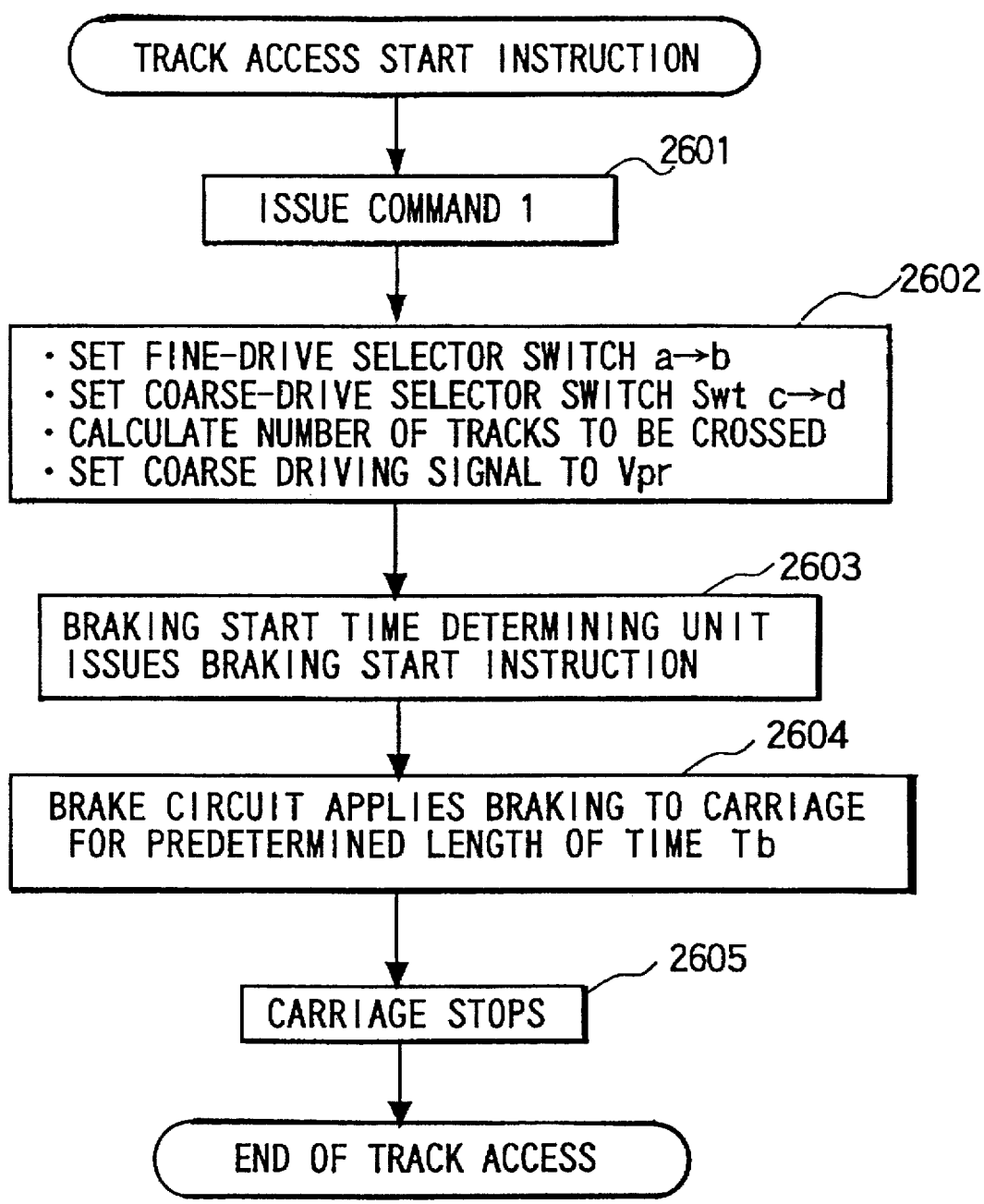
FIG. 19 shows the flowchart for the apparatus shown in FIG. 18.

As can be seen from the comparison between FIGS. 18 and 14, the dead zone switch 7 is not provided in the configuration of FIG. 18, and "b" on the fine-drive selector switch (SWp) 15 is Grounded. The operation of the track access apparatus having such a configuration has already been explained in the description of the second prior art, and therefore, explanation will not be repeated here.

Using the apparatus of FIG. 18, an experiment was conducted by successively correcting the braking count M in accordance with the flowchart shown in FIG. 17. The results are shown by triangular marks connected by dotted lines in FIGS. 20A and 20B.

In FIG. 20A, the initial value M0 of the braking count M was set at 1200 (tracks). As the access count increased, the braking count M more or less tended to move toward 900, but variations are large and the braking count M did not settle at a constant value for the access count up to 20.

Also, as can be seen from FIG. 20B showing the difference between the target track and the track actually landed on, variations were large and the error did not converge to zero even when the access count was increased. The inventor et al. investigated the cause and obtained the following results.

(Results of Investigation on Embodiment 5)

The track access start instruction is issued while the pickup 2 is following a track on a disk-shaped recording medium exhibiting eccentricity of, in this case, 140 µm, but the position of the pickup 2 relative to the carriage when the instruction is issued is random, that is, changes each time. In the fifth embodiment, however, the tracking condition in which the pickup 2 is kept on track of the recording medium 1 is maintained until the pickup 2 moves outside the switch-off range (–Zd1 to Zd2) on the carriage 14; as a result, at the time the tracking is disengaged and full track accessing is started, the position of the pickup 2 relative to the carriage 14 should be at one end of the switch-off range, –Zd1 or Zd2, whichever is located in the direction opposite to the track access direction. We confirmed that the repeatability of this phenomenon was high.

(Results of Investigation on Comparative Example 1)

On the other hand, in the case of the first comparative example, the tracking is disengaged and full track accessing is started immediately after the track access instruction is issued; therefore, the position of the pickup 2 relative to the carriage 14 is random. When released from the tracking condition, the motion of the pickup 2 is determined by the balance between its own inertia and the force of the spring 22. In the experiment, the number of tracks crossed by the pickup 2 during this period was counted by the counter 63. Here, when the pickup 2 was located forward relative to the carriage 14 in the track access direction with respect to the pickup origin, the pickup 2 moved in the direction opposite to the track access direction the instant it was released from the tracking condition.

However, since the counter 63 was unable to discriminate the direction of crossing, the number of tracks crossed in the opposite direction was erroneously counted as the number of tracks crossed in the track access direction, thus introducing an error in the count value.

Furthermore, the time during which the pickup 2 moved in the opposite direction varied depending on the magnitude of the backlash. This also introduced an error in the count value representing the number of tracks crossed.

Moreover, the position of the pickup 2 relative to the carriage 14 at the time of track access initiation was another factor for the track access error. That is, the motion of the pickup 2 during track accessing is determined by such factors as the force being acted on by the spring 22, the motion of the carriage 14, and the direction of movement of the pickup 2 immediately after the initiation of track accessing; however, since the motion of the carriage 14 is dependent on the backlash, and since the position of the pickup 2 relative to the carriage 14 at the time of track access initiation changes each time, the direction of movement of the pickup 2 immediately after the initiation of track accessing is not always the same. This caused a variation in the position of the pickup 2 relative to the carriage 14 at the braking start time, as a result of which, as we found, even if the braking count M was successively corrected, the braking count M did not stabilize at a constant value and the track access error could not be reduced.

(Comparative Example 2)

In the fifth embodiment, the correction coefficient $\alpha$ was set to 0.2. In the experiment hereinafter described, the coefficient was set to 0.5 and the successively corrected braking count M was examined. The results of the experiment are shown in FIG. 21.

Figure 21:
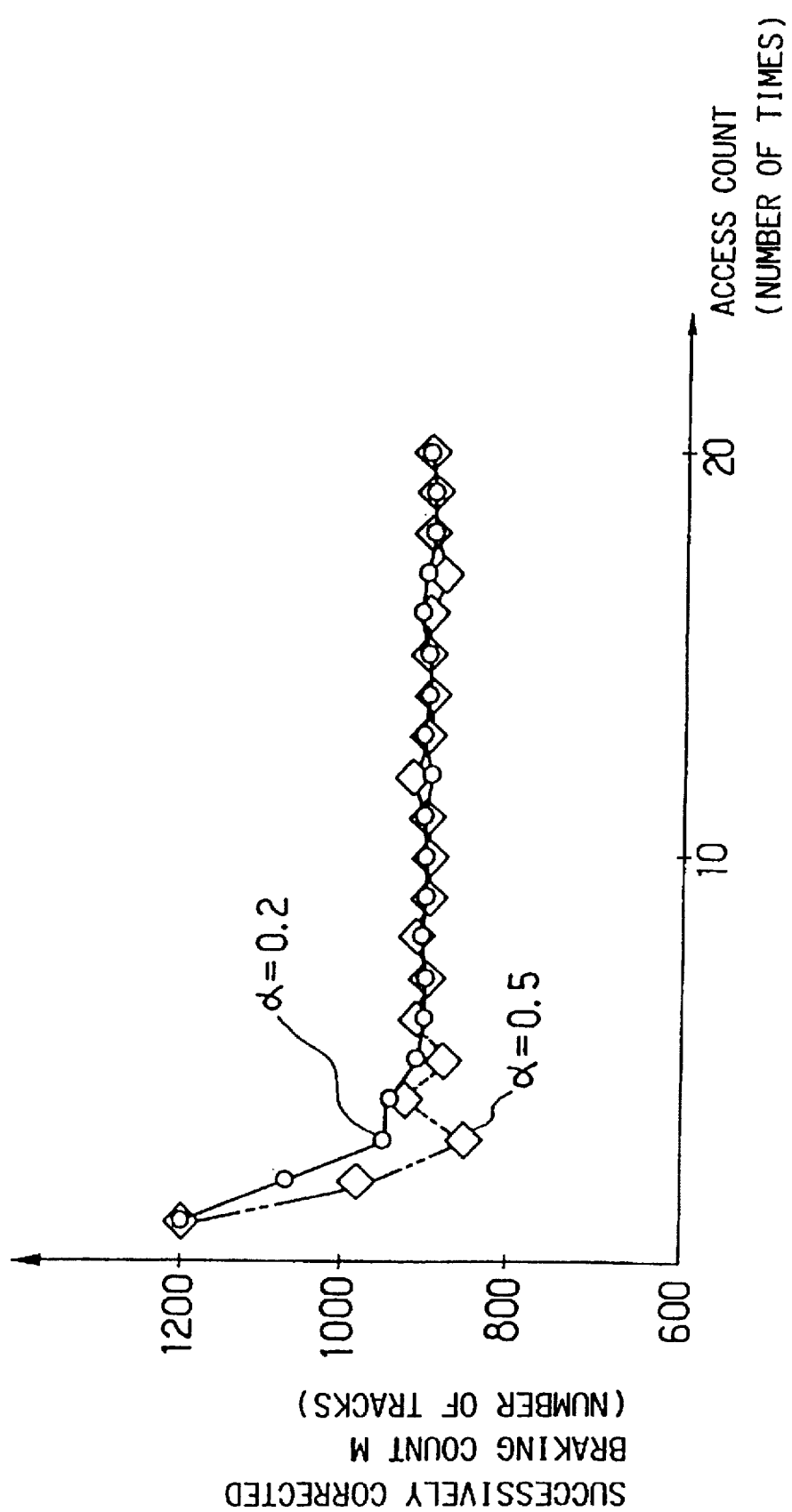
FIG. 21 shows a diagram showing braking count M for different correction coefficients.

In FIG. 21, the access count is plotted along the abscissa and the successively corrected braking count M along the ordinate. The initial value M0 of M was set to 1200 (tracks). In the experiment, track accessing was repeatedly performed, each time crossing 9000 tracks from the inner toward the outer circumference of a disk-shaped recording medium having eccentricity of 140 μm. The circles connected by solid lines represent the experimental results when the correction coefficient $\alpha=0.2$, while the rhombuses connected by double-dashed lines indicate the experimental results when the correction coefficient $\alpha=0.5$.

As can be seen from the experimental results, in either case the braking count M gradually approached 900 as the track access count increased, but in the case of $\alpha=0.5$, it accompanied a relatively large variation in the process of approaching, whereas in the case of $\alpha=0.2$ the braking count M steadily approached the constant value. That is, it was found from the experiment that the correction coefficient $\alpha$ of 0.2 or less was preferable.

<<Sixth Embodiment>>

Figure 22:
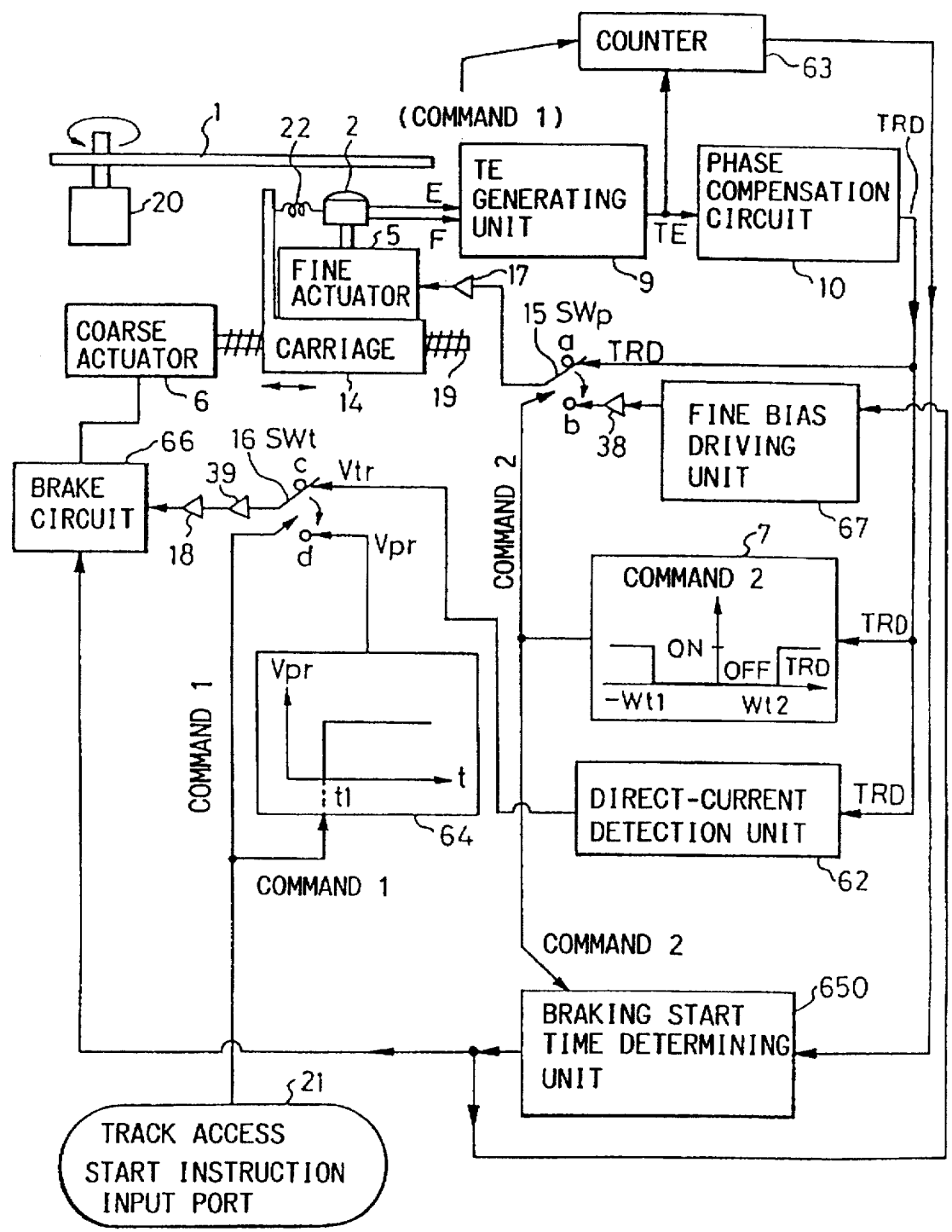
FIG. 22 shows a functional block diagram of a track access apparatus according to a sixth embodiment of the present invention.

FIG. 22 is a functional block diagram of a track access apparatus according to a sixth embodiment of the present invention.

In FIG. 22, the recording medium 1, a pickup 2, a fine actuator 5, a coarse actuator 6, a dead zone switch 7, TE generating unit 9, a phase compensation circuit 10, a carriage 14, a fine-drive selector switch (SWp) 15, a coarse-drive selector switch (SWt) 16, a fine-drive amplifier 17, a coarse-drive amplifier 18, a worm 19, a spindle motor 20, a track access start instruction input port 21, a spring 22, invert/noninvert amplifiers 38 and 39, a direct-current detection circuit 62, a counter 63, a coarse driving signal generating unit 64, a brake circuit 66, and a fine bias driving unit 67 are functionally the same as the corresponding parts described in the fourth embodiment. The difference in the circuit configuration of the sixth embodiment as compared to the fourth embodiment is the provision of braking start time determining unit 650.

In the aforementioned fourth embodiment, the braking start time was determined based on the braking count M, but in the case of a short-distance track access, it is desirable that the braking start time be determined in other ways. The sixth embodiment hereinafter described is concerned with an implementation of such a method. A short-distance track access refers, for example, to a track access operation in which the number of tracks to be crossed to achieve the track access is smaller than the braking count.

The sixth embodiment is different from the fourth embodiment only in the method of determining the braking start time. More specifically, in the sixth embodiment, the number of tracks to be crossed between the time a track access operation is started and the time the carriage reaches a constant moving speed, is given in advance as K, and when the total number, L, of tracks to be crossed during track accessing is equal to or larger than (K+M), the time at which (L−M) tracks have been crossed is determined as the braking start time. Here, the total number L is obtained from the target track position and the track position of the pickup 2 immediately before starting the track accessing. On the other hand, when the number, L, of tracks to be crossed during track accessing is smaller than (K+M), the time at which half the number, L, of tracks have been crossed is determined as the braking start time.

<<Embodiment 7>>

In the fifth embodiment, the braking start time was determined based on the successively corrected braking count M, but in the case of a short-distance track access, it is desirable that the braking start time be determined in other ways. The seventh embodiment hereinafter described is concerned with an implementation of such a method. A short-distance track access refers, for example, to a track access operation in which the number of tracks to be crossed to achieve the track access is smaller than the braking count.

The seventh embodiment is different from the fifth embodiment only in the method of determining the braking start time. More specifically, in the seventh embodiment, the number of tracks to be crossed between the time a track access operation is started and the time the carriage reaches a constant moving speed, is Given in advance as K, and when the number, L, of tracks to be crossed during track accessing is equal to or larger than (K+M), the time at which (L−M) tracks have been crossed is determined as the braking start time. Here, the total number L is obtained from the target track position and the track position of the pickup 2 immediately before starting the track accessing. On the other hand, when the number, L, of tracks to be crossed during track accessing is smaller than (K+M), the time at which half the number, L, of tracks have been crossed is determined as the braking start time. Here, the braking count M is a value successively corrected as described in the fifth embodiment.

<<Embodiment 8>>

In the first embodiment, When the pickup 2 is made to follow a track on the recording medium 1, if the recording medium 1 is a disk having a certain amount of eccentricity, the coarse actuator 6 will be activated frequently, that is, each time the disk makes one revolution. This is undesirable. To prevent this, a low-pass filter is inserted at the front end of the dead zone amplifier 8. This will have the effect of alleviating the above undesirable phenomenon. The eighth embodiment hereinafter described is concerned with a configuration for implementing this.

In this configuration, the switch-off range and the dead-zone range are modified first, and then the corresponding full driving dead zone and tracking dead zone are modified in the following manner.

Figure 23:
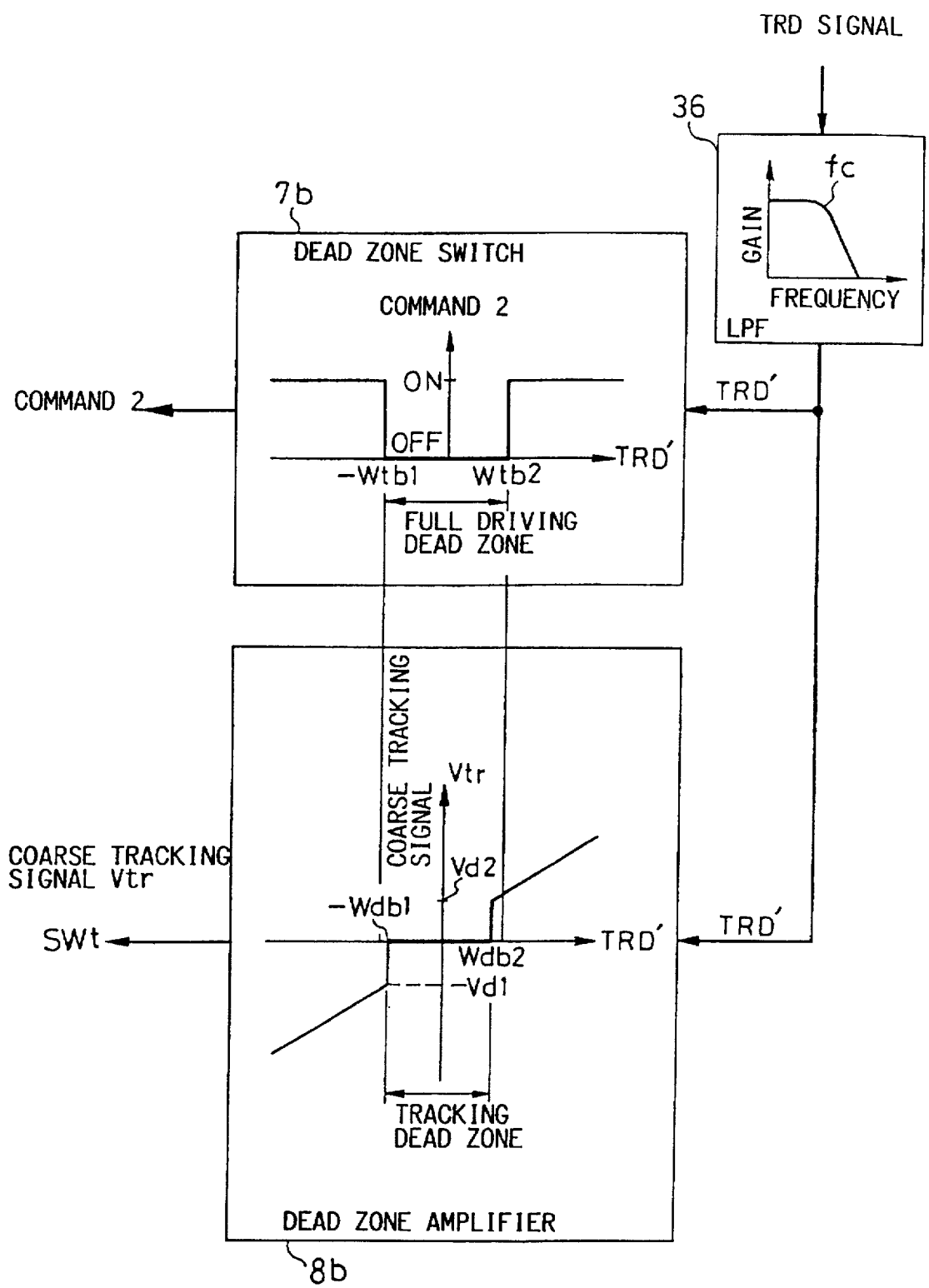
FIG. 23 shows a block diagram showing a circuit with a low-pass filter inserted to address disk eccentricity.
Figure 24:
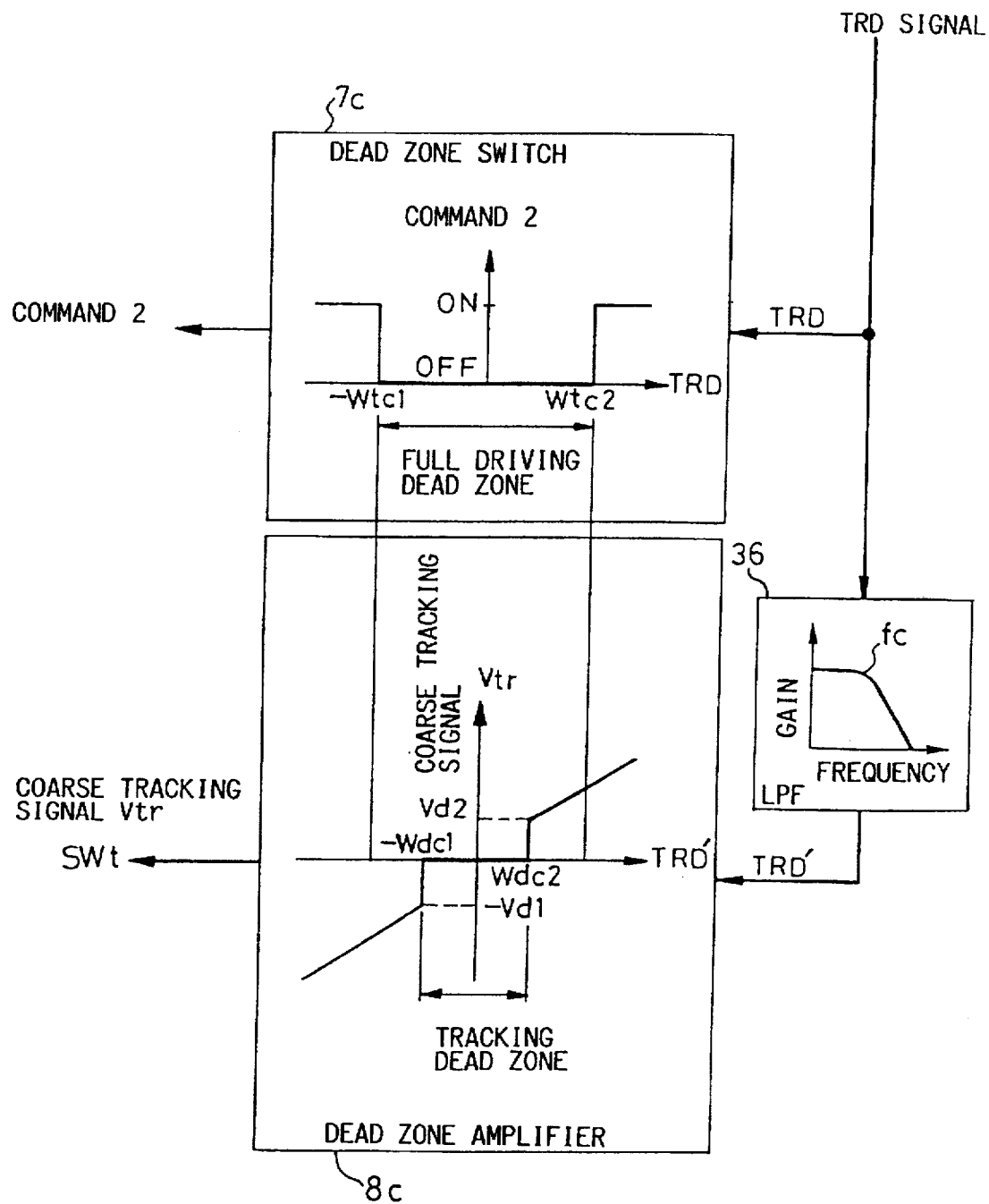
FIG. 24 shows a block diagram showing the circuit with the low-pass filter for addressing disk eccentricity inserted in a different location than that shown in FIG. 23.

FIGS. 23 and 24 are block diagrams showing the configuration relating to the inputs and outputs of the dead zone switch 7 and dead zone amplifier 8.

FIG. 23 shows an example in which the TRD signal is input to the dead zone switch 7b and dead zone amplifier 8b via a low-pass filter 36 with a cut-off frequency fc=0.1 Hz. How the dead zone −Wtb1 to Wtb2 in the dead zone switch 7b is determined will be described below with reference to FIGS. 25A and 25B.

Figure 25A:
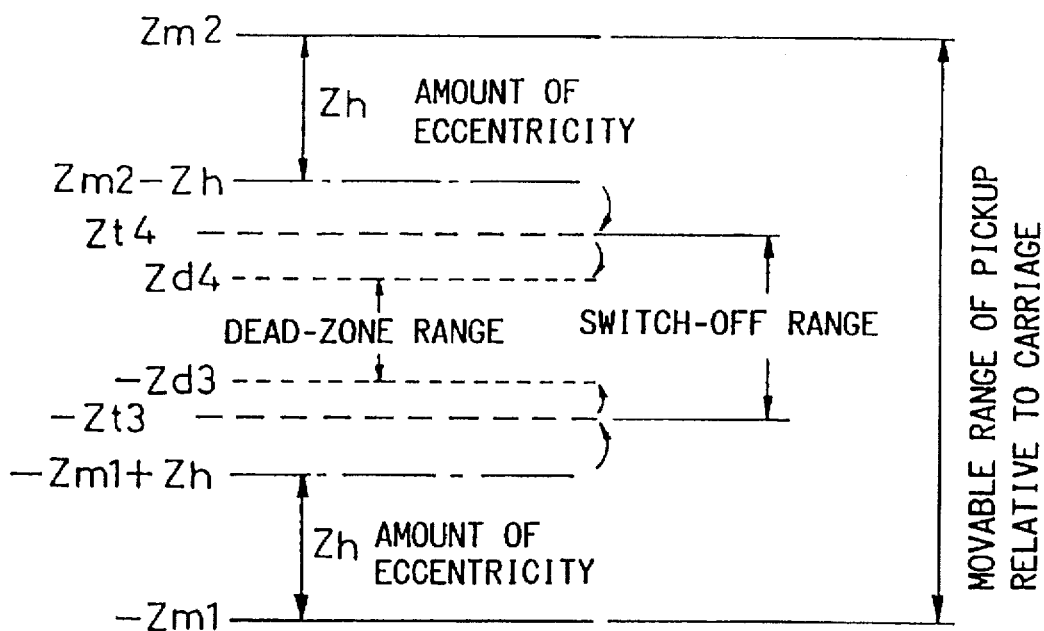
FIG. 25A shows a diagram showing the relationship between the tracking dead zone and full driving dead zone shown in FIG.

FIG. 25A shows the relationship between the movable range of the fine actuator 5 and the switch-off range and the dead-zone range; the movable range of the fine actuator 5 is from −Zm1 to Zm2, the switch-off range is from −Zt2 to Zt4, and the dead-zone range is from −Zd3 to Zd4. Zh is the amount of eccentricity of the recording medium 1.

In the configuration of FIG. 23, the effect of the low-pass filter 36 is exerted on each of the switch-off range and the dead-zone range: the switch-off range is set within a range of (−Zm1+Zh) to (Zm2−Zh) which is narrower than the movable range of the fine actuator 5 by the amount of eccentricity Zh on both ends, and the dead-zone range is set within the thus set switch-off range.

When the pickup 2 is located at one end, −Zt3 or Zt4, of the switch-off range obtained in the above procedure, the TRD signal is represented by −Wtb1 or Wtb2, respectively, defining the limits of the full driving dead zone in the dead zone switch 7b; likewise, when the pickup 2 is located at one end, −Zd3 or Zd4, of the dead-zone range, the TRD signal is represented by −Wdb1 or Wdb2, respectively, defining the limits of the tracking dead zone in the dead zone amplifier 8b.

FIG. 24 shows an example in which the TRD signal is input to the dead zone switch 7c directly and to the dead zone amplifier 8b via the low-pass filter 36 with a cut-off frequency fc=0.1 Hz. How the dead zone Wtb in the dead zone switch 7c is determined will be described below with reference to FIGS. 25A and 25B.

Figure 25B:
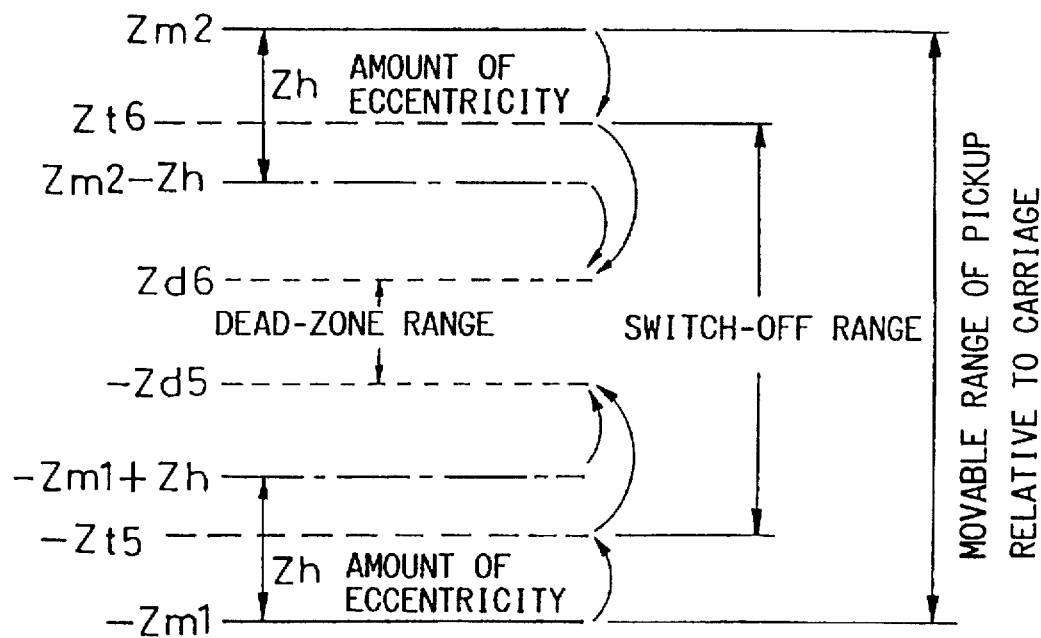
FIG. 25B shows a diagram showing the relationship between the tracking dead zone and full driving dead zone shown in FIG. 24.

FIG. 25B shows the relationship between the movable range of the fine actuator 5 and the switch-off range and the dead-zone range; the movable range of the fine actuator 5 is from −Zm1 to Zm2, the switch-off range is from −Zt5 to Zt6, and the dead-zone range is from −Zd5 to Zd6. Zh is the amount of eccentricity of the recording medium 1.

In the configuration of FIG. 24, the switch-off range is set within the movable range of the fine actuator 5. The dead-zone range is set within the switch-off range and within the earlier mentioned range of (−Zm1+Zh) to (Zm2−Zh).

When the pickup 2 is located at one end, −Zt5 or Zt6, of the switch-off range obtained in the above procedure, the TRD signal is represented by −Wtc1 or Wtc2, respectively, defining the limits of the full driving dead zone in the dead zone switch 7c; likewise, when the pickup 2 is located at one end, −Zd5 or Zd6, of the dead-zone range, the TRD signal is represented by −Wdc1 or Wdc2, respectively, defining the limits of the tracking dead zone in the dead zone amplifier 8c.

<<Ninth Embodiment>>

A ninth embodiment will be described below with reference to FIG. 26.

Figure 26:
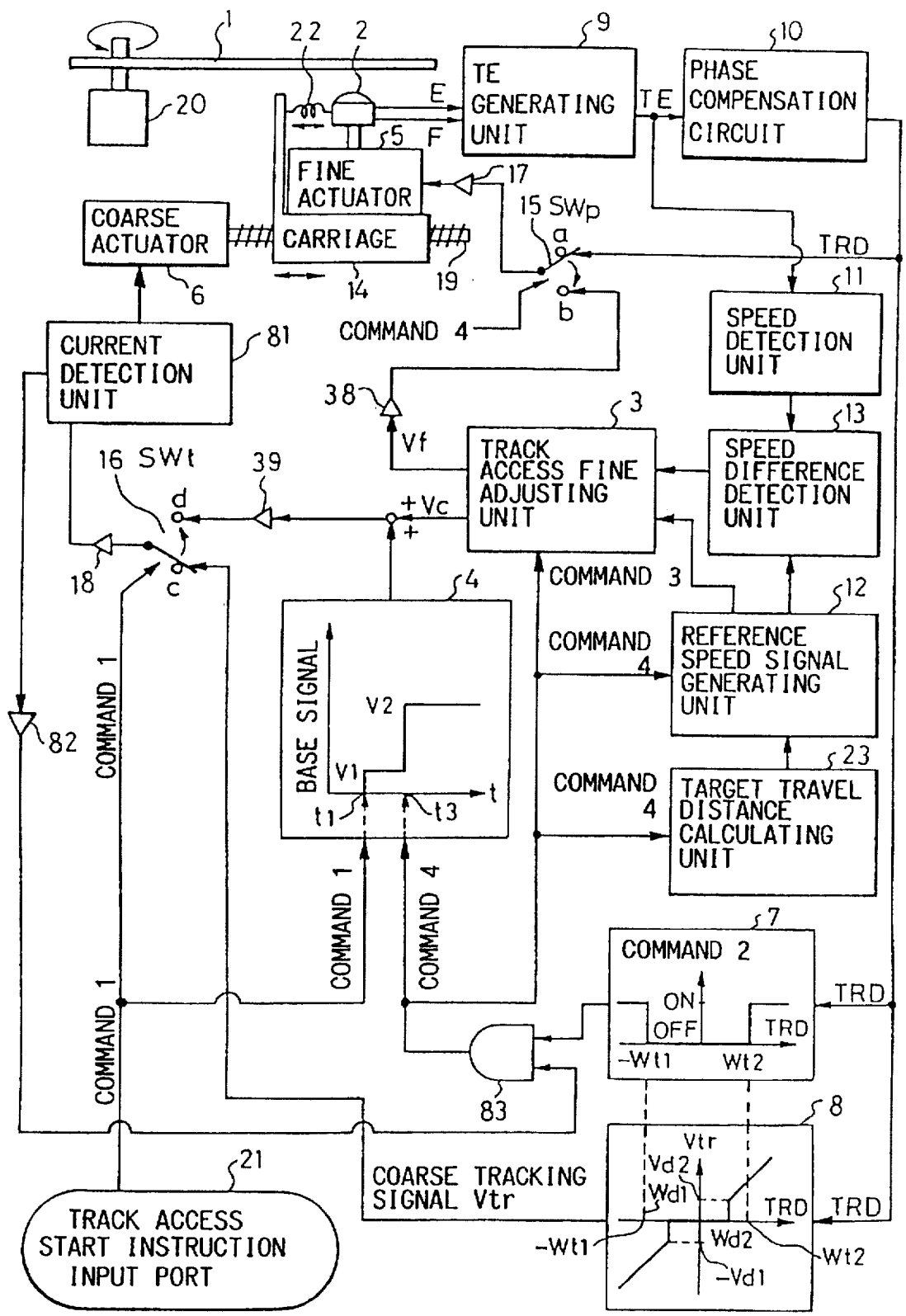
FIG. 26 shows a functional block diagram of a track access apparatus according to a ninth embodiment of the present invention.

The units designated by reference numerals 1 to 39 in FIG. 26 have the same functions as the corresponding units shown in FIG. 1, and therefore, explanation of such units will not be repeated here. The units that make the ninth embodiment different from the embodiment of FIG. 1 will be described below. A carriage movement detection unit 82 determines whether the carriage 14 is moving or not, on the basis of the magnitude of the current to the coarse actuator 6 detected by a current detection unit 81. Reference numeral 83 is an AND gate.

In FIG. 26, the coarse actuator 6 is driven with a voltage supplied from the coarse-drive amplifier 18, and thereby moves the carriage 14. Here, a time delay is caused in driving force transmission because of clearance in transmission gears between the coarse actuator and the carriage 14, so that the carriage 14 does not move immediately when the worm 19 begins to rotate. When the gear clearance is completely taken up and the carriage 14 begins to move, the load on the coarse actuator 6 increases and the amount of supply current also increases as compared to the amount before the driving. The current detection unit 81 detects the value of the current being fed to the coarse actuator 6, and sends the current value to the carriage movement detection unit 82. The carriage movement detection unit 82 is preloaded with a threshold by which to determine whether the carriage 14 is in motion or not, the threshold being equal to the current value at which the carriage 14 begins to move after the coarse actuator 6 is activated. When it is determined, based on the output value of the current detection unit 81, that the carriage 14 is in motion, the carriage movement detection unit 82 sends Boolean TRUE to the AND gate 83. Here, when the current value is judged based on the threshold, the voltage applied to the coarse actuator 6 is represented by the voltage value when the output of the coarse driving base signal generating unit 4 is V1.

When the TRD signal exceeds the range of −Wt1 to Wt2, the dead zone switch 7 sends ON (Boolean TRUE) to the AND Gate 83. When the two inputs are TRUE, the AND Gate 83 outputs command 4.

The functions of the command 4 on the track access fine adjusting unit 3, coarse driving base signal generating unit 4, reference speed signal generating unit 12, a fine-drive selector switch (SWp) 15, and target travel distance calculating unit 23 are the same as the functions that the command 2 in the first embodiment (FIG. 1) has on the track access fine adjusting unit 3, the coarse driving base signal generating unit 4, the reference speed signal generating unit 12, the fine-drive selector switch (SWp) 15, and target travel distance calculating unit 23.

According to the configuration of the ninth embodiment shown in FIG. 26, when playing back a recording medium 1 having, for example, a certain amount of eccentricity, the pickup 2 is made to follow a track on the recording medium 1 by the action of the fine actuator 5.

When the track access start instruction is input to the track access start instruction port 21 during playback, command 1 is issued, in response to which the coarse driving base signal generating unit 4 outputs the slow-speed signal V1. A slow-speed period is thus entered during which the pickup 2 moves at slow speed. In this case, if the amount of eccentricity of the recording medium 1 is large, the TRD signal exceeds the range of −Wt1 to Wt2 and ON (Boolean TRUE) is input to the AND gate 83. However, because of the clearance (backlash) in the transmission gears between the coarse actuator 6 and the carriage 14, the driving force of the coarse actuator 6 may not be transmitted to the carriage 14, and the carriage 14 therefore may not begin to move. In such a situation, the AND Gate 83 does not output the command 4, and the coarse driving base signal generating unit 4 continues to output the slow-speed signal V1. Thereafter, when the gear clearance between the coarse actuator 6 and the carriage 14 is completely taken up, the AND gate 83 outputs the command 4, and the coarse driving base signal generating unit 4 outputs the full drive signal V2, upon which the carriage 14 starts to move at high speed.

As described, according to the configuration of the ninth embodiment, when performing track accessing on a recording medium 1 having a large eccentricity, driving force for high-speed movement is applied to the carriage 14 after the gear clearance between the coarse actuator 6 and the carriage 14 has been completely taken up. This effectively achieves a highly stable track access operation.

The embodiments so far described are only illustrative, and various modifications, as described below, may be made in carrying out the embodiments.

In the first or second embodiment, the protection circuit 32 may be omitted if the fine actuator 5 has a sufficient margin for maximum input.

In the first, second, or fourth embodiment, if the pickup 2 can return to the pickup origin sufficiently quickly by the force of the spring 22, and there is no possibility of the pickup 2 moving beyond its movable range on the carriage 14, or if the fine actuator 5 has a sufficiently quick response in driving the pickup 2, there is no need to apply a bias to the fine driving signal after time t3, and therefore, the fine driving bias 31 may be omitted. Accordingly, the commands 2 and 3 need not be supplied to the track access fine adjusting unit 3, and hence, the reference speed signal generating unit 12 need not issue the command 3.

In the first or third embodiment, instead of coupling the TRD signal to the inputs of the dead zone switch 7 and dead zone amplifier 8, a sensor may be provided for detecting the position of the pickup 2 relative to the carriage 14, and information about the detected position may be input to them. Any sensor that can detect the position of the pickup 2 relative to the carriage 14 may be used in the method and apparatus of the invention. An optical or magnetic encoder, for example, can be used to implement the above relative position detection method.

In the first, second, third, or fourth embodiment, instead of coupling the TRD signal to the input of the dead zone switch 7, a sensor may be provided which detects whether the position of the pickup 2 relative to the carriage 14 has exceeded the switch-off range, and the output of the sensor may be coupled to the input of the dead zone switch 7. An optical or magnetic encoder, or an optical limiter switch using a reflective or transmissive photosensor, or a mechanical limiter switch, for example, can be used to implement the above relative position detection method.

In the first, second, third, or fourth embodiment, the pickup origin, that is, the position of the pickup 2 relative to the carriage 14 when the fine actuator 5 is not exerting any force, was set approximately at the center of the movable range of the pickup 2; however, if the pickup 2 can return to a specific position with good repeatability from any position in the movable range of the fine actuator 5 when the fine actuator 5 is deactivated, then that specific position may be used as the pickup origin, in which case also the present invention is applicable. A resilient member, such as a spiral spring, plate spring, or wire spring, is suitable as a means for moving the pickup 2 back to the specific position with good repeatability. The reason is: in the case of a method utilizing material resilience, the force required by the fine actuator 5 to hold the pickup 2 at a given position relative to the carriage 14 varies according to that given position, and therefore, it is possible to derive the position of the pickup 2 relative to the carriage 14 from the current flowing or the voltage being applied to the fine actuator 5 for driving. The present invention can be applied if the position of the pickup 2 relative to the carriage 14 can be detected, calculated, or derived.

In the first, second, third, or fourth embodiment, the spring 22 was installed only on one side of the pickup 2, but instead, two springs 22 may be installed, one on each side of the pickup 2, and may be supported on two spring support walls formed on the carriage 14, in such a manner as to sandwich the pickup 2, with spring forces acting on both sides of the pickup 2 to return it to the pickup origin. Not only spiral springs but plate springs or wire springs can be used as members for applying forces on both sides of the pickup 2 to return it to the pickup origin.

In the first, second, third, or fourth embodiment, the restoring force of the spring 22 is acting on the pickup 2. Therefore, when the drive voltage to the fine actuator 5 is cut off and the driving force is removed, the pickup 2 comes to rest at a specific position with respect to the carriage 14 by the force of the spring 22.

If the configuration is such that the restoring force of a spring or the like is acting on the pickup, as described above, the pickup fine-positioning mechanism used in the track access method and apparatus of the invention may be constructed from an axial rotary mechanism where the pickup is rotated about an axis for fine positioning, instead of the mechanism used in the first, second, third, or fourth embodiment where the pickup is moved linearly in the track access direction. In the axial rotary mechanism, to achieve fine track accessing the rotation angle of the pickup about the axis is controlled by the fine-driving force.

In the first, second, third, or fourth embodiment, the entire assembly of the pickup 2 was moved by the fine actuator 5; however, in the case of an optical pickup, the objective lens alone may be moved by the fine actuator 5, and the light-emitting element or light-receiving element may be mounted or fixed to a member other than the fine actuator 5, for example, to the carriage 14.

In the first, second, or third embodiment, the dead zone amplifier was provided, but the dead zone amplifier may be omitted, or may be replaced by a low-pass filter capable of effectively removing frequency components arising from the eccentricity of a rotating recording medium. In that case, the switch-off range can be determined without considering the dead-zone range.

In the first, second, third, or fourth embodiment, it has been described that the track access start instruction input port 21 issues the command 1 upon receiving the track access start instruction. Alternatively, the track access start instruction input port may be constructed as a simple terminal, and the track access start instruction may be output directly as the command 1.

In the first or second embodiment, the output of the coarse driving base signal between command 1 and command 2, that is, the slow-speed signal V1, was maintained at a constant value, but the slow-speed signal V1 need not be maintained at a constant value if the signal output between command 1 and command 2 is of such a value that makes the coarse actuator 6 generate a driving force that is sufficient to drive the carriage 14, and yet does not cause the pickup 2 to move beyond its movable range even if vibrations are caused in the pickup 2 by the impact when the driving force is abruptly transmitted to the carriage 14 after the worm 19 has rotated idly from the maximum backlash condition. For example, in order to improve the response of the coarse actuator 6 that has a coil component and hence a delay in response, current of a large value may be applied to the coarse actuator 6 at the beginning, and then the current may be reduced gradually.

In the fourth embodiment, the brake circuit used the back electromotive force that was induced in the coarse actuator when both ends of the power supply line of the coarse actuator were short-circuited; alternatively, the brake circuit may be so constructed at to apply an external voltage or current that causes the coarse actuator to generate a driving force in the direction opposite to the track access direction.

In the fourth embodiment, the same braking start time was used whether the track access direction was from the inner toward the outer circumference or from the outer toward the inner circumference of the recording medium. However, contact portions between the worm and the carriage change depending on the track access direction, and when the worm was made by cutting, for example, the surface condition of the worm is different depending on from which end of the worm the cutting was made; as a result, the worm/carriage friction coefficient is different depending on the track access direction. Accordingly, the braking start time may be determined separately according to the access direction.

For the same reason, in the fifth embodiment, the successive correction of the braking start time may be performed separately according to the track access direction.

The track access method and track access apparatus of the present invention can be applied not only to a disk-shaped rotating recording medium but also to a medium on which information is recorded, played back, or erased by a relative reciprocating motion between the recording medium and the pickup, as long as the track access apparatus comprises a combination of a fine actuator for driving the pickup and a coarse actuator for driving the entire assembly of the fine actuator.

Furthermore, the track access method and track access apparatus of the present invention are applicable for any of information recording, erasing, and playback operations performed on a recording medium using a pickup.

In the first, second, third, or fourth embodiment, the coarse actuator was constructed to drive the carriage 14 via the worm 19, but it will be appreciated that the same effect can be achieved if the coarse actuator is constructed in a rack-and-pinion configuration in which the carriage 14 is mounted on a rack that performs rectilinear motion by being driven by a gear. The same effect can also be obtained if a helical gear or a double-helical gear is used as a component of the coarse actuator.

In the first, second, third, or fourth embodiment, the dead zone switch 37 can be implemented using a comparator, but instead, the dead zone switch 37 may be implemented using a Schmitt circuit to introduce hysteresis in the switch-on rising and switch-off falling, thereby preventing chattering due to noise in the TRD signal.

In the fourth embodiment, the fine bias driving unit 67 was constructed to generate a driving force in the direction opposite to the advancing direction for a predetermined length of time starting from the braking start time, but if the movable range of the coarse actuator 5 is sufficiently wide, and there is no possibility that the pickup 2 during braking will move beyond the movable range of the fine actuator 5 even if the back driving force is not applied, the fine bias driving unit 67 need not generate the back driving force.

Figure 27:
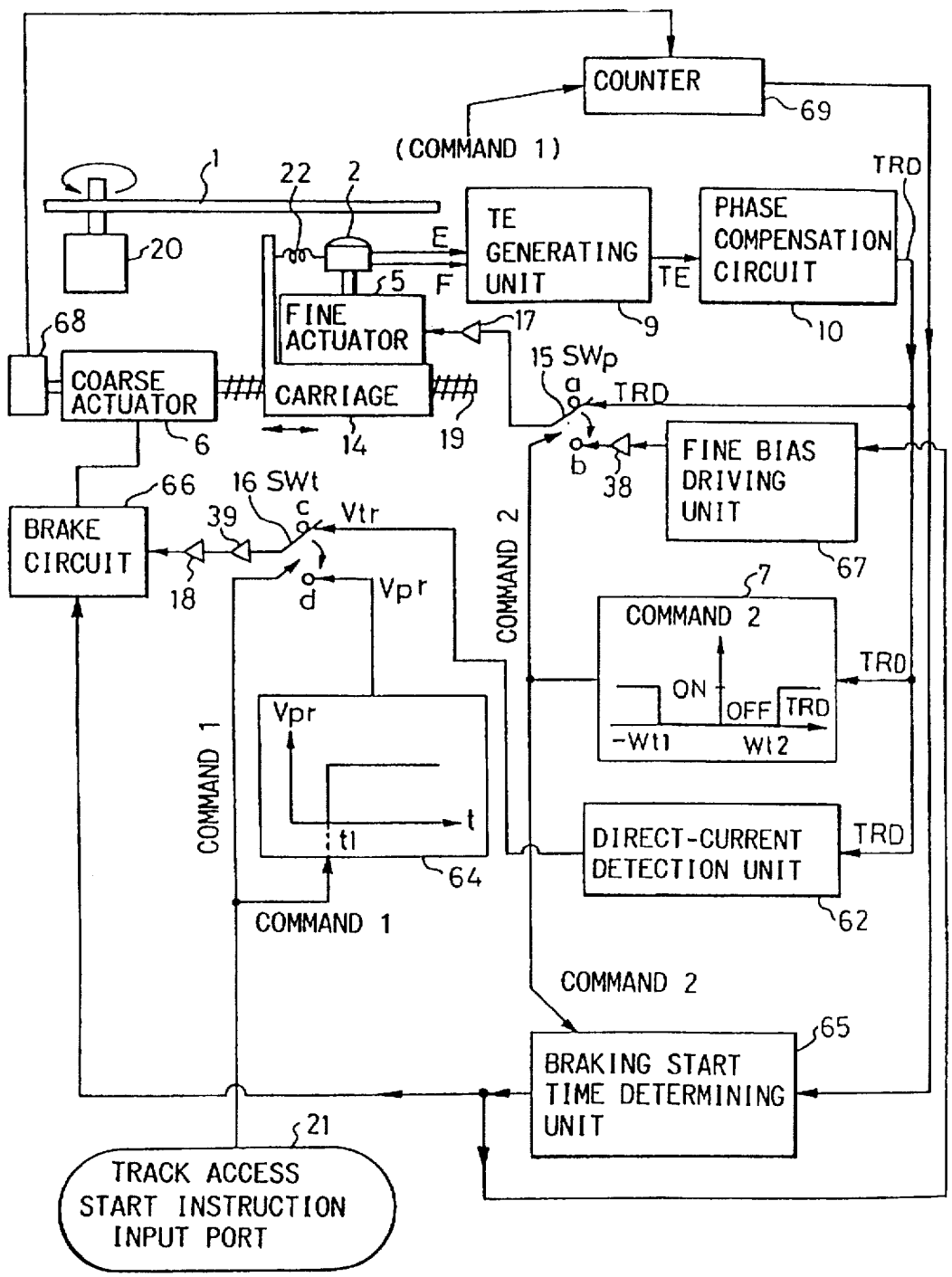
FIG. 27 shows a functional block diagram of a configuration which is fundamentally the same as that shown in FIG. 14, except that a portion thereof is modified to detect carriage position.
Figure 28:
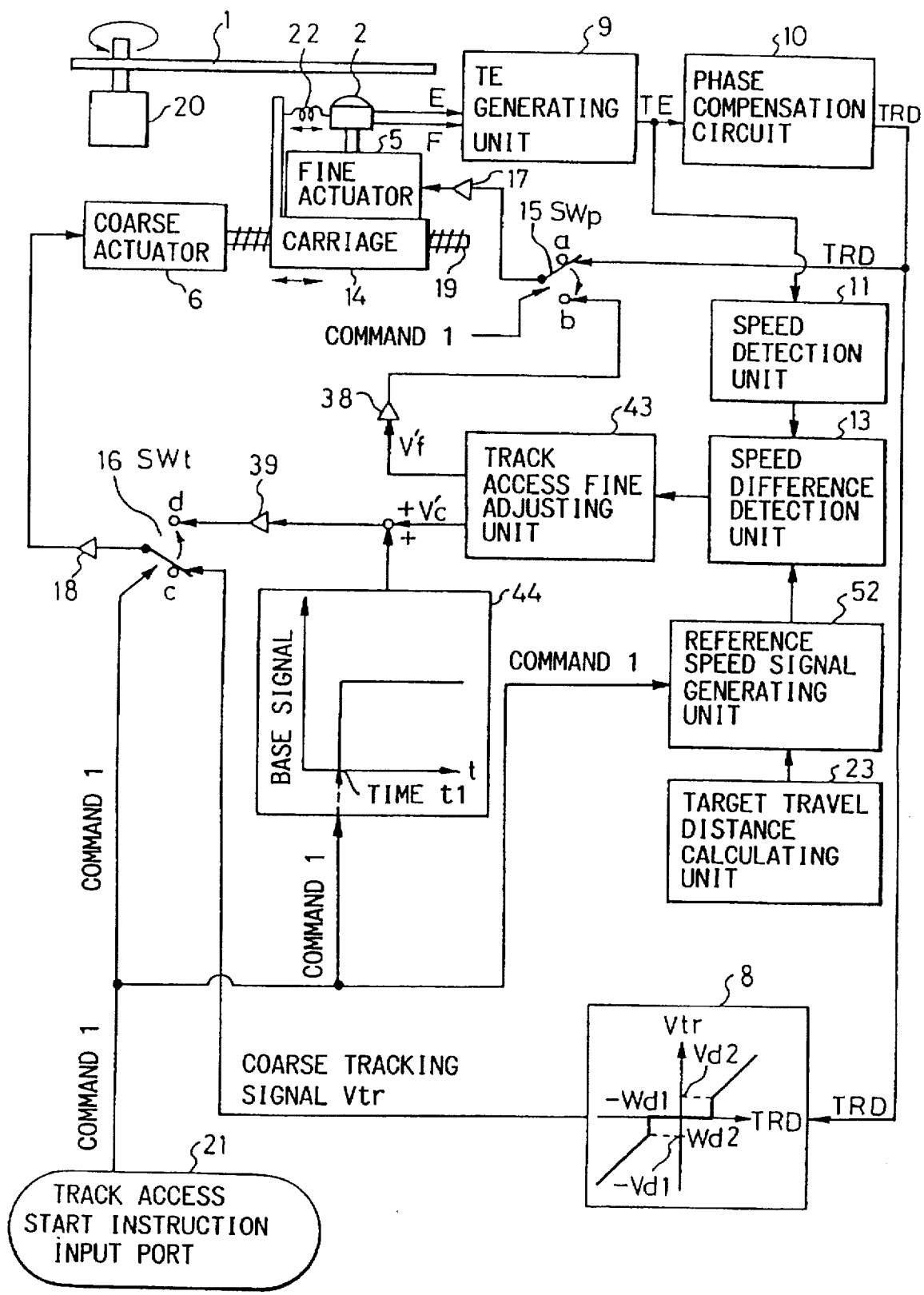
FIG. 28 shows the functional block diagram of a track access apparatus according to the prior art.
Figure 29A:
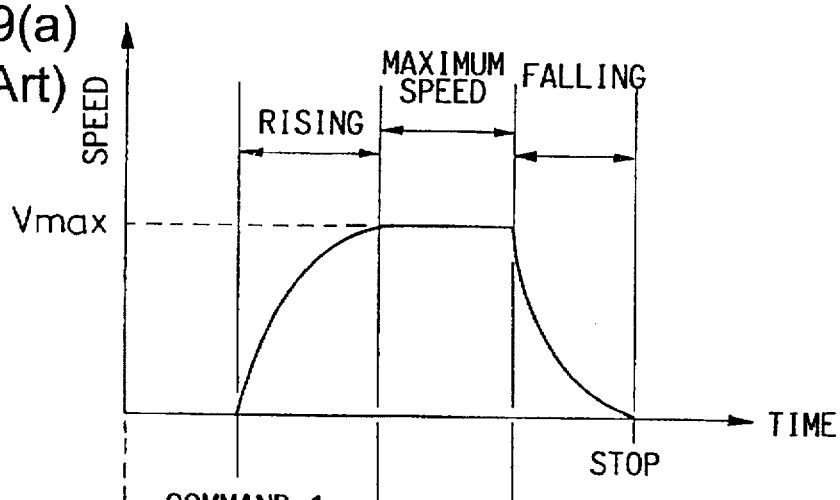
FIGS. 29(a), 29(b) and 29(c) show the schematic diagram showing a reference speed signal from reference speed signal generating unit in the prior art.
Figure 29B:
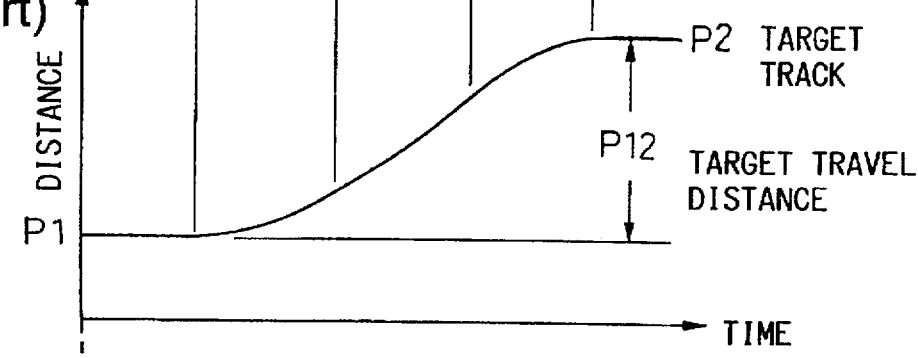
Figure 29C:
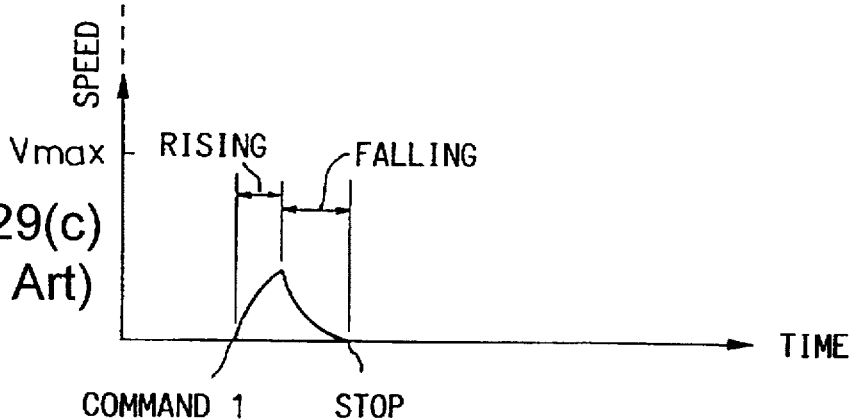
Figure 31:
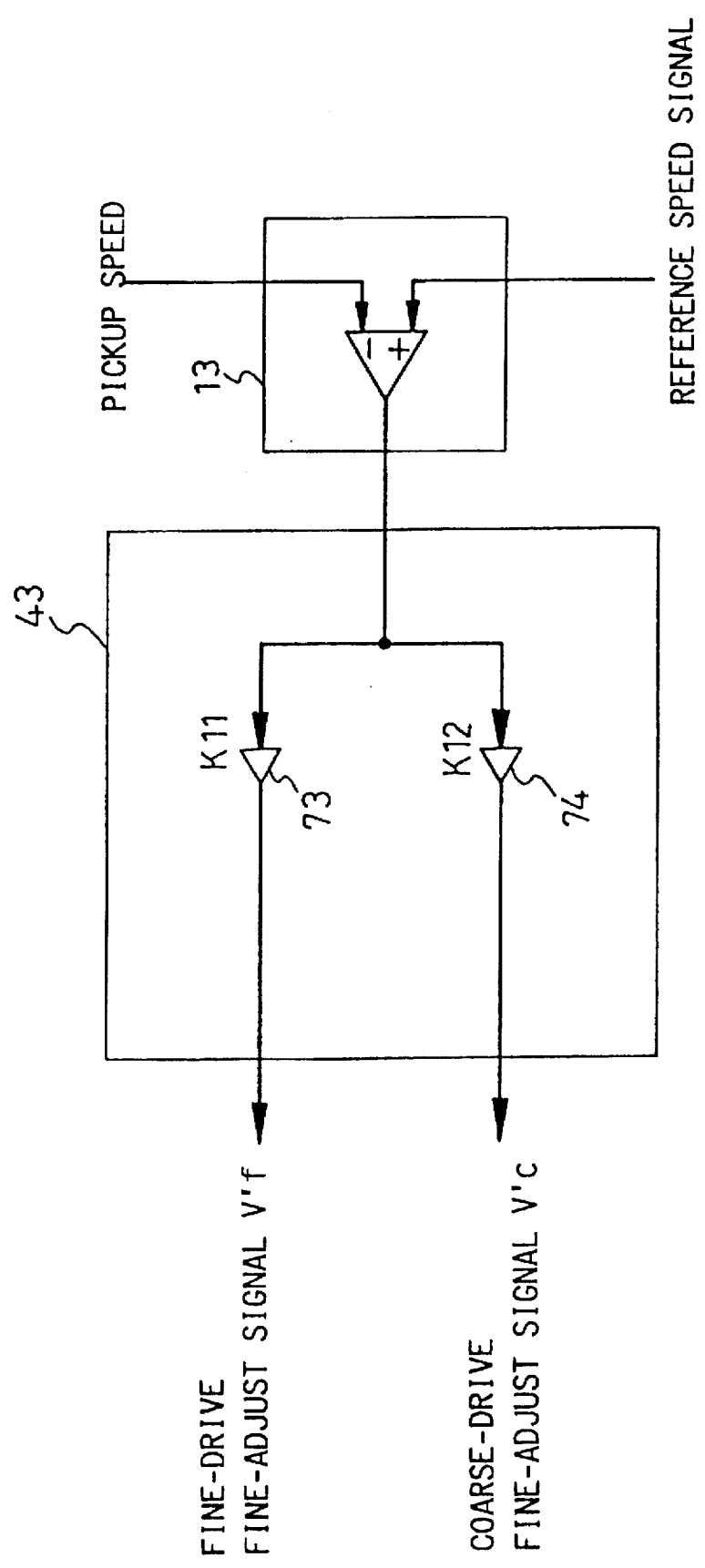
FIG. 31 shows the block diagram showing an example of track access fine adjusting unit 43 and an example of speed difference detection unit 13 in the prior art.

In FIG. 14 illustrating the fourth embodiment, the TE signal from the TE generating unit 9 was supplied as an input to the counter 63, but an alternative configuration is possible in which a different signal is input to the counter 63. For example, a signal from an encoder mounted on the coarse actuator 6 may be supplied as an input to the counter. FIG. 27 shows a functional block diagram of such a configuration.

In FIG. 27, a counter 69 is provided instead of the counter 63 shown in FIG. 14, and an encoder 68 is provided which detects the rotation angle of the worm 19 that is driven by the coarse actuator 6.

Otherwise, the configuration of FIG. 27 is the same as that shown in FIG. 14. In FIG. 27, since the carriage 14 moves in the track access direction with the rotation of the worm 19, the distance traveled by the carriage 14 can be derived from the rotation angle of the worm 19. The signal corresponding to the rotation angle of the worm 19 detected by the encoder 68 is input to the counter 69, and the distance traveled by the carriage 14 is thus detected. The braking start time is determined based on the count value of the counter 69 in the same manner as in the fourth embodiment.

The same effect and advantage as achieved in the fourth embodiment can be obtained if the distance traveled by the carriage is detected by using the encoder 68 and the counter 69 provided in place of the counter 63.

The configuration using the above-described encoder can also be applied to the first embodiment (FIG. 1). That is, instead of supplying the TE signal as an input to the speed detection unit 11 in the first embodiment shown in FIG. 1, an encoder 68 (not shown in FIG. 1) for detecting the rotation angle of the worm 19 is provided, as in the configuration of FIG. 27, and the encoder output is supplied as an input to the speed detection unit 11; then, the moving speed of the carriage 14 can be detected based on the rotation angle of the worm 19 detected by the encoder 68 in unit time.

The present invention is carried out in the above-described modes, and offers the effects as will be described below.

In the track access method of the present invention, when the track access start instruction is issued during tracking, the carriage is caused to begin to move in the track access direction by the action of the coarse actuator, while, on the other hand, the track-following action of the pickup is maintained by the fine actuator; thereafter, when the relative position of the pickup has reached a boundary of a predetermined range or moved outside the predetermined range, the track-following action of the pickup by the fine actuator is stopped, and the pickup is moved to the target track by using coarse driving control and fine driving control in collaborating fashion. Accordingly, if the carriage stays stationary for a while after the initiation of a track access operation because of the presence of backlash in the pickup drive mechanism, during that time the pickup is maintained in a tracking condition by the action of the fine actuator, and after the backlash is eliminated, the track access motion of the pickup is started. This prevents the pickup from running away out of control, and ensures stable track accessing.

Furthermore, since the pickup, when disengaged from tracking, is always located at the rearward end of the predetermined range on the carriage when viewed along the track access direction, the pickup is prevented from crossing tracks of the recording medium in the direction opposite to the track access direction during track accessing, thus eliminating the possibility of erroneously reading the number of tracks crossed. This ensures accurate landing on the target track.

Also, since the pickup is always located rearward when viewed along the track access direction, there is reproducibility (little variation) in the position of the pickup relative to the track at any given time after the pickup starts crossing the tracks on the recording medium. This ensures stable and accurate landing on the target track.

A reference speed signal for the pickup is generated based on the distance from the current position of the pickup to the target track position, and then a speed difference signal representing the difference between the speed indicated by the reference speed signal and the speed of the pickup is generated; by adjusting a base signal for coarse driving on the basis of the speed difference signal, further precise positioning on the target track can be achieved.

Further, braking control is performed to decelerate the carriage in motion by using braking means; the braking start time at which to start applying braking to the carriage is determined based on the distance between the current position of the pickup and the position of the target track, based on which the braking means is controlled to apply braking to the carriage. This ensures further precise positioning on the target track.

When the number of tracks to be crossed from the time the carriage begins to move by the action of the coarse actuator, until the carriage reaches a constant moving speed, is denoted by K, and the number of tracks to be crossed from the time the carriage moving at a constant speed begins to decelerate by being braked, until the carriage comes to a stop, is denoted by M, if the total number of tracks lying between the current track before the beginning of track accessing and the target track is smaller than (K+M), the time at which the pickup has crossed substantially half the total number of tracks is determined as the braking start time, and if the total number of tracks lying between the current track before the beginning of track accessing and the target track is equal to or larger than (K+M), the time at which the pickup has reached a track M tracks short of the target track is determined as the braking start time. In this way, braking can be applied at the appropriate time whether the track access distance is longer or shorter than the predetermined value. This ensures precise landing on the target track.

Furthermore, if the braking start time is determined differently when track accessing is made from the inner toward the outer circumference of the recording medium than when track accessing is made from the outer toward the inner circumference, the braking start time can be determined accurately according to the condition, and the pickup can be positioned accurately over the target track.

Moreover, by successively correcting the braking start time based on the difference between the target track and the track actually landed on by the pickup in the previous track access operation, the pickup can be positioned precisely over the target track.

Further, by tentatively setting the number of tracks, M, and by successively correcting this number M based on the difference between the target track and the track actually landed on by the pickup in the previous track access operation, the pickup can be positioned precisely over the target track.

Furthermore, if the successive correction is done differently when track accessing is made from the inner toward the outer circumference of the recording medium than when track accessing is made from the outer toward the inner circumference, the braking start time can be determined accurately according to the condition, and the pickup can be positioned accurately over the target track.

In performing the successive correction, if the pickup landed short of the target track in the previous track access operation, the braking start time is delayed from the previous time by an appropriate number of tracks equal to or less than 100% of the number of tracks by which the pickup landed short of the target track in the previous track access operation; conversely, if the pickup landed farther beyond the target track in the previous track access operation, the braking start time is advanced from the previous time by an appropriate number of tracks equal to or less than 100% of the number of tracks which the pickup crossed beyond the target track in the previous track access operation. The appropriate braking start time can thus be determined quickly.

In performing the successive correction, if the amount of correction is held within 20% of the difference between the target track and the track actually landed on by the pickup in the previous track access operation, the appropriate braking start time can be determined while reducing the amount of variation.

Further, from the moment that the position of the pickup relative to the carriage has reached a boundary of the switch-off range or moved outside the switch-off range, the fine actuator applies to the pickup a driving force in the track access direction for a predetermined length of time or for a time required to cross a predetermined number of tracks. This prevents the pickup, when disengaged from tracking, from moving further in the direction opposite to the track access direction in reaction to the driving of the carriage 14.

Also, the fine actuator applies to the pickup a driving force in the direction opposite to the track access direction for a predetermined length of time, or for a time required to cross a predetermined number of tracks, starting from the braking start time. This prevents the pickup from being excessively displaced in the track access direction when braking is started.

The dead-zone range is set within the relative positioning range of the pickup with respect to the carriage; when the relative position of the pickup in tracking is inside the dead-zone range, the pickup is kept on track by the action of the fine actuator, and when the relative position has reached a boundary of the dead-zone range or moved outside the dead-zone range, track following is performed by using the coarse actuator and the fine actuator in collaborating fashion. In this case, by setting the dead-zone range within the switch-off range including both end points, a runaway situation can be reliably prevented in which the instant the track access start instruction is issued the fine actuator alone is switched to track accessing and runs away out of control over the carriage that stays stationary because of the presence of backlash. This also reliably prevents such malfunctioning that the full driving action is initiated when the pickup, which should be displaced rearward relative to the carriage when viewed along the track access direction, is displaced forward relative to the carriage when viewed along the track access direction.

The track access apparatus of the invention comprises: coarse driving signal generating means for generating a signal for driving the coarse actuator for track accessing, starting from the time the track access start instruction is issued; switching means for presetting the switch-off range within the movable range of the pickup relative to the carriage, and for outputting a prescribed signal when the relative position of the pickup has reached a boundary of the switch-off range or moved outside the switch-off range; and fine-drive selector switch for stopping the track following action of the fine actuator in response to the prescribed signal. With this configuration, if the carriage stays stationary for a while after the initiation of a track access operation because of the presence of backlash in the pickup drive mechanism, during that time the pickup is maintained in a tracking condition by the action of the fine actuator, and after the backlash is eliminated, the track access motion of the pickup is started. This prevents the pickup from running away out of control, and ensures stable track accessing.

Furthermore, since the pickup, when disengaged from tracking, is always located at the rearward end of the predetermined range on the carriage when viewed along the track access direction, the pickup is prevented from crossing tracks of the recording medium in the direction opposite to the track access direction during track accessing, thus eliminating the possibility of erroneously reading the number of tracks crossed. This ensures accurate landing on the target track.

Also, since the pickup is always located rearward when viewed along the track access direction, there is reproducibility (little variation) in the position of the pickup relative to the track at any given time after the pickup starts crossing the tracks on the recording medium. This ensures stable and accurate landing on the target track.

Further, the track access apparatus comprises: coarse driving base signal generating means for generating a base signal for driving the coarse actuator for track accessing, starting from the time the track access start instruction is issued; means for generating a reference speed signal for the pickup on the basis of the distance from the current position of the pickup to the target track position; means for detecting the speed of the pickup; means for generating a speed difference signal representing the difference between the speed indicated by the reference speed signal and the speed of the pickup; and means for adjusting the base signal on the basis of the speed difference signal in response to a prescribed signal, and for supplying the adjusted signal to the coarse actuator. With this configuration, the pickup can be positioned precisely over the target track.

With the further provision of braking start time determining means for determining the time at which to start applying braking to the carriage, on the basis of the distance from the current position of the pickup to the target track position, and braking means for applying braking at the thus determined time to decelerate the carriage in motion, the pickup can be positioned more accurately over the target track.

The braking start time determining means successively corrects the braking start time on the basis of the difference between the target track and the track actually landed on by the pickup in the previous track access operation, thereby enhancing the accuracy in landing on the target track.

Further, with the inclusion of track access fine adjusting means for making the fine actuator apply to the pickup a driving force in the track access direction for a predetermined length of time, or for a time required to cross a predetermined number of tracks, starting from the moment the position of the pickup relative to the carriage has reached a boundary of the switch-off range or moved outside the switch-off range, the pickup, when disengaged from tracking, can be prevented from moving further in the direction opposite to the track access direction in reaction to the driving of the carriage.

Also, with the including of track access fine adjusting means for applying, starting at the braking start time, a driving force in the direction opposite to the track access direction to the pickup by controlling the fine actuator for a predetermined length of time, or for a time required to cross a predetermined number of tracks, the pickup can be prevented from being excessively displaced in the track access direction when braking is started.

There is also provided a dead zone amplifier for setting a dead-zone range within the relative positioning range of the pickup with respect to the carriage, and for detecting whether the relative position of the pickup is inside the dead-zone range when the pickup is following a track on the recording medium, and provisions are made so that, when the relative position is inside the dead-zone range, the pickup is kept on track by the action of the fine actuator, and when the relative position has reached a boundary of the dead-zone range or moved outside the dead-zone range, track following is performed by using the coarse actuator and the fine actuator in collaborating fashion, wherein the dead-zone range is set within the switch-off range including both end points. With this configuration, a runaway situation can be reliably prevented in which the instant the track access start instruction is issued the fine actuator alone is switched to track accessing and runs away out of control over the carriage that stays stationary because of the presence of backlash.

Furthermore, since the base signal is so set that it is output as a first level signal during a period starting from the time the track access start instruction is issued, until the prescribed signal is output, and as a second level signal, which is higher than the first level signal, after the prescribed signal is output, the first level output signal acts as a slow-speed signal, serving to reduce the impact caused when the driving force is abruptly transmitted to the carriage after the carriage has rotated idly due to backlash. Therefore, the pickup can be prevented from vibrating and moving beyond its (allowable) movable range.

It will be appreciated that the same effect can be achieved if the track access method is implemented by a configuration where the carriage speed is detected instead of the configuration where the pickup speed is detected.

It will also be appreciated that the same effect can be achieved if the track access method is implemented by a configuration where the carriage position is detected instead of the configuration where the pickup position is detected.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A track access method for moving a pickup, used to record, erase, or play back information on a track of a recording medium, to a target track by appropriately using coarse driving control, in which a carriage with said pickup mounted thereon is moved by means of a coarse actuator in a track access direction substantially at right angles to said track, and fine driving control, in which said pickup is moved by means of a fine actuator mounted on said carriage in said track access direction within a smaller range, and with a higher accuracy, than is possible with said coarse driving control, said track access method characterized in that:

when a track access start instruction is issued in a tracking condition in which said pickup is following a track on said recording medium, said carriage is caused to begin to move in said track access direction by the action of said coarse actuator, while said pickup is still kept on track of said recording medium by means of said fine actuator;

a switch-off range is preset within a movable range of said pickup relative to said carriage, and a relative position of said pickup with respect to said carriage, after said track access start instruction is issued, is detected; and when said relative position has reached a boundary of said switch-off range or moved outside said switch-off range, the track-following action of said pickup by said fine actuator is stopped, and said pickup is moved to said target track by using said coarse control and said fine control in collaborating fashion.

2. A track access method for moving a pickup, used to record, erase, or play back information on a track formed in a spiral or concentric form on a recording medium, to a target track by appropriately using coarse driving control, in which a carriage with said pickup mounted thereon is moved by means of a coarse actuator in a track access direction substantially at right angles to said track, and fine driving control, in which said pickup is moved by means of a fine actuator mounted on said carriage in said track access direction within a smaller range, and with a higher accuracy, than is possible with said coarse driving control, said track access method characterized in that:

speed of said pickup is detected;

when a track access start instruction is issued in a tracking condition in which said pickup is following a track on said recording medium, said carriage is caused to begin to move in said track access direction by the action of said coarse actuator while said pickup is still kept on track of said recording medium by means of said fine actuator;

a switch-off range is preset within a movable range of said pickup relative to said carriage, and a relative position of said pickup with respect to said carriage, after said track access start instruction is issued, is detected;

when said relative position has reached a boundary of said switch-off range or moved outside said switch-off range, the track-following action of said pickup by said fine actuator is stopped;

distance from a current position of said pickup to said target track is obtained;

a reference speed signal for said pickup is generated based on said distance;

a speed difference signal representing a difference between said reference speed signal and speed of said pickup is generated; and a base signal for coarse driving is adjusted using said speed difference signal, and said pickup is moved to said target track by using said coarse driving control and said fine driving control in collaborating fashion.

3. A track access method for moving a pickup, used to record, erase, or play back information on a track formed in a spiral or concentric form on a recording medium, to a target track by appropriately using coarse driving control, in which a carriage with said pickup mounted thereon is moved by means of a coarse actuator in a track access direction substantially at right angles to said track, fine driving control in which said pickup is moved by means of a fine actuator mounted on said carriage in said track access direction within a smaller range, and with a higher accuracy, than is possible with said coarse driving control, and braking control in which said moving pickup is decelerated by braking means, said track access method characterized in that:

position of said pickup is detected;

when a track access start instruction is issued in a tracking condition in which said pickup is following a track on said recording medium, said carriage is caused to begin to move in said track access direction by the action of said coarse actuator while said pickup is still kept on track of said recording medium by means of said fine actuator;

a switch-off range is preset within a movable range of said pickup relative to said carriage, and a relative position of said pickup with respect to said carriage, after said track access start instruction is issued, is detected;

when said relative position has reached a boundary of said switch-off range or moved outside said switch-off range, the track-following action of said pickup by said fine actuator is stopped;

distance from a current position of said pickup to said target track is obtained, and a braking start time at which to start applying braking to said carriage is determined on the basis of said distance; and when said pickup is being moved toward said target track, braking is applied to said carriage by said braking means, starting from the braking start time.

4. A track access method according to claim 3, wherein:

when the number of tracks to be crossed from the time said carriage begins to move by the action of said coarse actuator, until said carriage reaches a constant moving speed, is denoted by K, and the number of tracks to be crossed from the time said carriage moving at a constant speed begins to decelerate by being braked, until said carriage comes to a stop, is denoted by M, if the total number of tracks lying between the current track before the beginning of track accessing and said target track is smaller than (K+M), the time at which said pickup has crossed substantially half the total number of tracks is determined as said braking start time, and if the total number of tracks lying between the current track before the beginning of track accessing and said target track is equal to or larger than (K+M), the time at which said pickup has reached a track M tracks short of said target track is determined as said braking start time.

5. A track access method according to claim 3, wherein:

said braking start time is determined differently when track accessing is made from the inner toward the outer circumference of said recording medium than when track accessing is made from the outer toward the inner circumference of said recording medium.

6. A track access method according to claim 3, wherein:

said braking start time is successively corrected on the basis of a difference between the target track in previous track accessing and the track actually landed on by said pickup after said track accessing.

7. A track access method .according to claim 3, wherein:

when the number of tracks to be crossed from the time said carriage begins to move by the action of said coarse actuator, until said carriage reaches a constant moving speed, is denoted by K, and the number of tracks to be crossed from the time said carriage moving at a constant speed begins to decelerate by being braked, until said carriage comes to a stop, is denoted by M, if the total number of tracks lying between the current track before the beginning of track accessing and said target track is smaller than (K+M), the time at which said pickup has crossed substantially half the total number of tracks is determined as said braking start time, and if the total number of tracks lying between the current track before the beginning of track accessing and said target track is equal to or larger than (K+M), the time at which said pickup has reached a track M tracks short of said target track is determined as said braking start time, whereby said number of tracks, M, is successively corrected on the basis of an error between the target track in previous track accessing and the track actually landed on by said pickup.

8. A track access method according to claim 3, wherein:

when the number of tracks to be crossed from the time said carriage begins to move by the action of said coarse actuator, until said carriage reaches a constant moving speed, is denoted by K, and the number of tracks to be crossed from the time said carriage moving at a constant speed begins to decelerate by being braked, until said carriage comes to a stop, is denoted by M, if the total number of tracks lying between the current track before the beginning of track accessing and said target track is smaller than (K+M), the time at which said pickup has crossed substantially half the total number of tracks is determined as said braking start time, and if the total number of tracks lying between the current track before the beginning of track accessing and said target track is equal to or larger than (K+M), the time at which said pickup has reached a track M tracks short of said target track is determined as said braking start time, whereby said number of tracks, M, is successively corrected on the basis of an error between the target track in previous track accessing and the track actually landed on by said pickup, and said successive correction is performed differently when track accessing is made from the inner toward the outer circumference of said recording medium than when track accessing is made from the outer toward the inner circumference of said recording medium.

9. A track access method according to claim 3, wherein:

when the number of tracks to be crossed from the time said carriage begins to move by the action of said coarse actuator, until said carriage reaches a constant moving speed, is denoted by K, and the number of tracks to be crossed from the time said carriage moving at a constant speed begins to decelerate by being braked, until said carriage comes to a stop, is denoted by M, if the total number of tracks lying between the current track before the beginning of track accessing and said target track is smaller than (K+M), the time at which said pickup has crossed substantially half the total number of tracks is determined as said braking start time, and if the total number of tracks lying between the current track before the beginning of track accessing and said target track is equal to or larger than (K+M), the time at which said pickup has reached a track M tracks short of said target track is determined as said braking start time, whereby said number of tracks, M, is successively corrected on the basis of an error between the target track in previous track accessing and the track actually landed on by said pickup, and said successive correction is performed in such a manner that, if said pickup is landed short of said target track in said previous track accessing, said braking start time is delayed from the previous time by an appropriate number of tracks equal to or less than 100% of the number of tracks between the target track in said previous track accessing and the track actually landed on by said pickup, and if the pickup is landed farther beyond said target track in said previous track accessing, said braking start time is advanced from the previous time by an appropriate number of tracks equal to or less than 100% of the number of tracks between the target track in said previous track accessing and the track actually landed on by said pickup.

10. A track access method according to claim 9, wherein:

the amount of said successive correction is equal to or less than 20% of the difference between the target track in said previous track accessing and the track actually landed on by said pickup.

11. A track access method according to claim 1, wherein:

said fine actuator applies to said pickup a driving force in said track access direction for a predetermined length of time, or for a time required to cross a predetermined number of tracks, starting from the moment that the relative position of said pickup with respect to said carriage has reached a boundary of said switch-off range or moved outside said switch-off range.

12. A track access method according to claim 3, wherein:

said fine actuator applies to said pickup a driving force in a direction opposite to said track access direction during a predetermined length of time, or during crossing a predetermined number of tracks, starting from said braking start time.

13. A track access method according to claim 1, wherein:

a second region is set within a relative positioning range of said pickup with respect to said carriage, and in a tracking condition in which said pickup is following a track on said recording medium, when the relative position of said pickup is inside said dead-zone range, said pickup is kept to follow on said track by means of said fine actuator, and when said relative position has reached a boundary of said dead-zone range or moved outside said dead-zone range, said track following is performed by using said coarse actuator and said fine actuator in collaborating fashion, whereby said dead-zone range is set within the boundaries of said switch-off range.

14. A track access method for moving a pickup, used to record, erase, or play back information on a track formed in a spiral or concentric form on a recording medium, to a target track by appropriately using coarse driving control, in which a carriage with said pickup mounted thereon is moved by means of a coarse actuator in a track access direction substantially at right angles to said track, and fine driving control, in which said pickup is moved by means of a fine actuator mounted on said carriage in said track access direction within a smaller range, and with a higher accuracy, than is possible with said coarse driving control, said track access method characterized in that:

speed of said carriage is detected;

when a track access start instruction is issued in a tracking condition in which said pickup is following a track on said recording medium, said carriage is caused to begin to move in said track access direction by the action of said coarse actuator while said pickup is still kept on track of said recording medium by means of said fine actuator;

a switch-off range is preset within a movable range of said pickup relative to said carriage, and a relative position of said pickup with respect to said carriage, after said track access start instruction is issued, is detected;

when said relative position has reached a boundary of said switch-off range or moved outside said switch-off range, the track-following action of said pickup by said fine actuator is stopped;

distance from a current position of said pickup to said target track is obtained;

a reference speed signal for said carriage is generated based on said distance;

a speed difference signal representing a difference between said reference speed signal and speed of said carriage is generated; and a base signal for coarse driving is adjusted using said speed difference signal, and said pickup is moved to said target track by using said coarse driving control and said fine driving control in collaborating fashion.

15. A track access method for moving a pickup, used to record, erase, or play back information on a track formed in a spiral or concentric form on a recording medium, to a target track by appropriately using coarse driving control, in which a carriage with said pickup mounted thereon is moved by means of a coarse actuator in a track access direction substantially at right angles to said track, fine driving control, in which said pickup is moved by means of a fine actuator mounted on said carriage in said track access direction within a smaller range, and with a higher accuracy, than is possible with said coarse driving control, and braking control in which said moving pickup is decelerated by braking means, said track access method characterized in that:

position of said carriage is detected;

when a track access start instruction is issued in a tracking condition in which said pickup is following a track on said recording medium, said carriage is caused to begin to move in said track access direction by the action of said coarse actuator while said pickup is still kept on track of said recording medium by means of said fine actuator;

a switch-off range is preset within a movable range of said pickup relative to said carriage, and a relative position of said pickup with respect to said carriage, after said track access start instruction is issued, is detected;

when said relative position has reached a boundary of said switch-off range or moved outside said switch-off range, the track-following action of said pickup by said fine actuator is stopped;

distance from a current position of said pickup to said target track is obtained, and based on said distance, a braking start time at which to start applying braking to said carriage is determined in reference to said carriage position; and when said pickup is being moved toward said target track, said carriage position is constantly detected, and braking is applied to said carriage by said braking means, starting from the braking start time.

16. A track access apparatus for moving a pickup, used to record, erase, or play back information on a track of a recording medium, to a target track at high speed from a tracking condition in which said pickup is following a track on said recording medium, comprising:

a coarse actuator for moving a carriage with said pickup mounted thereon in a track access direction substantially at right angles to said track;

a fine actuator, mounted on said carriage, for moving said pickup in said track access direction within a smaller range, and with a higher accuracy, than is possible with said coarse actuator;

position detection means for detecting a relative position of said pickup with respect to said carriage;

coarse driving signal generating means for generating a signal to drive said coarse actuator for track accessing, starting from the time a track access start instruction is issued;

switch means for presetting a switch-off range within a movable range of said pickup relative to said carriage, and for outputting a prescribed signal when the relative position detected by said position detection means has reached a boundary of said switch-off range or moved outside said switch-off range; and a fine-drive selector switch for stopping the track following action of said fine actuator in response to said prescribed signal.

17. A track access apparatus for moving a pickup, used to record, erase, or play back information on a track formed in a spiral or concentric form on a recording medium, to a target track at high speed from a tracking condition in which said pickup is following a track on said recording medium, comprising:

a coarse actuator for moving a carriage with said pickup mounted thereon in a track access direction substantially at right angles to said track;

a fine actuator, mounted on said carriage, for moving said pickup in said track access direction within a smaller range, and with a higher accuracy, than is possible with said coarse actuator;

position detection means for detecting a relative position of said pickup with respect to said carriage;

coarse driving base signal generating means for generating a base signal to drive said coarse actuator for track accessing, starting from the time a track access start instruction is issued;

switch means for presetting a switch-off range within a movable range of said pickup relative to said carriage, and for outputting a prescribed signal when the relative position detected by said position detection means has reached a boundary of said switch-off range or moved outside said switch-off range;

a fine-drive selector switch for stopping the track following action of said fine actuator in response to said prescribed signal;

means for obtaining distance from the current position of said pickup to said target track;

means for generating a reference speed signal for said pickup on the basis of said distance;

means for detecting speed of said pickup;

means for generating a speed difference signal representing a speed difference between said reference speed signal and said pickup; and means for adjusting said base signal by said speed difference signal, and for supplying said adjusted base signal to said coarse actuator in response to said prescribed signal.

18. A track access apparatus for moving a pickup, used to record, erase, or play back information on a track formed in a spiral or concentric form on a recording medium, to a target track at high speed from a tracking condition in which said pickup is following a track on said recording medium, comprising:

a coarse actuator for moving a carriage with said pickup mounted thereon in a track access direction substantially at right angles to said track;

a fine actuator, mounted on said carriage, for moving said pickup in said track access direction within a smaller range, and with a higher accuracy, than is possible with said coarse actuator;

position detection means for detecting a relative position of said pickup with respect to said carriage;

coarse driving signal generating means for generating a signal to drive said coarse actuator for track accessing, starting from the time a track access start instruction is issued;

switch means for presetting a switch-off range within a movable range of said pickup relative to said carriage, and for outputting a prescribed signal when the relative position detected by said position detection means has reached a boundary of said switch-off range or moved outside said switch-off range;

a fine-drive selector switch for stopping the track following action of said fine actuator in response to said prescribed signal;

position detection means for detecting position of said pickup;

braking start time determining means for obtaining distance from the current position of said pickup to said target track, and for determining, based on said distance, a braking start time at which said carriage is applied to start braking; and braking means for decelerating said carriage in motion by applying braking thereto, starting from said time.

19. A track access apparatus according to claim 18, wherein:

said braking start time determining means successively corrects said braking start time on the basis of a difference between the target track in previous track accessing and the track actually landed on by said pickup.

20. A track access apparatus according to claim 16, further including:

track access fine adjusting means for making said fine actuator apply to said pickup a driving force in said track access direction during a predetermined length of time, or during crossing a predetermined number of tracks, starting from the moment the relative position of said pickup with respect to said carriage has reached a boundary of said switch-off range or moved outside said switch-off range.

21. A track access apparatus according to claim 18, further including:

track access fine adjusting means for controlling said fine actuator and thereby applying to said pickup a driving force in a direction opposite to said track access direction during a predetermined length of time, or during crossing a predetermined number of tracks, starting from said braking start time.

22. A track access apparatus according to claim 16, further including:

a dead zone amplifier for setting a dead-zone range within a relative positioning range of said pickup with respect to said carriage, and for detecting whether the relative position of said pickup is inside said dead-zone range when said pickup is following a track on said recording medium, wherein, when the relative position of said pickup is inside said dead-zone range, said pickup is kept on said track by means of said fine actuator, and when said relative position has reached a boundary of said dead-zone range or moved outside said dead-zone range, said track following is performed by using said coarse actuator and said fine actuator in collaborating fashion, whereby said dead-zone range is set within the boundaries of said switch-off range.

23. A track access apparatus according to claim 17, wherein:

for a period starting from the time said track access start instruction is issued, until said prescribed signal is output, said base signal is an output signal for driving said carriage at slow speed, and after said prescribed signal is output, said base signal is an output signal for driving said carriage at high speed.

24. A track access apparatus for moving a pickup, used to record, erase, or play back information on a track formed in a spiral or concentric form on a recording medium, to a target track at high speed from a tracking condition in which said pickup is following a track on said recording medium, comprising:

a coarse actuator for moving a carriage with said pickup mounted thereon in a track access direction substantially at right angles to said track;

a fine actuator, mounted on said carriage, for moving said pickup in said track access direction within a smaller range, and with a higher accuracy, than is possible with said coarse actuator;

position detection means for detecting a relative position of said pickup with respect to said carriage;

coarse driving base signal generating means for generating a base signal to drive said coarse actuator for track accessing, starting from the time a track access start instruction is issued;

switch means for presetting a switch-off range within a movable range of said pickup relative to said carriage, and for outputting a first prescribed signal when the relative position detected by said position detection means has reached a boundary of said switch-off range or moved outside said switch-off range;

carriage movement detection means for outputting a second prescribed signal when the beginning of a movement of said carriage is detected;

ANDing means for ANDing said first prescribed signal and said second prescribed signal;

a fine-drive selector switch for stopping the track following action of said fine actuator in response to said ANDing means;

means for obtaining distance from the current position of said pickup to said target track;

means for generating a reference speed signal for said pickup on the basis of said distance;

means for detecting speed of said pickup;

means for generating a speed difference signal representing a speed difference between said reference speed signal and said pickup; and means for adjusting said base signal by said speed difference signal, and for supplying said adjusted base signal to said coarse actuator in response to said ANDing means.

* * * * *